United States Patent
Singh et al.

(10) Patent No.: US 9,177,344 B1
(45) Date of Patent: *Nov. 3, 2015

(54) TREND DATA CLUSTERING

(71) Applicant: Palantir Technologies, Inc., Palo Alto, CA (US)

(72) Inventors: Harkirat Singh, New York, NY (US); Brendan Weickert, McLean, VA (US); Matthew Sprague, Santa Monica, CA (US); Michael Kross, Palo Alto, CA (US); Adam Borochoff, New York, NY (US); Parvathy Menon, San Francisco, CA (US); Michael Harris, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,640

(22) Filed: Dec. 23, 2013

Related U.S. Application Data

(63) Continuation-in-part of application No. 13/968,265, filed on Aug. 15, 2013, now Pat. No. 8,788,405, which is a continuation-in-part of application No. 13/968,213, filed on Aug. 15, 2013, now Pat. No. 8,818,892.

(60) Provisional application No. 61/800,887, filed on Mar. 15, 2013.

(51) Int. Cl.
*G06Q 40/00* (2012.01)
*G06Q 40/02* (2012.01)

(52) U.S. Cl.
CPC ................................. *G06Q 40/025* (2013.01)

(58) Field of Classification Search
USPC ...................................................... 705/35, 38
See application file for complete search history.

(56) References Cited

U.S. PATENT DOCUMENTS

| 6,567,936 B1 | 5/2003 | Yang et al. |
| 7,373,669 B2 | 5/2008 | Eisen |

(Continued)

FOREIGN PATENT DOCUMENTS

| EP | 1 191 463 | 3/2002 |
| EP | 2 778 983 | 9/2014 |

(Continued)

OTHER PUBLICATIONS

Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.

(Continued)

*Primary Examiner* — Lalita M Hamilton
(74) *Attorney, Agent, or Firm* — Knobbe, Martens, Olson & Bear, LLP

(57) ABSTRACT

In various embodiments, systems, methods, and techniques are disclosed for generating a collection of clusters of related data from a seed. Seeds may be generated based on seed generation strategies or rules. Clusters may be generated by, for example, retrieving a seed, adding the seed to a first cluster, retrieving a clustering strategy or rules, and adding related data and/or data entities to the cluster based on the clustering strategy. Various cluster scores may be generated based on attributes of data in a given cluster. Further, cluster metascores may be generated based on various cluster scores associated with a cluster. Clusters may be ranked based on cluster metascores. Various embodiments may enable an analyst to discover various insights related to data clusters, and may be applicable to various tasks including, for example, tax fraud detection, beaconing malware detection, malware user-agent detection, and/or activity trend detection, among various others.

18 Claims, 31 Drawing Sheets

(56) References Cited

U.S. PATENT DOCUMENTS

| | | |
|---|---|---|
| 7,451,397 B2 | 11/2008 | Weber et al. |
| 7,783,658 B1 | 8/2010 | Bayliss |
| 7,805,457 B1 | 9/2010 | Viola et al. |
| 7,814,102 B2 | 10/2010 | Miller et al. |
| 8,024,778 B2 | 9/2011 | Cash et al. |
| 8,046,362 B2 | 10/2011 | Bayliss |
| 8,103,543 B1 | 1/2012 | Zwicky |
| 8,135,679 B2 | 3/2012 | Bayliss |
| 8,135,719 B2 | 3/2012 | Bayliss |
| 8,266,168 B2 | 9/2012 | Bayliss |
| 8,321,943 B1 | 11/2012 | Walters et al. |
| 8,347,398 B1 | 1/2013 | Weber |
| 8,447,674 B2 | 5/2013 | Choudhuri et al. |
| 8,484,168 B2 | 7/2013 | Bayliss |
| 8,495,077 B2 | 7/2013 | Bayliss |
| 8,498,969 B2 | 7/2013 | Bayliss |
| 8,600,872 B1 | 12/2013 | Yan |
| 8,739,278 B2 | 5/2014 | Varghese |
| 8,788,405 B1 | 7/2014 | Sprague et al. |
| 8,788,407 B1 | 7/2014 | Singh et al. |
| 8,818,892 B1 | 8/2014 | Sprague et al. |
| 2003/0097330 A1 | 5/2003 | Hillmer et al. |
| 2004/0205524 A1 | 10/2004 | Richter et al. |
| 2005/0222928 A1 | 10/2005 | Steier et al. |
| 2007/0192265 A1 | 8/2007 | Chopin et al. |
| 2007/0294200 A1 | 12/2007 | Au |
| 2008/0133567 A1 | 6/2008 | Ames et al. |
| 2009/0018940 A1 | 1/2009 | Wang et al. |
| 2009/0044279 A1 | 2/2009 | Crawford et al. |
| 2009/0083184 A1 | 3/2009 | Eisen |
| 2009/0125369 A1 | 5/2009 | Kloostra et al. |
| 2009/0192957 A1 | 7/2009 | Subramanian et al. |
| 2010/0077483 A1 | 3/2010 | Stolfo et al. |
| 2010/0125546 A1 | 5/2010 | Barrett et al. |
| 2010/0185691 A1 | 7/2010 | Irmak et al. |
| 2010/0306029 A1 | 12/2010 | Jolley |
| 2011/0087519 A1 | 4/2011 | Fordyce, III et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0231223 A1 | 9/2011 | Winters |
| 2011/0238510 A1 | 9/2011 | Rowen et al. |
| 2011/0238570 A1 | 9/2011 | Li et al. |
| 2011/0307382 A1 | 12/2011 | Siegel et al. |
| 2012/0084135 A1 | 4/2012 | Nissan et al. |
| 2012/0084866 A1 | 4/2012 | Stolfo |
| 2012/0215898 A1 | 8/2012 | Shah et al. |
| 2012/0266245 A1 | 10/2012 | McDougal et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0323829 A1 | 12/2012 | Stokes et al. |
| 2012/0330801 A1 | 12/2012 | McDougal et al. |
| 2013/0024307 A1 | 1/2013 | Fuerstenberg et al. |
| 2013/0024339 A1 | 1/2013 | Choudhuri et al. |
| 2013/0160120 A1 | 6/2013 | Malaviya et al. |
| 2013/0211985 A1 | 8/2013 | Clark et al. |
| 2013/0232045 A1 | 9/2013 | Tai et al. |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0310282 A1 | 10/2014 | Sprague et al. |

FOREIGN PATENT DOCUMENTS

| | | |
|---|---|---|
| WO | WO 2008/011728 | 1/2008 |
| WO | WO 2010/000014 | 1/2010 |
| WO | WO 2013/126281 | 8/2013 |

OTHER PUBLICATIONS

European Search Report in Application No. 14159535.5, dated May 22, 2014.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

Alfred, Rayner "Summarizing Relational Data Using Semi-Supervised Genetic Algorithm-Based Clustering Techniques", Journal of Computer Science, 2010, vol. 6, No. 7, pp. 775-784.

Official Communication in Great Britain Application No. 1404457.2 dated Aug. 14, 2014.

Official Communication in New Zealand Application No. 622181 dated Mar. 24, 2014.

US 8,712,906, 04/2014, Sprague et al. (withdrawn)

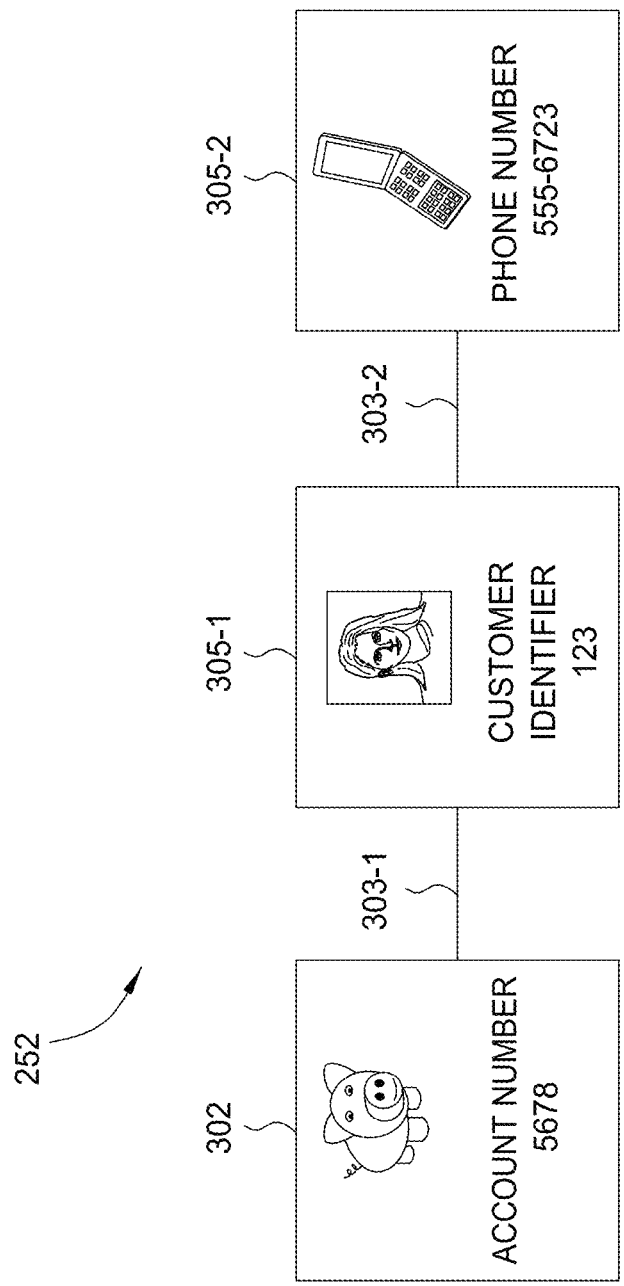

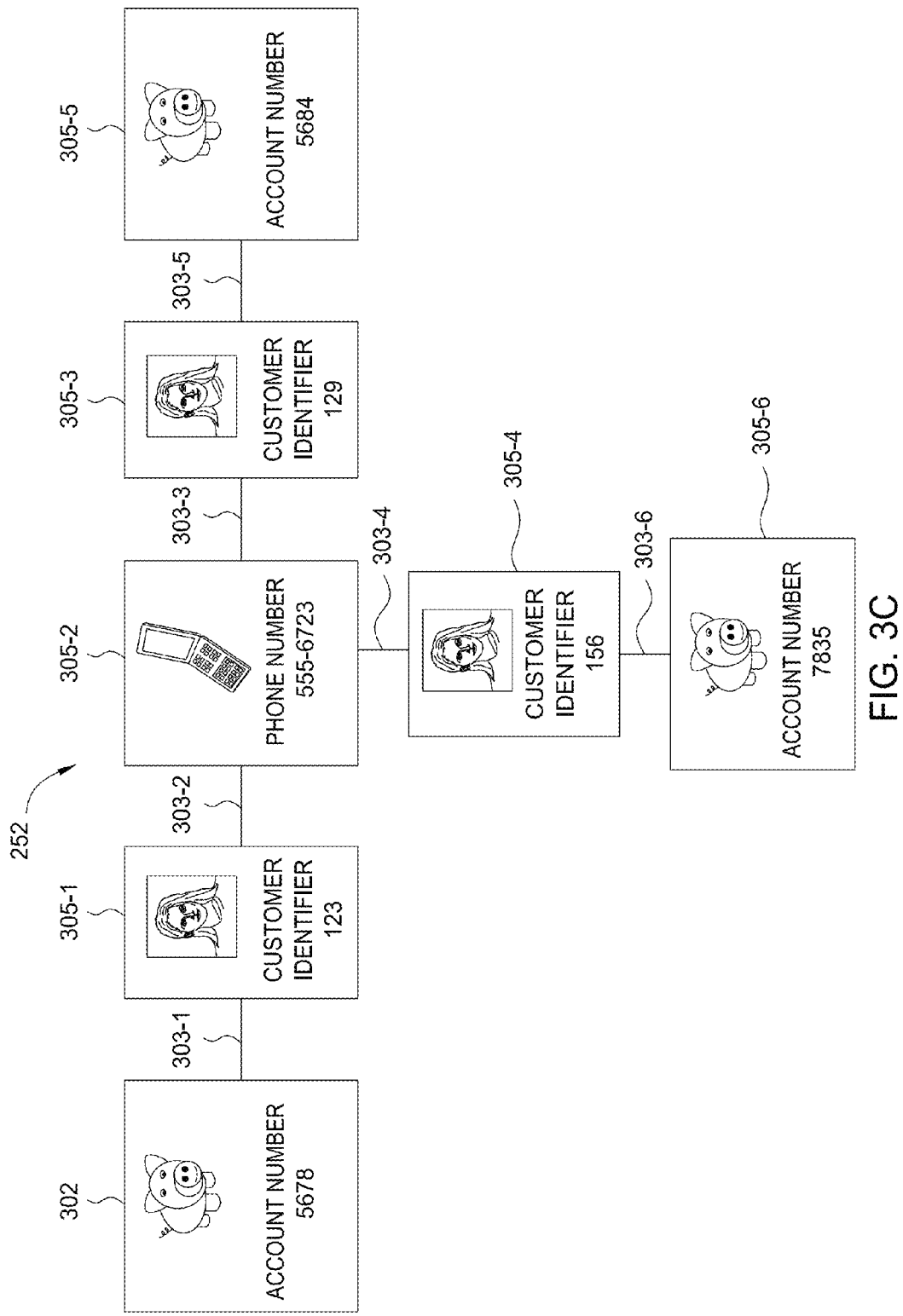

TREND DATA CLUSTERING

CROSS-REFERENCE TO RELATED APPLICATIONS

This application is a continuation-in-part of U.S. patent application Ser. No. 13/968,265, filed Aug. 15, 2013, titled "GENERATING DATA CLUSTERS WITH CUSTOMIZABLE ANALYSIS STRATEGIES," and is a continuation-in-part of U.S. patent application Ser. No. 13/968,213, filed Aug. 15, 2013, titled "PRIORITIZING DATA CLUSTERS WITH CUSTOMIZABLE SCORING STRATEGIES," each of which claims benefit of U.S. Provisional Patent Application No. 61/800,887, filed Mar. 15, 2013. Each of the above identified applications is hereby incorporated by reference herein in its entirety and for all purposes.

This application is also related to the following U.S. Patent Applications filed concurrently herewith: application Ser. No. 14/139,628, titled "TAX DATA CLUSTERING," application Ser. No. 14/139,603, titled "MALWARE DATA CLUSTERING," and application Ser. No. 14/139,713, titled "USER-AGENT DATA CLUSTERING." Each of the above identified applications is hereby incorporated by reference herein in its entirety and for all purposes.

TECHNICAL FIELD

Embodiments of the present disclosure generally relate to data analysis and, more specifically, to generating data clusters of related data entities with customizable analysis strategies.

BACKGROUND

In financial and security investigations an analyst may have to make decisions regarding data entities within a collection of data. For instance, the analyst could have to decide whether an account data entity represents a fraudulent bank account. However, an individual data entity oftentimes includes insufficient information for the analyst to make such decisions.

SUMMARY

The systems, methods, and devices described herein each have several aspects, no single one of which is solely responsible for its desirable attributes. Without limiting the scope of this disclosure, several non-limiting features will now be discussed briefly.

In the example noted above, the analyst may make better decisions based upon a collection of related data entities. For instance, two financial transactions may be related by an identical account identifier or two accounts belonging to one customer may be related by an identical customer identifier or other attribute (e.g., a shared phone number or address). Some currently available systems assist the analyst by identifying data entities that are directly related to an initial data entity. For example, the analyst could initiate an investigation with a single suspicious data entity or "seed," such as a fraudulent credit card account. If the analyst examined this data entity by itself, then the analyst would not observe any suspicious characteristics. However, the analyst could request a list of data entities related to the seed by a shared attribute, such as a customer identifier. In doing so, the analyst could discover an additional data entity, such as an additional credit card account, which relates to the original fraudulent account because of a shared customer identifier. The analyst could then mark the additional credit card account as potentially fraudulent, based upon the relationship of the shared customer identifier.

Although these systems can be very helpful in discovering related data entities, they typically require the analyst to manually repeat the same series of searches for many investigations. Repeating the same investigation process consumes time and resources, such that there are oftentimes more investigations than can be performed. Thus, analysts typically prioritize investigations based upon the characteristics of the seeds. However, there may be insignificant differences between the seeds, so the analyst may not be able to determine the correct priority for investigations. For instance, the analyst could have to choose between two potential investigations based upon separate fraudulent credit card accounts. One investigation could reveal more potentially fraudulent credit card accounts than the other, and therefore could be more important to perform. Yet, the characteristics of the two original credit card accounts could be similar, so the analyst would not be able to choose the more important investigation. Without more information, prioritizing investigations is difficult and error prone.

According to various embodiments, a data analysis system is disclosed in which clusters of related data entities may be generated from initial data entities, called "seeds." A data entity may include any data, information or thing, such as a person, a place, an organization, an account, a computer, an activity, and event, and the like. Seeds may be generated according to seed generation strategies, while clusters of related data entities may be generated based on those seeds and according to cluster generation strategies. The system may further generate a score, multiple scores, and/or metascores for each generated cluster, and may optionally rank or prioritize the generated clusters based on the generated metascores. High priority clusters may be of greater interest to an analyst as they may contain related data entities that meet particular criteria related to the analyst's investigation. In an embodiment, the system may enable an analyst to advantageously start an investigation with a prioritized cluster including many related data entities rather than a single randomly selected data entity.

In one embodiment, a method for generating a cluster of related data from a seed is disclosed. This method may generally include retrieving a seed and adding the seed to a first cluster. This method may further include retrieving a cluster strategy referencing one or more data bindings. Each data binding may specify a search protocol for retrieving data. For each of the one or more data bindings, data parameters input to the search protocol are identified, the search protocol is performed using the identified data parameters, and data returned by the search protocol is evaluated for inclusion in the first cluster.

In a particular embodiment, the search protocol for a first one of the data bindings uses the seed as the data parameters input to the search protocol. Further, the search protocol for a first one of the data bindings returns data used as the identified data parameters input to the search protocol for a second one of the data bindings. This process may iteratively continue until all data bindings in the search strategy have been executed for all available data obtained while growing the first cluster.

In a particular embodiment, this method may further include retrieving a second cluster from a plurality of clusters, comparing data from the first cluster to data from the second cluster, and determining whether to merge the first cluster and the second cluster based on the comparison.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

According to another embodiment, a computer system is disclosed that comprises: one or more computer readable storage devices configured to store: one or more software modules including computer executable instructions; a plurality of tax-related data items and properties associated with respective tax-related data items, each of the properties including associated property values, at least some of the tax-related data items including tax-return data items; a plurality of tax-fraud indicators; a clustering strategy; and at least one scoring criterion; and one or more hardware computer processors in communication with the one or more computer readable storage devices and configured to execute the one or more software modules in order to cause the computer system to: designate one or more seeds by: accessing, from the one or more computer readable storage devices, the tax-fraud indicators and at least one tax-related data item; comparing the tax-fraud indicators to the at least one tax-related data item and associated properties; and based on the comparison and in response to determining the at least one tax-related data item is related to at least one tax-fraud indicator, designating the at least one tax-related data item as a seed; for each designated seed, generate a cluster by: adding the seed to the cluster; adding one or more tax-return data items associated with the seed to the cluster; accessing, from the one or more computer readable storage devices, the clustering strategy; and adding to the cluster, based on the clustering strategy, one or more tax-related data items associated with the added tax-return data items; and score each generated cluster by: accessing, from the one or more computer readable storage devices, the least one scoring criterion; and generating a cluster score by assessing the generated cluster based on the accessed at least one scoring criterion.

According to yet another embodiment, a computer-implemented is disclosed that comprises: under control of one or more hardware computing devices configured with specific computer executable instructions, enabling communication with one or more computer readable storage devices configured to store: a plurality of tax-related data items and properties associated with respective tax-related data items, each of the properties including associated property values; a plurality of tax-fraud indicators; a clustering strategy; and at least one scoring criterion; designating one or more seeds by: accessing, from the one or more computer readable storage devices, the tax-fraud indicators and at least one tax-related data item; comparing the tax-fraud indicators to the at least one tax-related data item and associated properties; and based on the comparison and in response to determining the at least one tax-related data item is related to at least one tax-fraud indicator, designating the at least one tax-related data item as a seed; for each designated seed, generating a cluster by: adding the seed to the cluster; accessing, from the one or more computer readable storage devices, the clustering strategy; and adding to the cluster, based on the clustering strategy, one or more tax-related data items associated with the seed; and scoring each generated cluster by: accessing, from the one or more computer readable storage devices, the least one scoring criterion; and generating a cluster score by assessing the generated cluster based on the accessed at least one scoring criterion.

According to another embodiment, a non-transitory computer-readable storage medium is disclosed that stores computer-executable instructions that, when executed by a computer system, configure the computer system to perform operations comprising: enabling communication with one or more computer readable storage devices configured to store: a plurality of tax-related data items and properties associated with respective tax-related data items, each of the properties including associated property values; a plurality of tax-fraud indicators; a clustering strategy; and at least one scoring criterion; designating one or more seeds by: accessing, from the one or more computer readable storage devices, the tax-fraud indicators and at least one tax-related data item; comparing the tax-fraud indicators to the at least one tax-related data item and associated properties; and based on the comparison and in response to determining the at least one tax-related data item is related to at least one tax-fraud indicator, designating the at least one tax-related data item as a seed; for each designated seed, generating a cluster by: adding the seed to the cluster; accessing, from the one or more computer readable storage devices, the clustering strategy; and adding to the cluster, based on the clustering strategy, one or more tax-related data items associated with the seed; and scoring each generated cluster by: accessing, from the one or more computer readable storage devices, the least one scoring criterion; and generating a cluster score by assessing the generated cluster based on the accessed at least one scoring criterion.

According to yet another embodiment, a computer system is disclosed that comprises: one or more computer readable storage devices configured to store: one or more software modules including computer executable instructions; and a plurality of beaconing malware-related data items and properties associated with respective malware-related data items, each of the properties including associated property values, the beaconing malware-related data items including at least one of: data items associated with captured communications between an internal network and an external network, users of particular computerized devices, internal Internet Protocol addresses, external Internet Protocol addresses, external domains, internal computerized devices, external computerized devices, data feed items, or host-based events; and one or more hardware computer processors in communication with the one or more computer readable storage devices and configured to execute the one or more software modules in order to cause the computer system to: access, from the one or more computer readable storage devices, the plurality of beaconing malware-related data items; generate, based on the accessed beaconing malware-related data items, a plurality of connection pairs, each of the connection pairs indicating communications between a particular internal source within the internal network and a particular external destination that is not within the internal network; identify a plurality of connection pairs having a common internal source and a common external destination; generate a time series of connection pairs based on the identified plurality of connection pairs; filter out noise from the at least one time series; compute a variance in the filtered at least one time series; and based on a determination that the variance satisfies a particular threshold, designate a connection pair associated with the filtered at least one time series as a seed, the designated connection pair including the common internal source and the common external source; generate a data item cluster based on the designated seed; and score the generated data item cluster.

According to another embodiment, a computer-implemented is disclosed that comprises: under control of one or more hardware computing devices configured with specific computer executable instructions, enabling communication with one or more computer readable storage devices configured to store: a plurality of beaconing malware-related data items and properties associated with respective malware-related data items, each of the properties including associated property values, the beaconing malware-related data items including at least one data item associated with captured communications between an internal network and an external network; accessing, from the one or more computer readable storage devices, the plurality of beaconing malware-related data items; generating, based on the accessed beaconing malware-related data items, a plurality of connection pairs, each of the connection pairs indicating communications between a particular internal source within the internal network and a particular external destination that is not within the internal network; identifying a plurality of connection pairs having a common internal source and a common external destination; generating a time series of connection pairs based on the identified plurality of connection pairs; filtering out noise from the at least one time series; computing a variance in the filtered at least one time series; and based on a determination that the variance satisfies a particular threshold, designating a connection pair associated with the filtered at least one time series as a seed, the designated connection pair including the common internal source and the common external source; generating a data item cluster based on the designated seed; and scoring the generated data item cluster.

According to yet another embodiment, a non-transitory computer-readable storage medium is disclosed that stores computer-executable instructions that, when executed by a computer system, configure the computer system to perform operations comprising: enabling communication with one or more computer readable storage devices configured to store: a plurality of beaconing malware-related data items and properties associated with respective malware-related data items, each of the properties including associated property values, the beaconing malware-related data items including at least one data item associated with captured communications between an internal network and an external network; accessing, from the one or more computer readable storage devices, the plurality of beaconing malware-related data items; generating, based on the accessed beaconing malware-related data items, a plurality of connection pairs, each of the connection pairs indicating communications between a particular internal source within the internal network and a particular external destination that is not within the internal network; identifying a plurality of connection pairs having a common internal source and a common external destination; generating a time series of connection pairs based on the identified plurality of connection pairs; filtering out noise from the at least one time series; computing a variance in the filtered at least one time series; and based on a determination that the variance satisfies a particular threshold, designating a connection pair associated with the filtered at least one time series as a seed, the designated connection pair including the common internal source and the common external source; generating a data item cluster based on the designated seed; and scoring the generated data item cluster.

According to another embodiment, a computer system is disclosed that comprises: one or more computer readable storage devices configured to store: one or more software modules including computer executable instructions; and a plurality of user-agent-related data items and properties associated with respective user-agent-related data items, each of the properties including associated property values, the user-agent-related data items including at least one of: data items associated with captured communications between an internal network and an external network, user-agent strings, users of particular computerized devices, internal Internet Protocol addresses, external Internet Protocol addresses, external domains, internal computerized devices, external computerized devices, data feed items, or host-based events; and one or more hardware computer processors in communication with the one or more computer readable storage devices and configured to execute the one or more software modules in order to cause the computer system to: designate one or more seeds by: accessing, from the one or more computer readable storage devices, a plurality of user-agent-related data items associated with the captured communications; filtering the accessed data items to remove data items that are unlikely to be related to malware activity; determining a first set of filtered data items associated with a test time period and a second set of filtered data items associated with a reference time period; and identifying one or more filtered data items in the first set that are not included among the filtered data items in the second set and designating each of the one or more identified filtered data items as a seed; and for each designated seed: generate a data item cluster; and score the generated data item cluster.

According to yet another embodiment, a computer-implemented is disclosed that comprises: under control of one or more hardware computing devices configured with specific computer executable instructions, enabling communication with one or more computer readable storage devices configured to store: a plurality of user-agent-related data items and properties associated with respective user-agent-related data items, each of the properties including associated property values; designating one or more seeds by: accessing, from the one or more computer readable storage devices, a plurality of user-agent-related data items associated with the captured communications; filtering the accessed data items to remove data items that are unlikely to be related to malware activity; determining a first set of filtered data items associated with a test time period and a second set of filtered data items associated with a reference time period; and identifying one or more filtered data item in the first set that are not included among the filtered data items in the second set and designating each of the one or more identified filtered data items as a seed; and for each designated seed: generating a data item cluster; and scoring the generated data item cluster.

According to another embodiment, a non-transitory computer-readable storage medium is disclosed that stores computer-executable instructions that, when executed by a computer system, configure the computer system to perform operations comprising: enabling communication with one or more computer readable storage devices configured to store: a plurality of user-agent-related data items and properties associated with respective user-agent-related data items, each of the properties including associated property values; designating one or more seeds by: accessing, from the one or more computer readable storage devices, a plurality of user-agent-related data items associated with the captured communications; filtering the accessed data items to remove data items that are unlikely to be related to malware activity; determining a first set of filtered data items associated with a test time period and a second set of filtered data items associated with a reference time period; and identifying one or more filtered data item in the first set that are not included among the filtered data items in the second set and designating each of the one or more identified filtered data items as a seed; and for each designated seed: generating a data item cluster; and scoring the generated data item cluster.

According to yet another embodiment, a computer system is disclosed that comprises: one or more computer readable storage devices configured to store: one or more software modules including computer executable instructions; and a plurality of activity trend-related data items and properties associated with respective trend-related data items, each of the properties including associated property values, the activity trend-related data items including at least one of: host-based events, data items associated with captured host-based events, Internet Protocol addresses, external domains, users, or computerized devices, wherein hosts comprise computerized devices in a network; and one or more hardware computer processors in communication with the one or more computer readable storage devices and configured to execute the one or more software modules in order to cause the computer system to: designate one or more seeds by: accessing, from the one or more computer readable storage devices, a plurality of activity trend-related data items associated with the host-based events; determining a group of the plurality of activity trend-related data items each indicating a same particular activity type and associated with a particular host; determining, based on the group of activity trend-related data items, a statistical deviation in the particular type of activity on the particular host; and in response to determining that the statistical deviation satisfies a particular threshold, designating an activity trend-related data item from the group as a seed; and for each designated seed: generate a data item cluster; and score the generated data item cluster.

According to another embodiment, a computer-implemented is disclosed that comprises: under control of one or more hardware computing devices configured with specific computer executable instructions, enabling communication with one or more computer readable storage devices configured to store: a plurality of activity trend-related data items and properties associated with respective trend-related data items, each of the properties including associated property values; designating one or more seeds by: accessing, from the one or more computer readable storage devices, a plurality of activity trend-related data items associated with the host-based events; determining a group of the plurality of activity trend-related data items each indicating a same particular activity type and associated with a particular host; determining, based on the group of activity trend-related data items, a statistical deviation in the particular type of activity on the particular host; and in response to determining that the statistical deviation satisfies a particular threshold, designating an activity trend-related data item from the group as a seed; and for each designated seed: generating a data item cluster; and scoring the generated data item cluster.

According to yet another embodiment, a non-transitory computer-readable storage medium is disclosed that stores computer-executable instructions that, when executed by a computer system, configure the computer system to perform operations comprising: enabling communication with one or more computer readable storage devices configured to store: a plurality of activity trend-related data items and properties associated with respective trend-related data items, each of the properties including associated property values; designating one or more seeds by: accessing, from the one or more computer readable storage devices, a plurality of activity trend-related data items associated with the host-based events; determining a group of the plurality of activity trend-related data items each indicating a same particular activity type and associated with a particular host; determining, based on the group of activity trend-related data items, a statistical deviation in the particular type of activity on the particular host; and in response to determining that the statistical deviation satisfies a particular threshold, designating an activity trend-related data item from the group as a seed; and for each designated seed: generating a data item cluster; and scoring the generated data item cluster.

Advantageously, according to various embodiments, the disclosed techniques provide a more effective starting point for an investigation of financial, security, and/or other data entities. An analyst may be able to start an investigation from a cluster of related data entities instead of an individual data entity, which may reduce the amount of time and effort required to perform the investigation. The disclosed techniques may also, according to various embodiments, provide a prioritization of multiple clusters. For example, the analyst may also able to start the investigation from a high priority cluster, which may allow the analyst to focus on the most important investigations.

BRIEF DESCRIPTION OF THE DRAWINGS

So that the manner in which the above recited features of the present invention may be understood in detail, a more particular description of various embodiments, briefly summarized above, may be had by reference to the appended drawings and detailed description. It is to be noted, however, that the appended drawings illustrate only typical embodiments of present disclosure and are therefore not to be considered limiting of its scope, for present disclosure may admit to other equally effective embodiments.

FIGS. 3A-3C illustrate an example growth of a cluster of related data entities, according to an embodiment of the present disclosure.

Example Application of the Data Analysis System to Tax Fraud Detection

Figure 10A:
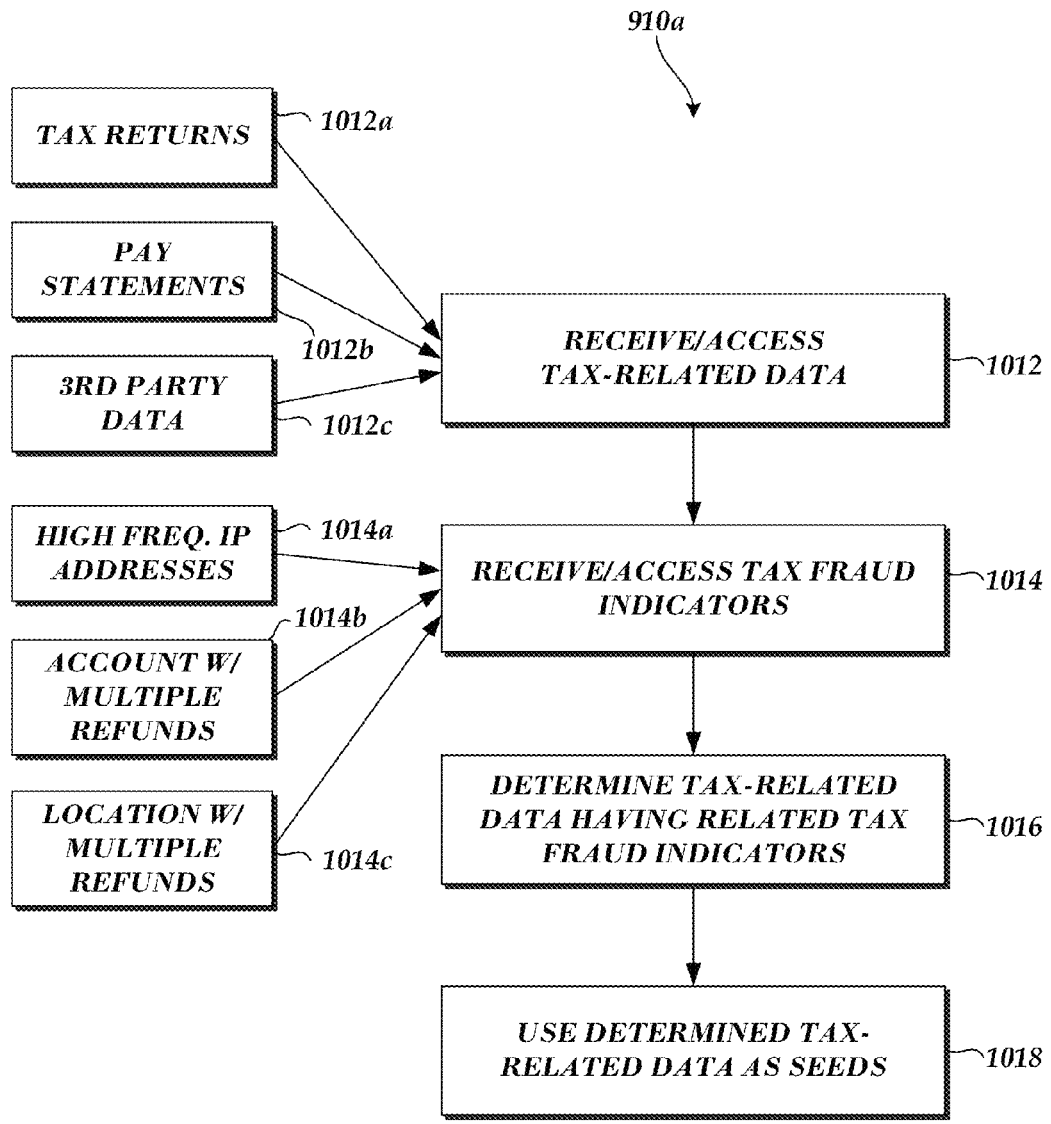

FIG. 10A is a flowchart of an example of a seed generation method of the data analysis system as applied to tax fraud detection, according to various embodiments of the present disclosure.

Figure 10B:
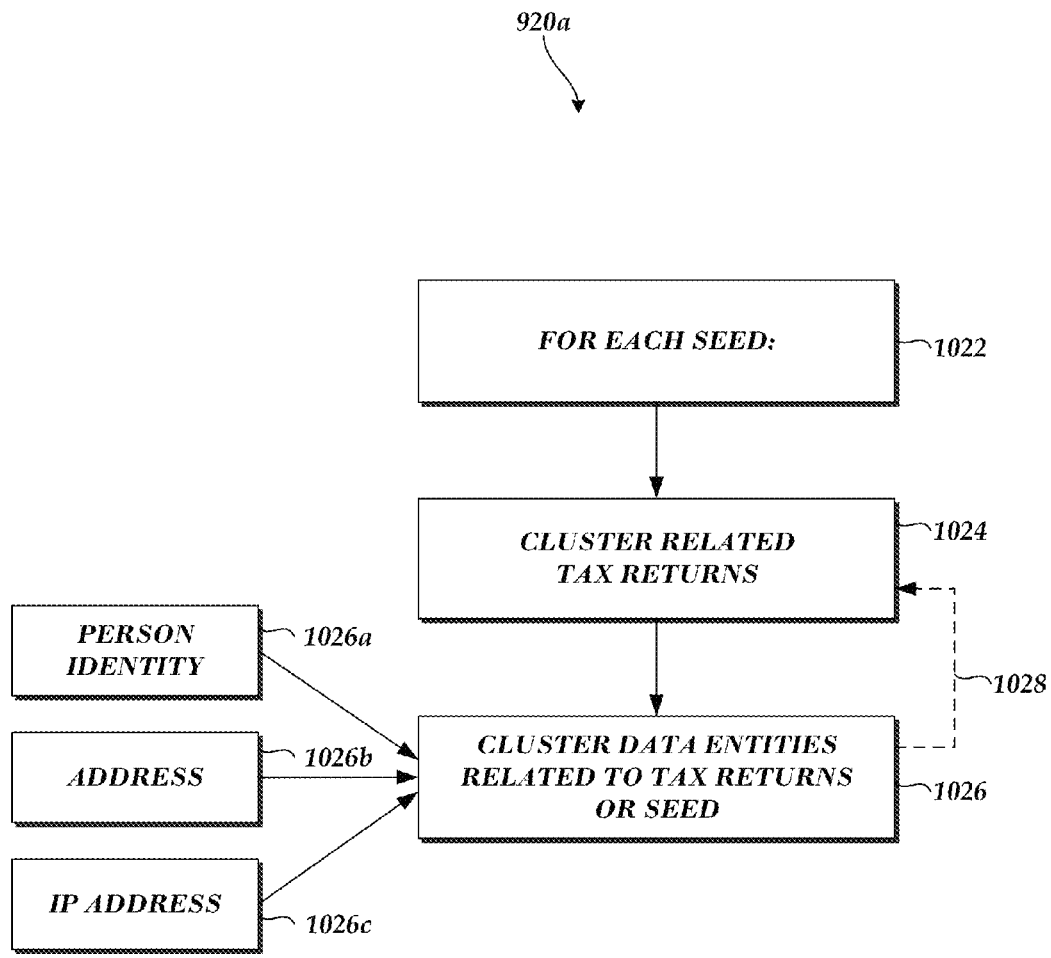

FIG. 10B is a flowchart of an example of a clustering method of the data analysis system as applied to tax fraud detection, according to various embodiments of the present disclosure.

FIG. 10O is a flowchart of example cluster scoring methods of the data analysis system as applied to tax fraud detection, according to various embodiments of the present disclosure.

Figure 10C:
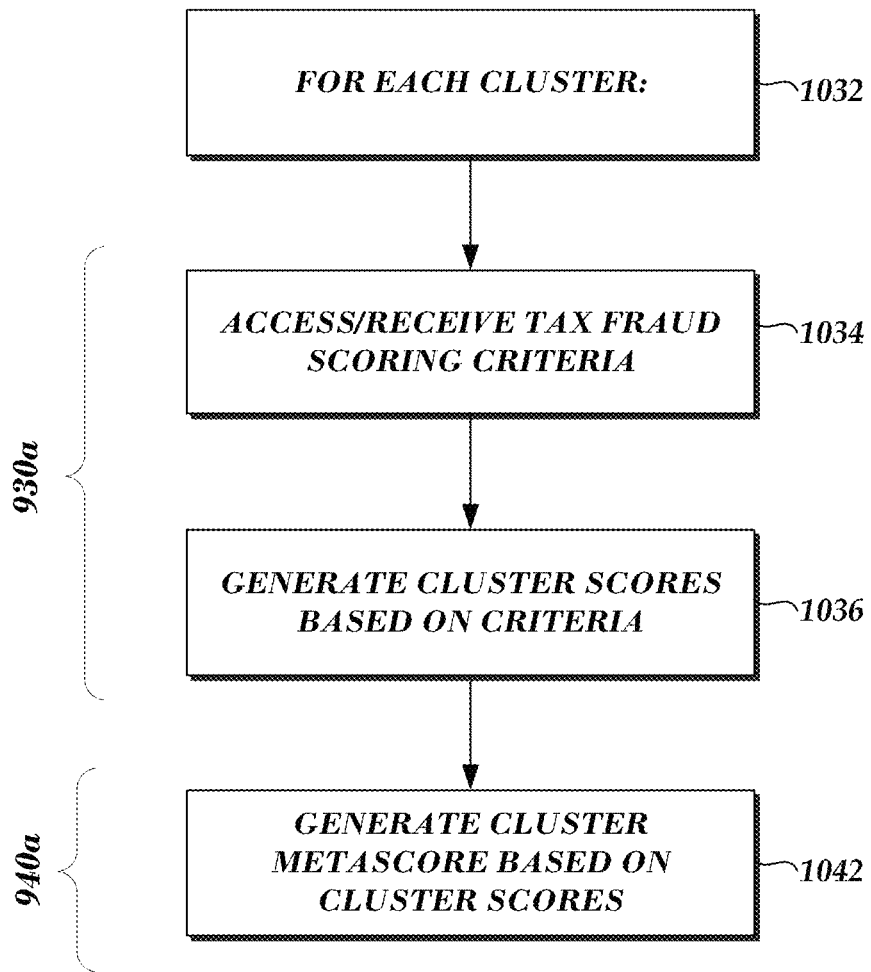
Figure 10D:
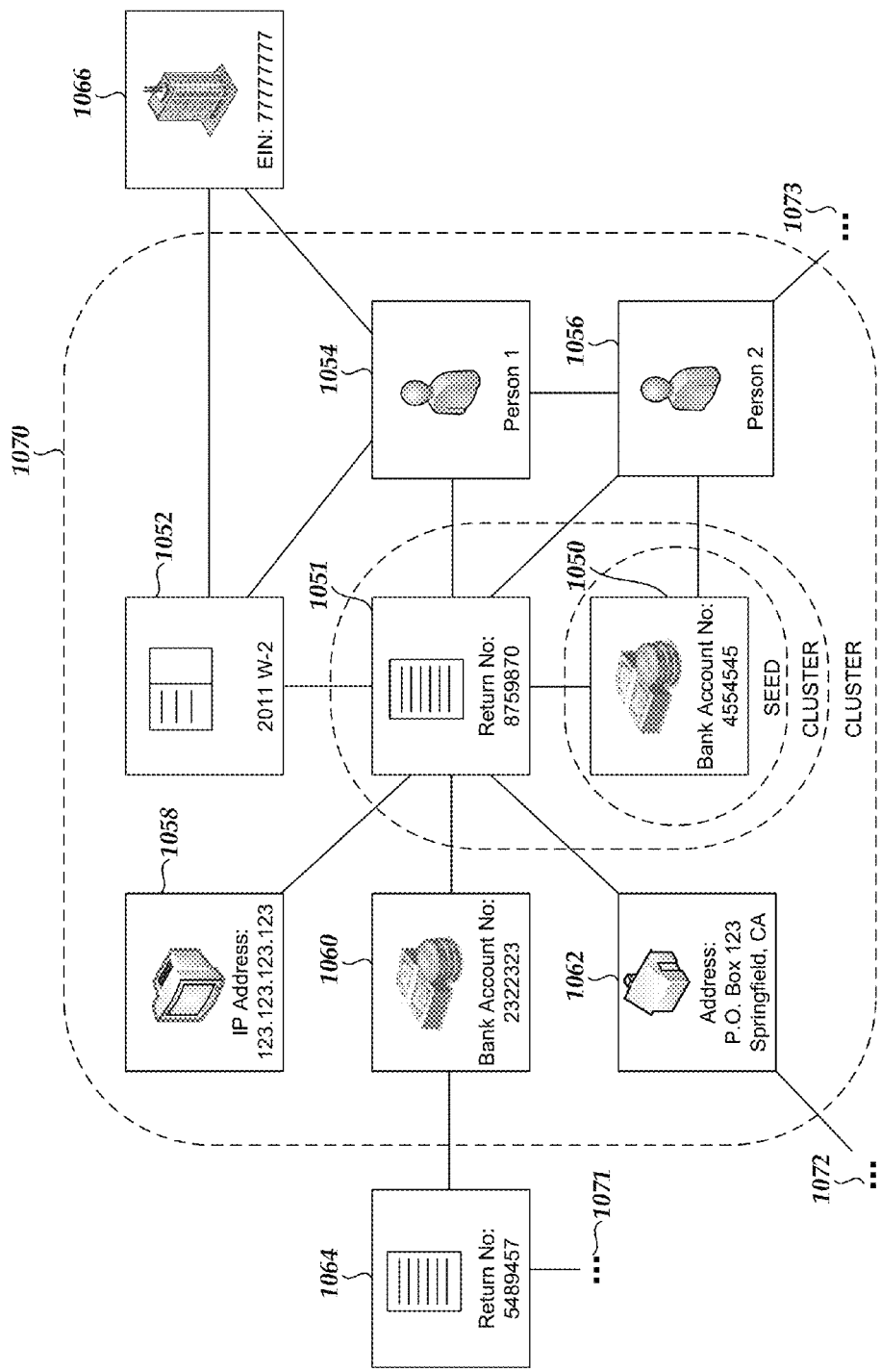

FIG. 10D illustrates an example growth of a cluster of related data entities in a tax fraud detection application, according to an embodiment of the present disclosure.

Figure 10E:
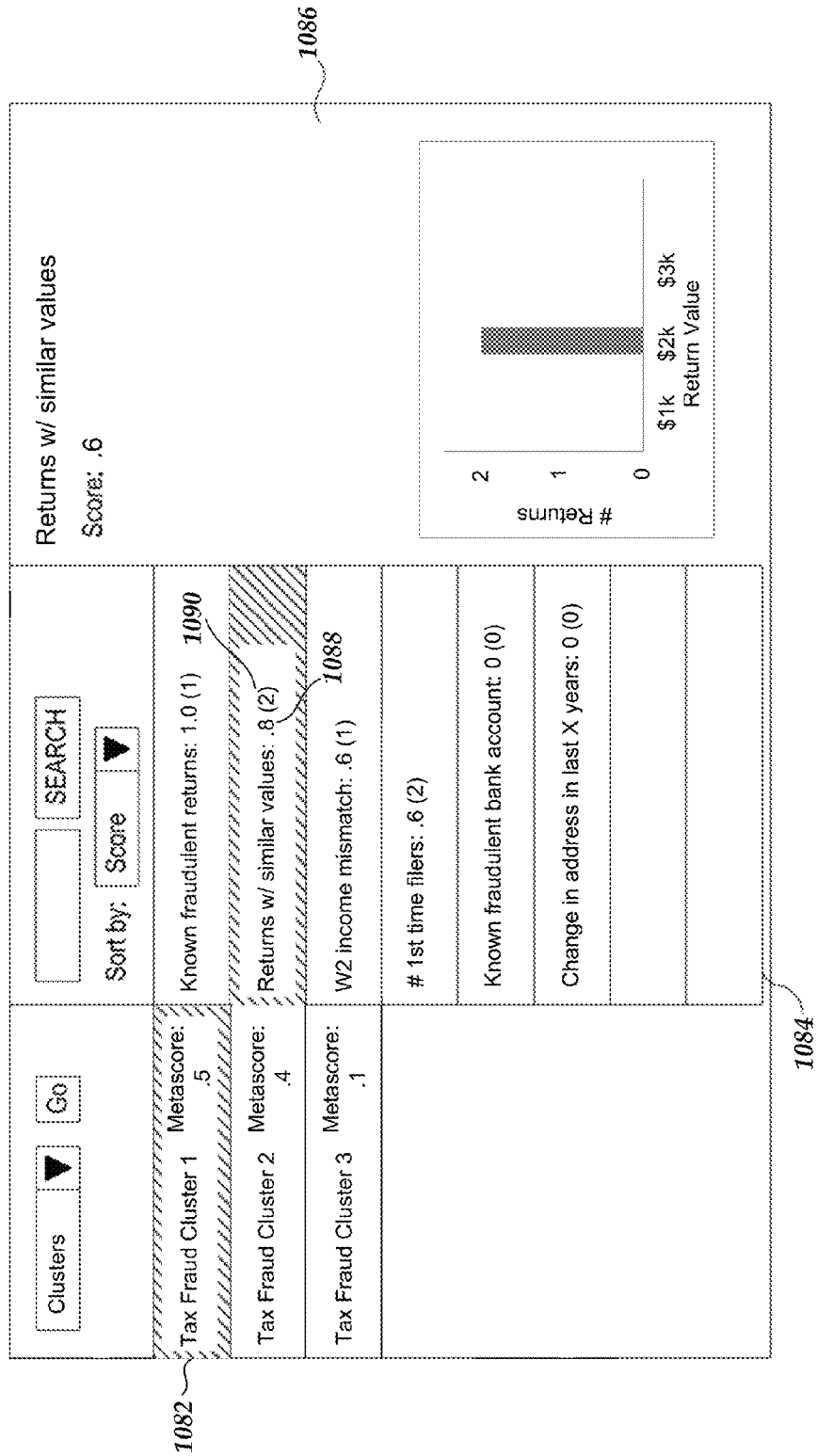

FIG. 10E illustrates an example cluster analysis user interface of the data analysis system as applied to tax fraud detection, according to an embodiment of the present disclosure.

Example Application of the Data Analysis System to Beaconing Malware Detection

Figure 11A:
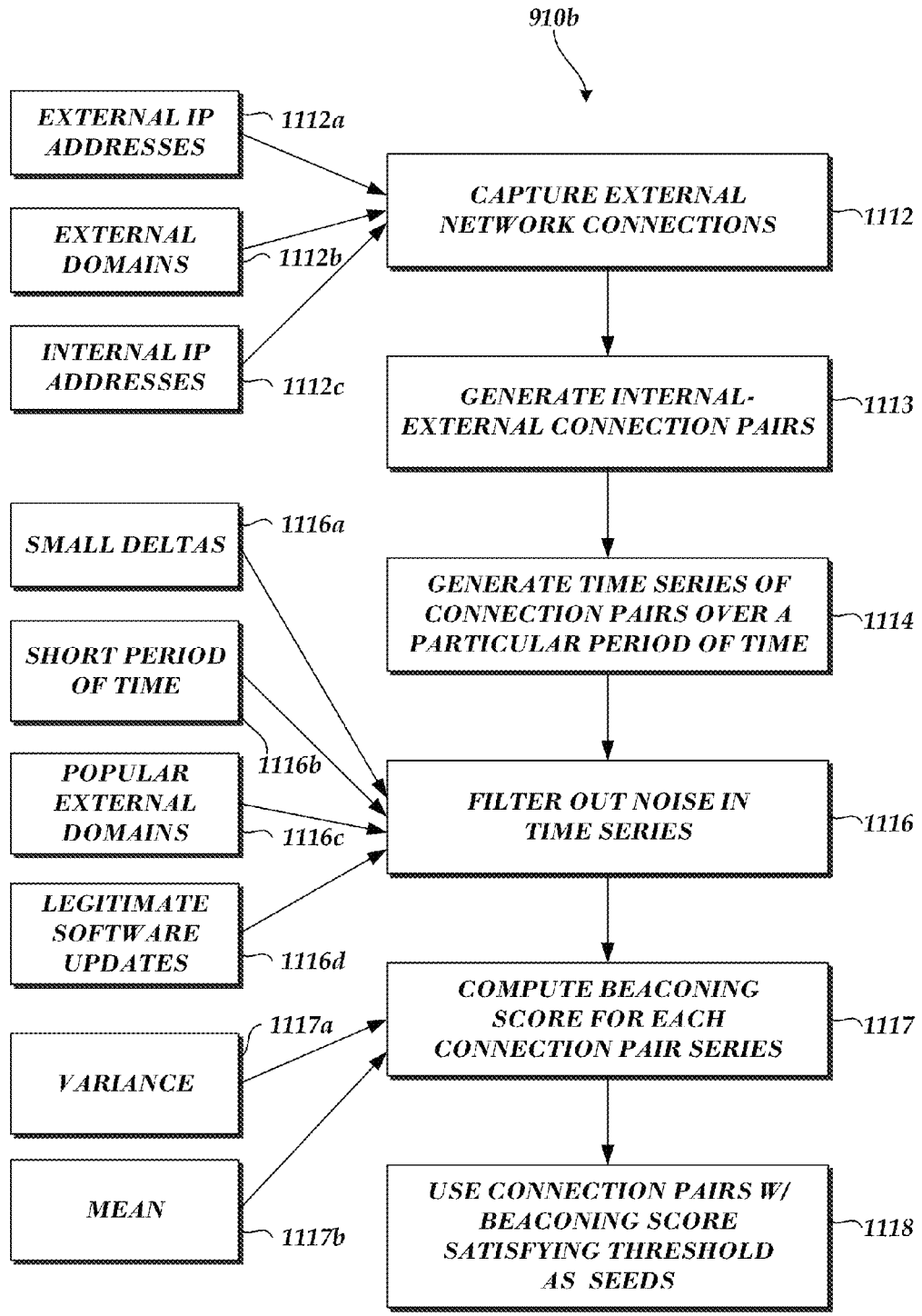

FIG. 11A is a flowchart of an example of a seed generation method of the data analysis system as applied to beaconing malware detection, according to various embodiments of the present disclosure.

Figure 11B:
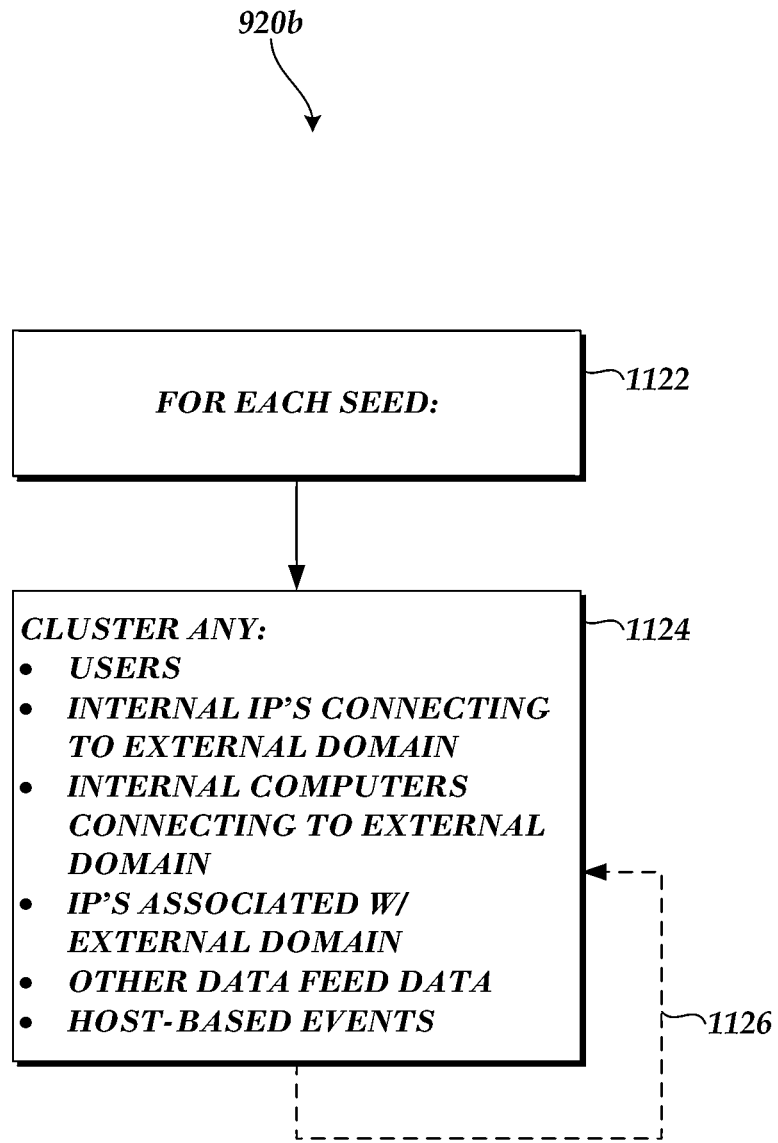

FIG. 11B is a flowchart of an example of a clustering method of the data analysis system as applied to beaconing malware detection, according to various embodiments of the present disclosure.

Figure 11C:
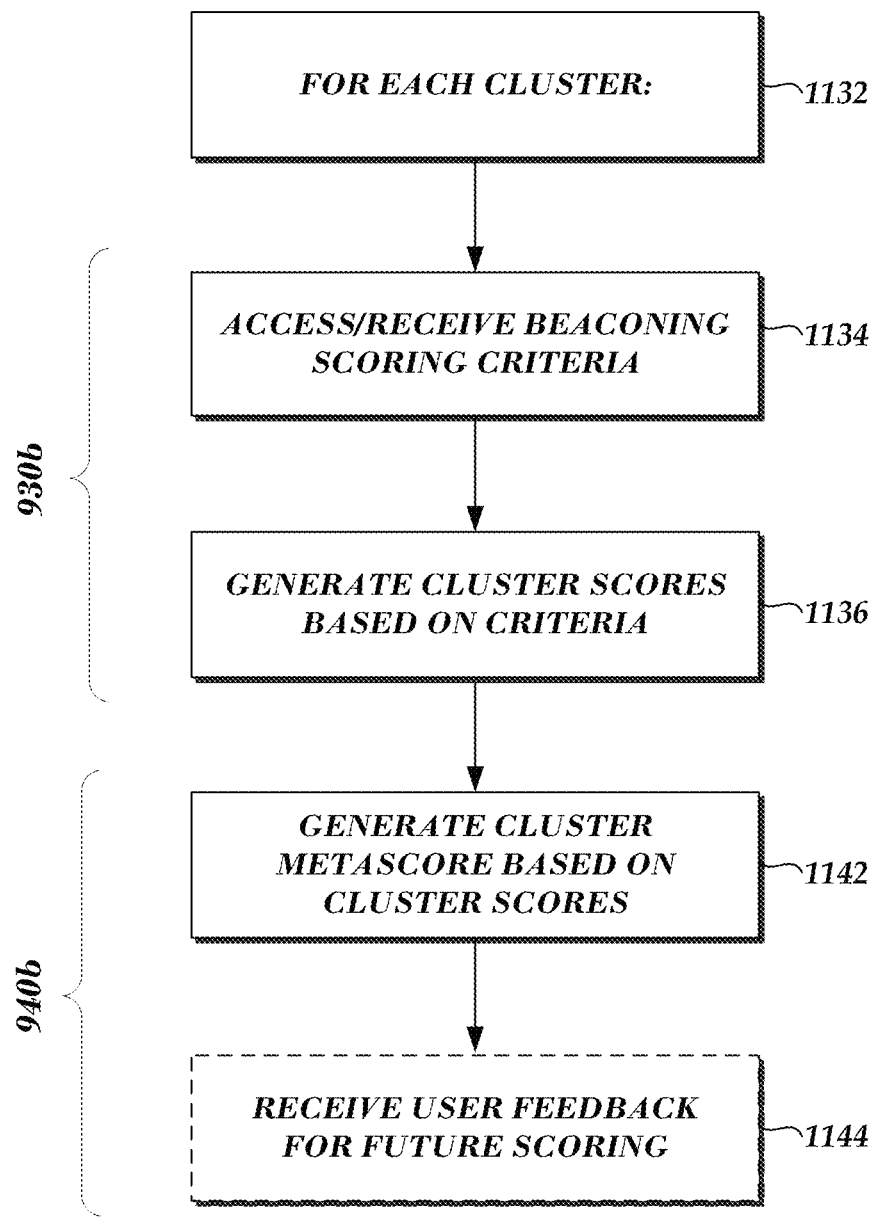

FIG. 11C is a flowchart of example cluster scoring methods of the data analysis system as applied to beaconing malware detection, according to various embodiments of the present disclosure.

Figure 11D:
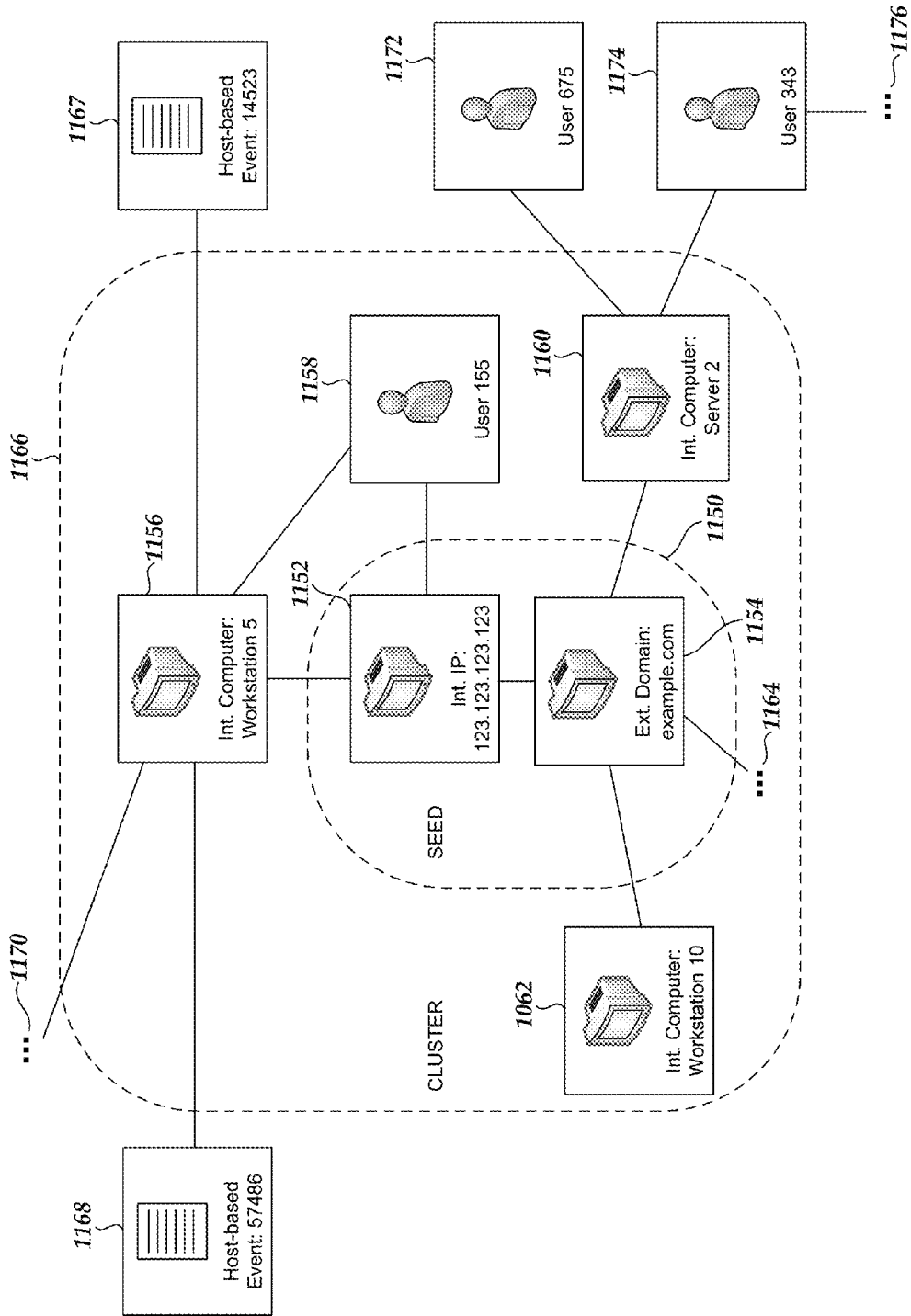

FIG. 11D illustrates an example growth of a cluster of related data entities in a beaconing malware detection application, according to an embodiment of the present disclosure.

Figure 11E:
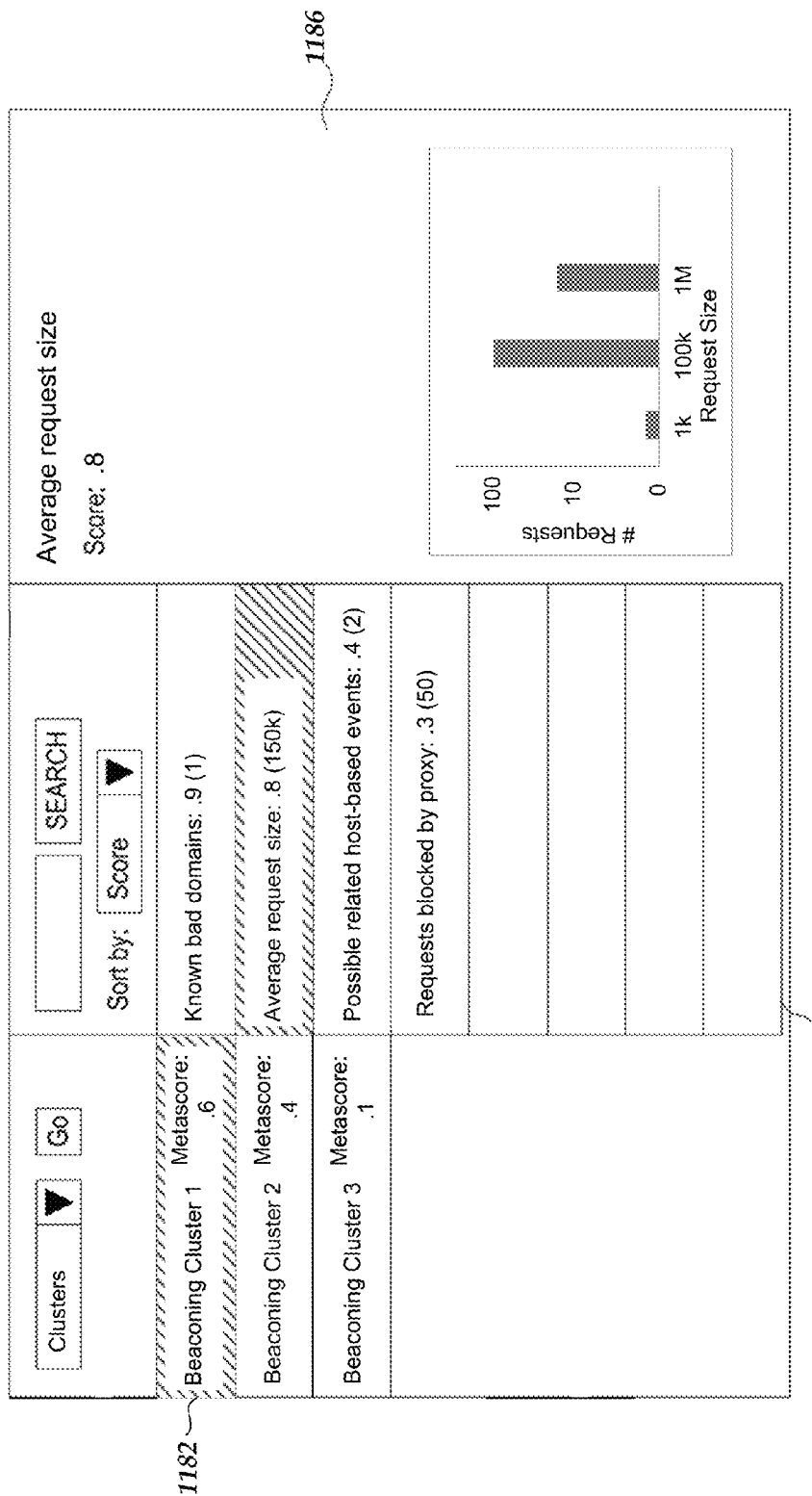

FIG. 11E illustrates an example cluster analysis user interface of the data analysis system as applied to beaconing malware detection, according to an embodiment of the present disclosure.

Example Application of the Data Analysis System to Malware User-Agent Detection

Figure 12A:
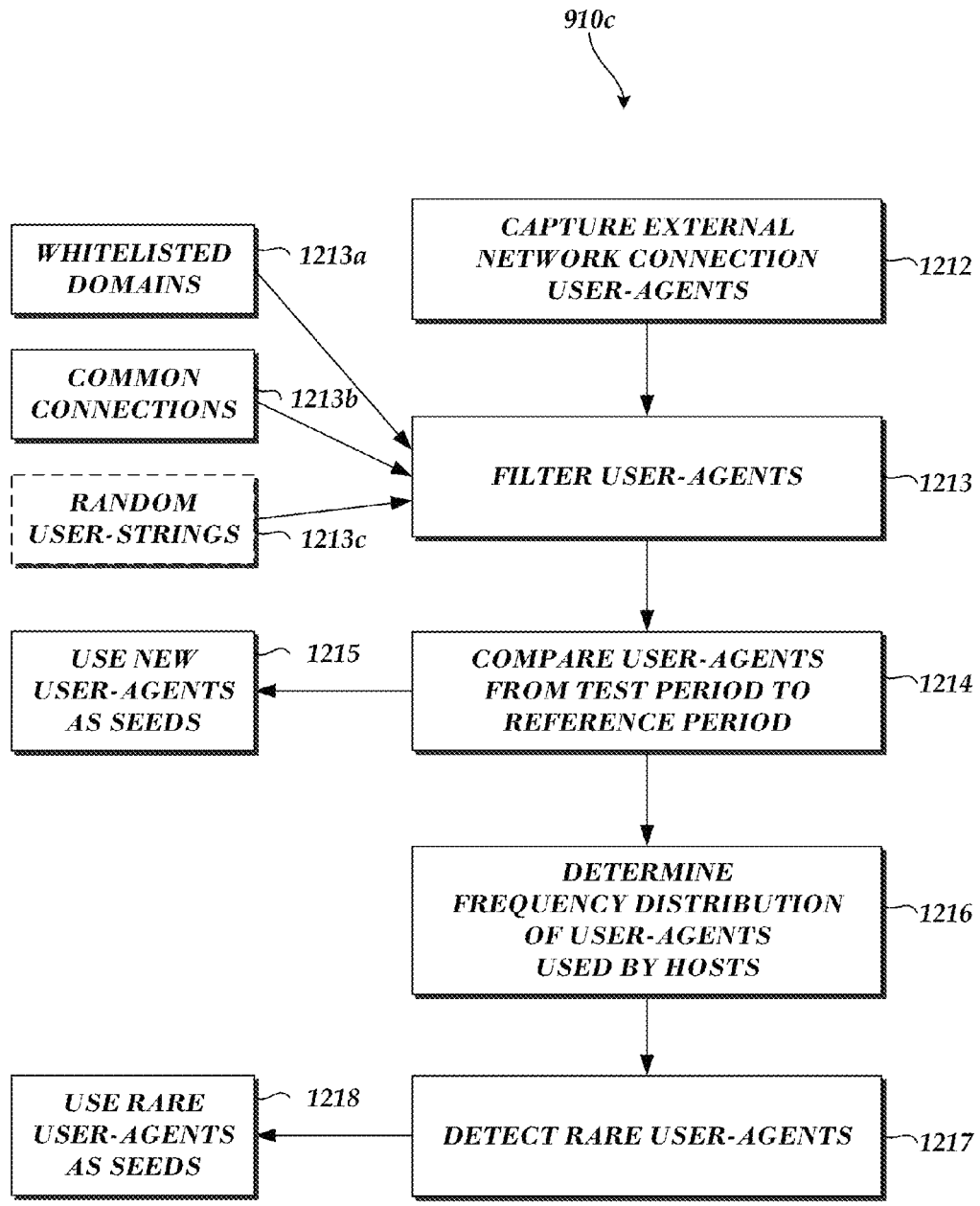

FIG. 12A is a flowchart of an example of a seed generation method of the data analysis system as applied to malware user-agent detection, according to various embodiments of the present disclosure.

Figure 12B:
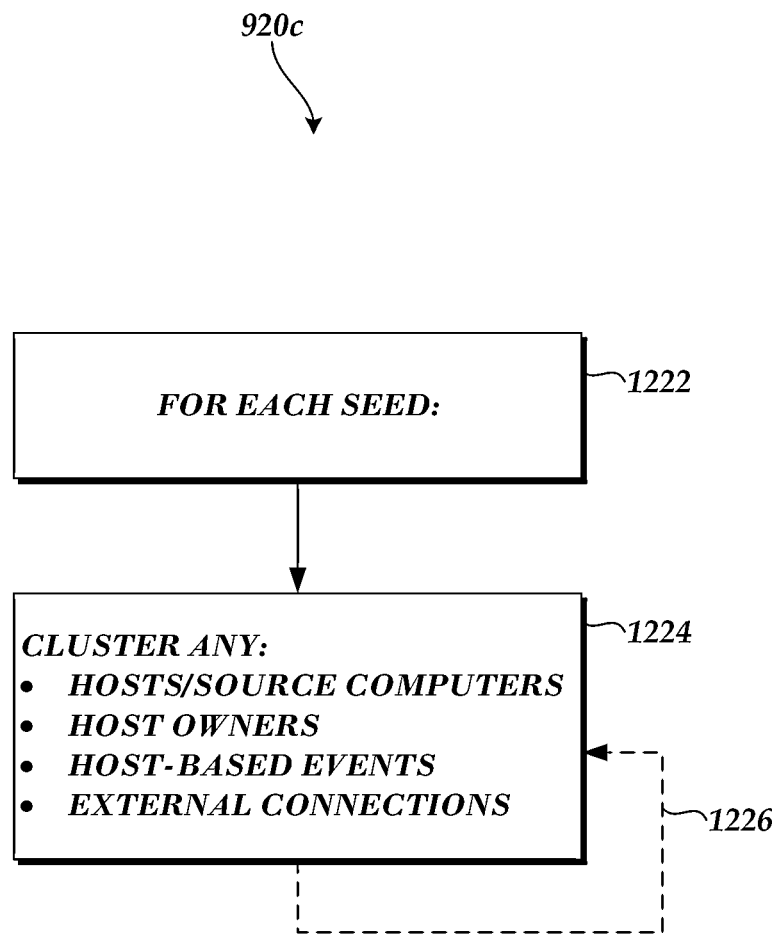

FIG. 12B is a flowchart of an example of a clustering method of the data analysis system as applied to malware user-agent detection, according to various embodiments of the present disclosure.

Figure 12C:
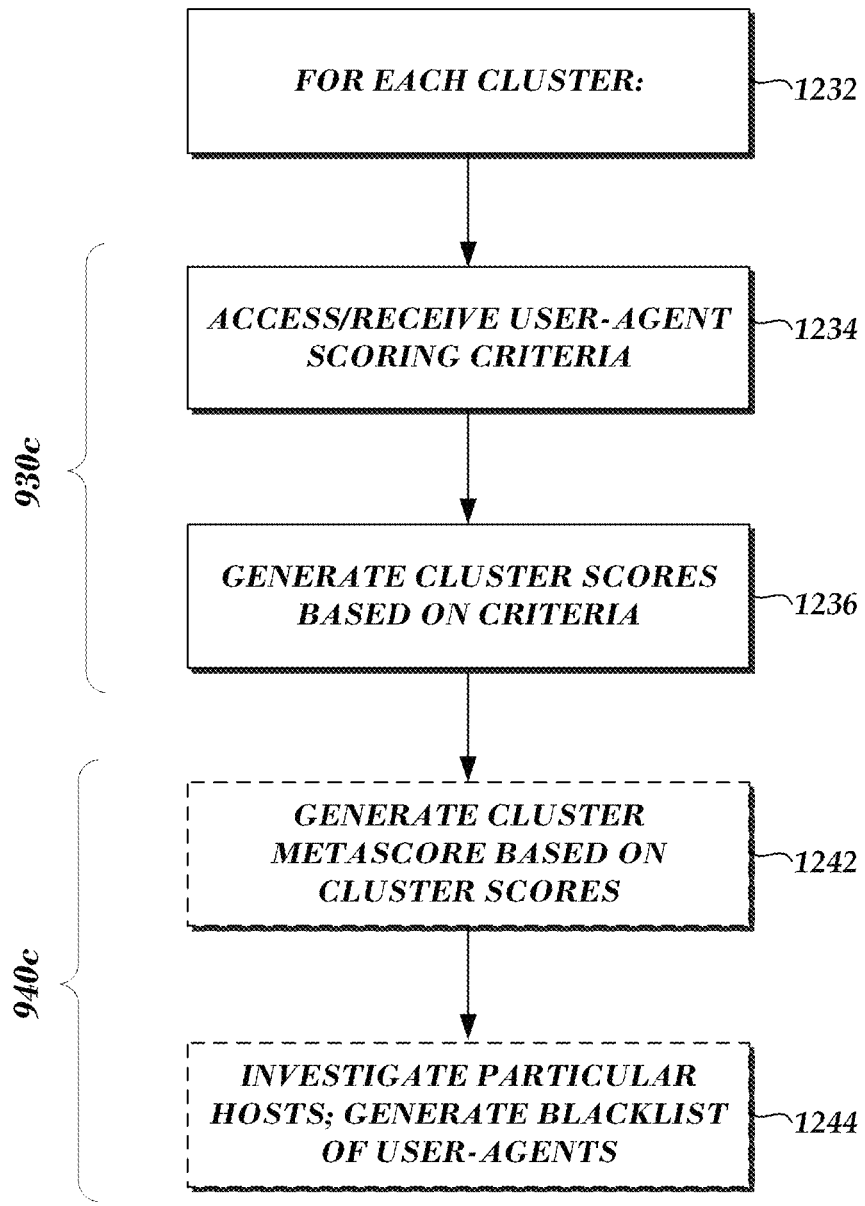

FIG. 12C is a flowchart of example cluster scoring methods of the data analysis system as applied to malware user-agent detection, according to various embodiments of the present disclosure.

Figure 12D:
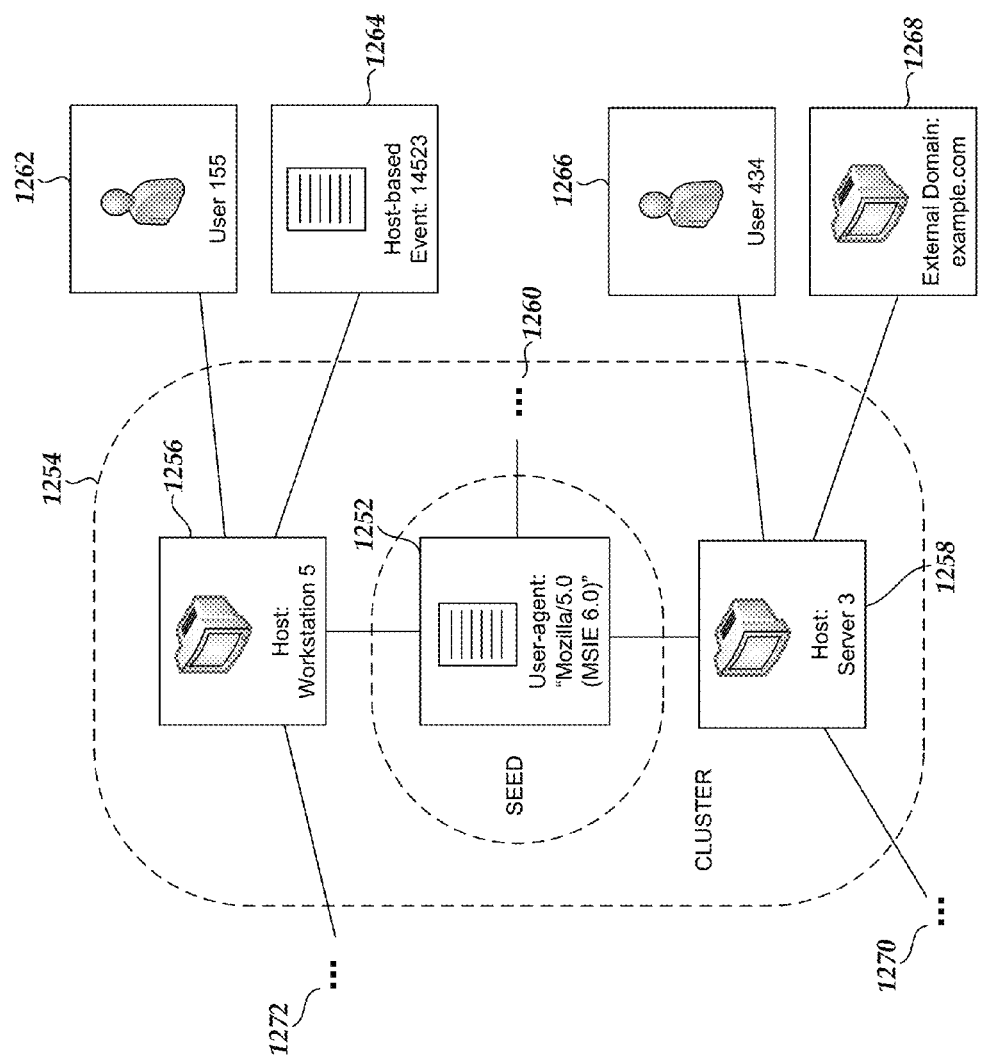

FIG. 12D illustrates an example growth of a cluster of related data entities in a malware user-agent detection application, according to an embodiment of the present disclosure.

Figure 12E:
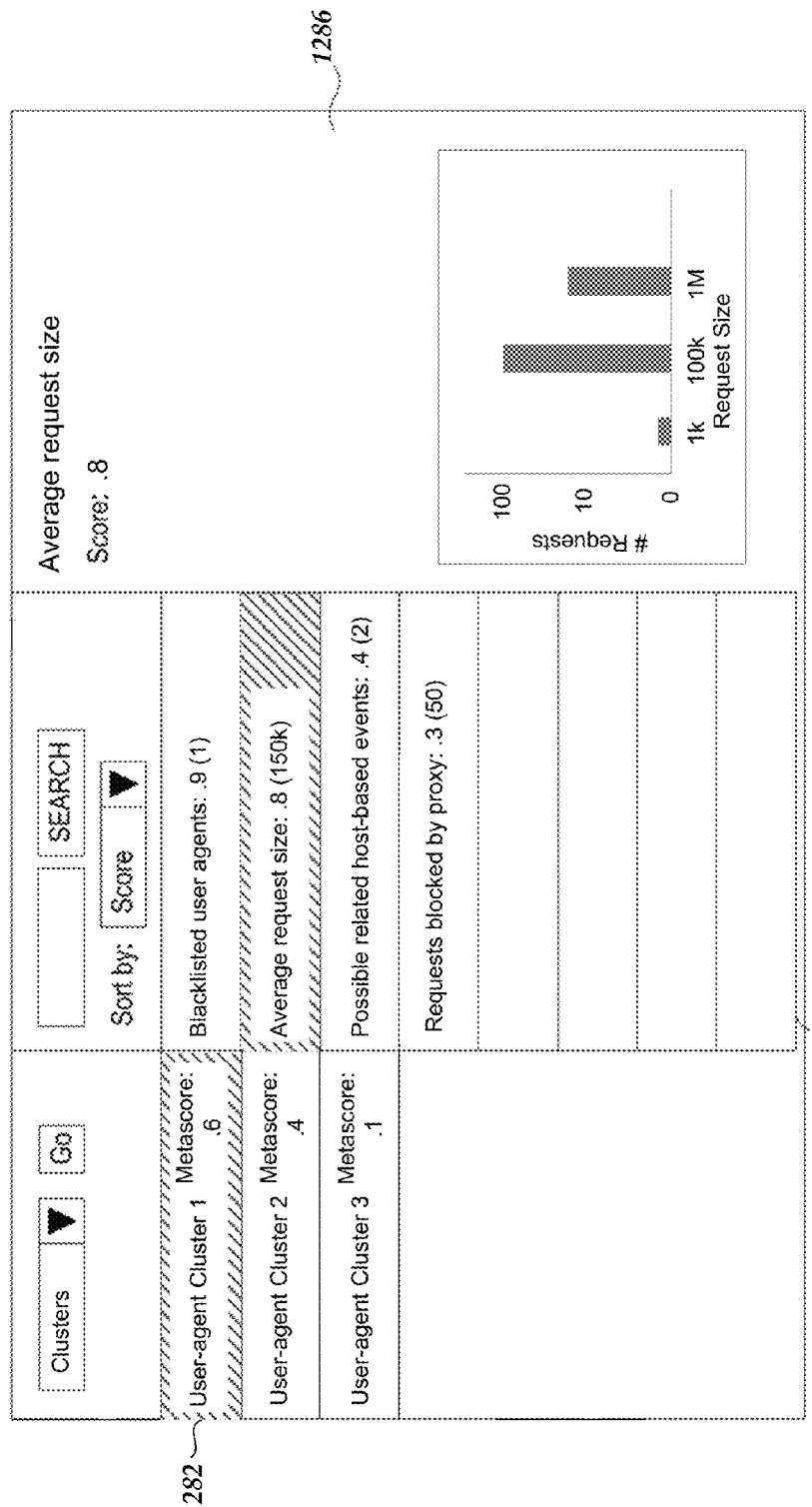

FIG. 12E illustrates an example cluster analysis user interface of the data analysis system as applied to malware user-agent detection, according to an embodiment of the present disclosure.

Example Application of the Data Analysis System to Activity Trend Detection

Figure 13A:
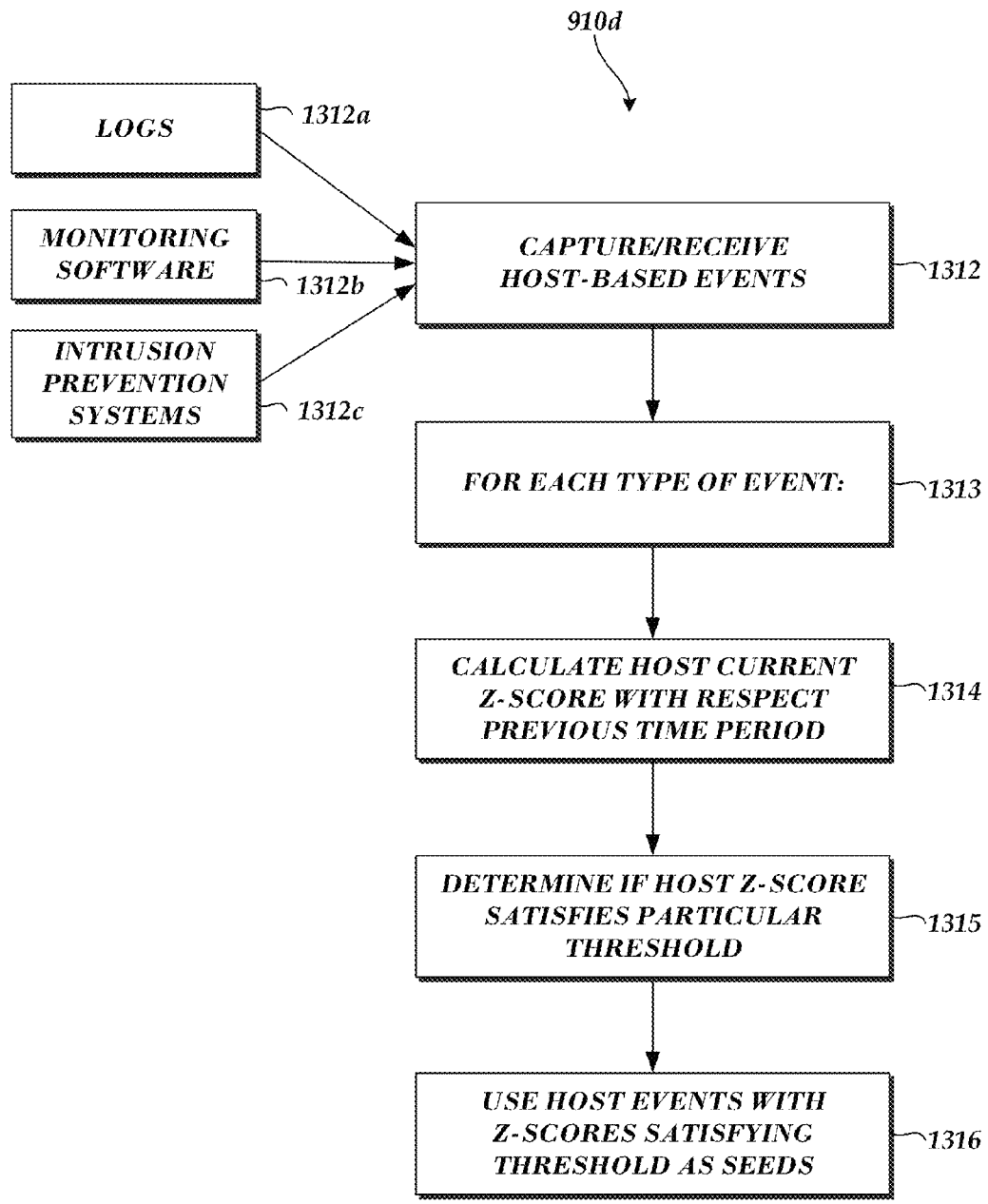

FIG. 13A is a flowchart of an example of a seed generation method of the data analysis system as applied to activity trend detection, according to various embodiments of the present disclosure.

Figure 13B:
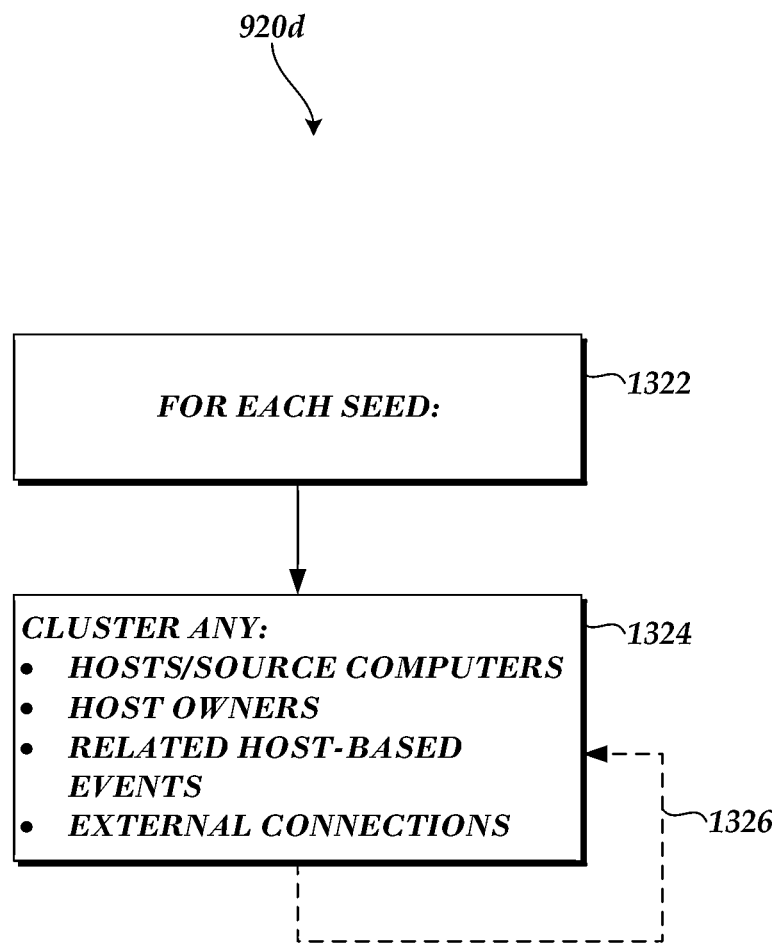

FIG. 13B is a flowchart of an example of a clustering method of the data analysis system as applied to activity trend detection, according to various embodiments of the present disclosure.

Figure 13C:
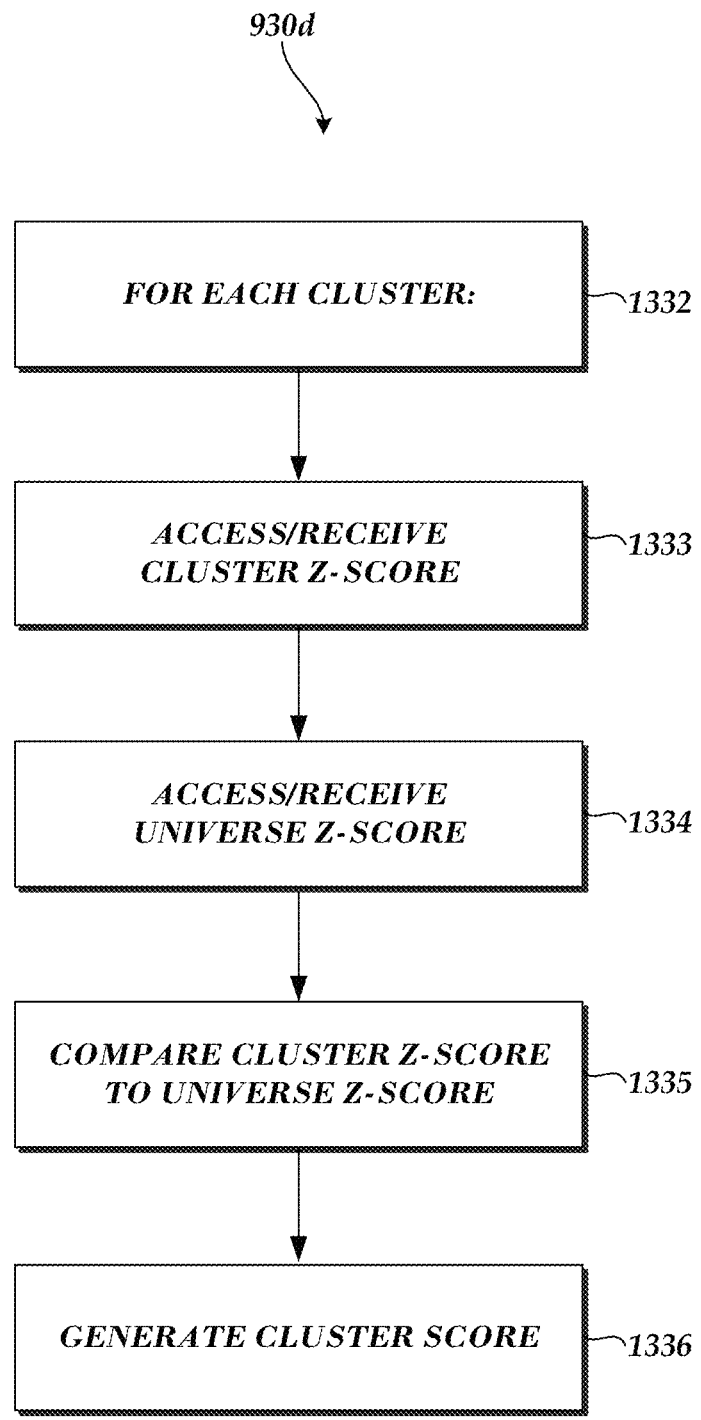

FIG. 13C is a flowchart of an example of a cluster scoring method of the data analysis system as applied to activity trend detection, according to various embodiments of the present disclosure.

Figure 13D:
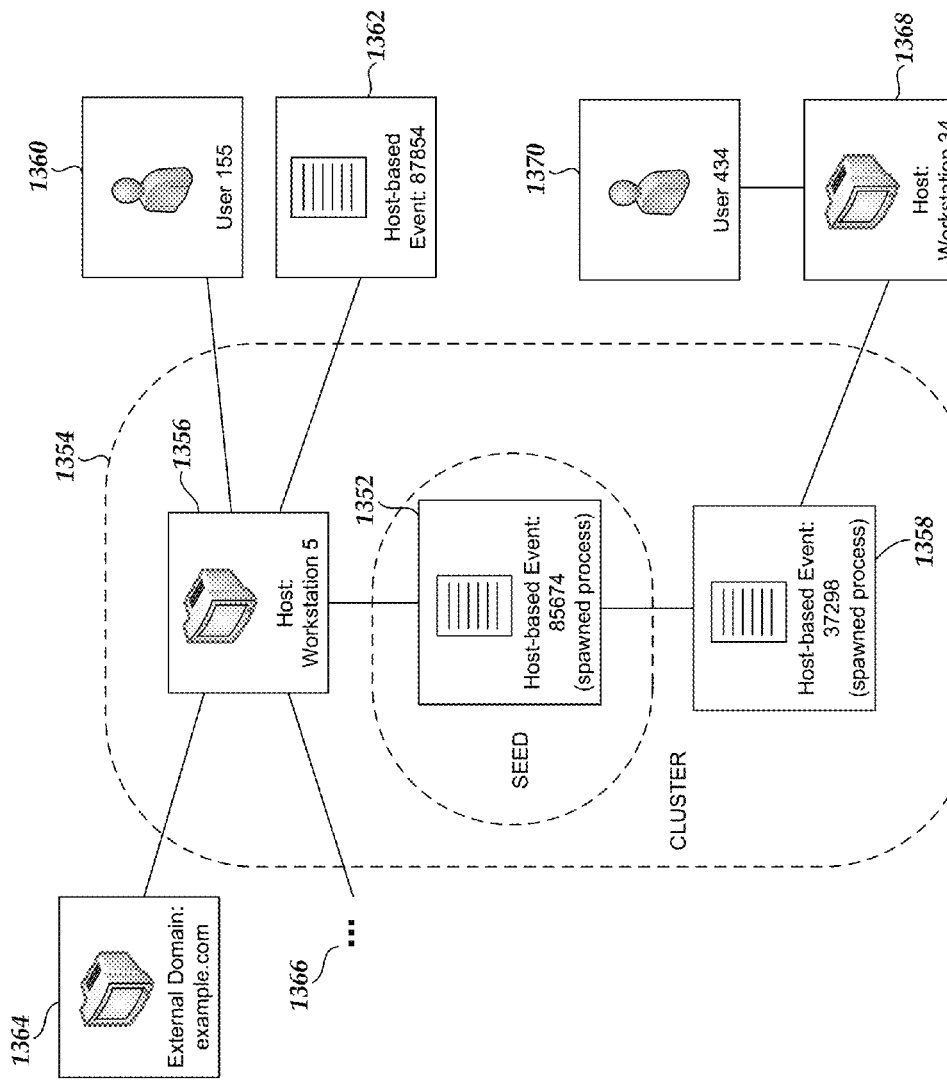

FIG. 13D illustrates an example growth of a cluster of related data entities in an activity trend detection application, according to an embodiment of the present disclosure.

Figure 13E:
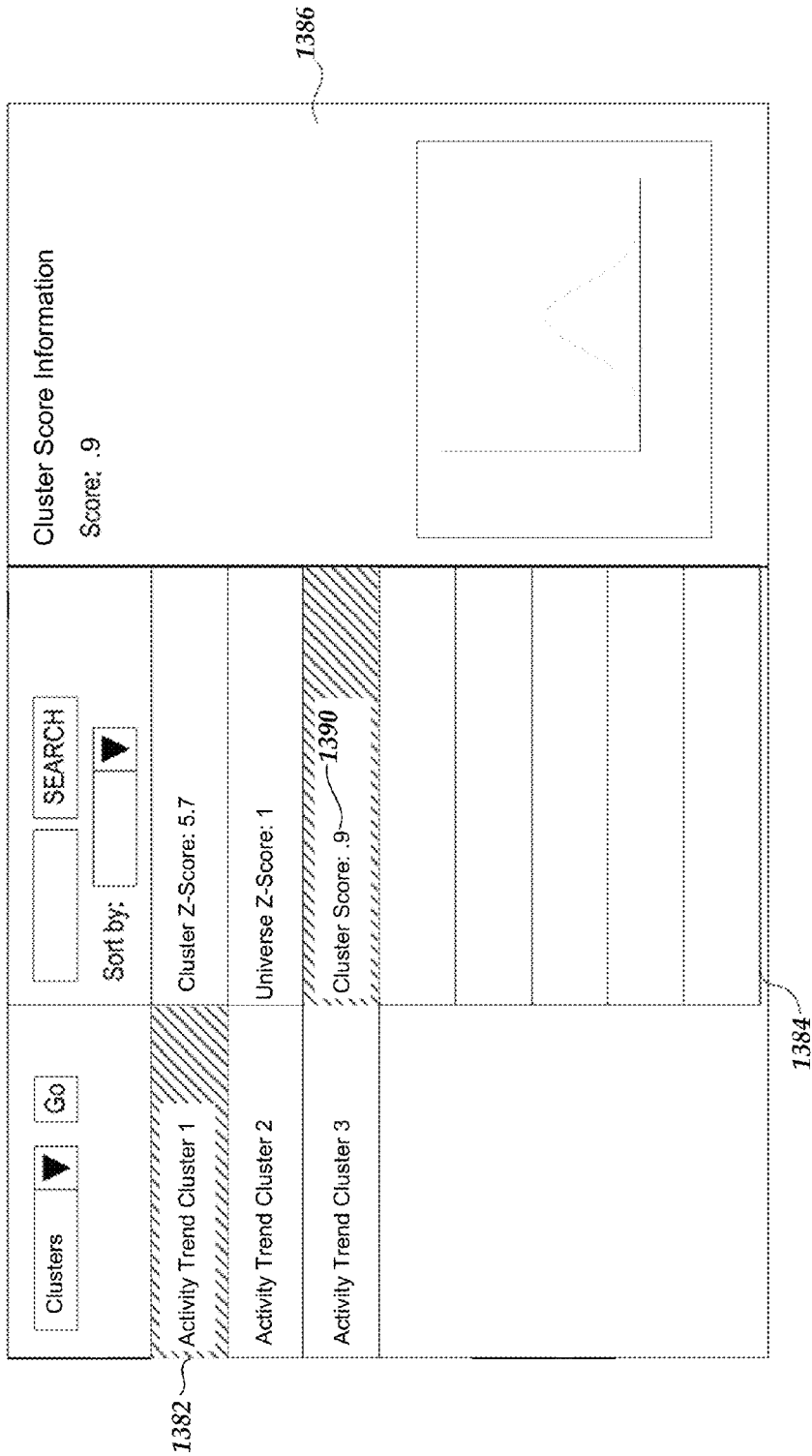

FIG. 13E illustrates an example cluster analysis user interface of the data analysis system as applied to activity trend detection, according to an embodiment of the present disclosure.

DETAILED DESCRIPTION OF SPECIFIC EMBODIMENTS

I. Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Entity (Entity), Data Object (Object), or Data Item (Item): A data container for information representing specific things in the world that have a number of definable properties. For example, a data entity may represent an entity such as a person, a place, an organization, an account, a computer, an activity, a market instrument, or other noun. A data entity may represent an event that happens at a point in time or for a duration. A data entity may represent a document or other unstructured data source such as an e-mail message, a news report, or a written paper or article. Each data entity may be associated with a unique identifier that uniquely identifies the data entity. The data entity's attributes (for example, metadata about the data entity) may be represented in one or more properties. The terms "data entity," "data object," and "data item" may be used interchangeably and/or synonymously in the present disclosure.

Entity (or Object or Item) Type: Type of a data entity (for example, Person, Event, or Document). Data entity types may be defined by an ontology and may be modified or updated to include additional data entity types. An data entity definition (for example, in an ontology) may include how the data entity is related to other data entities, such as being a sub-data entity type of another data entity type (for example, an agent may be a sub-data entity of a person data entity type), and the properties the data entity type may have.

Properties: Also referred to as "metadata," includes attributes of a data entity that represent individual data items. At a minimum, each property of a data entity has a property type and a value or values. Properties/metadata associated with data entities may include any information relevant to that object. For example, properties associated with a person data entity may include a name (for example, John Doe), an address (for example, 123 S. Orange Street), and/or a phone number (for example, 800-0000), among other properties. In another example, metadata associated with a computer data entity may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Seed: One or more data entities that may be used as a basis, or starting point, for generating a cluster. A seed may be generated, determined, and/or selected from one or more sets of data entities according to a seed generation strategy. For example, seeds may be generated from data entities accessed from various databases and data sources including, for example, databases maintained by financial institutions, government entities, private entities, public entities, and/or publicly available data sources.

Cluster: A group or set of one or more related data entities/objects/items. A cluster may be generated, determined, and/or selected from one or more sets of data entities according to a cluster generation strategy. A cluster may further be generated, determined, and/or selected based on a seed. For example, a seed may comprise an initial data entity of a cluster. Data entities related to the seed may be determined and added to the cluster. Further, additional data entities related to any clustered data entity may also be added to the cluster iteratively as indicated by a cluster generation strategy. Data entities may be related by any common and/or similar properties, metadata, types, relationships, and/or the like.

Seed/Cluster Generation Strategy (or Rule): Seed and cluster generation strategies/rules indicate processes, methods, and/or strategies for generating seeds and generating clusters, respectively. For example, a seed generation strategy may indicate that data entities having a particular property (for example, data entities that are credit card accounts) are to be designated as seeds. In another example, a cluster generation strategy may indicate that data entities having particular properties in common with (or similar to) a seed or other data entity in a cluster are to be added to the cluster. Seed and/or cluster generation strategies may specify particular searches and/or rule matches to perform on one or more sets of data entities. Execution of a seed and/or cluster generation strategy may produce layers of related data entities. Additionally, a seed/cluster generation strategy/rule may include multiple strategies, sub-strategies, rules, and/or sub-rules.

II. Overview

According to various embodiments, a data analysis system is disclosed in which clusters of related data entities may be generated from initial data entities, called "seeds." Seeds and related data entities may be accessed from various databases and data sources including, for example, databases maintained by financial institutions, government entities, private entities, public entities, and/or publicly available data sources. Such databases and data sources may include a variety of information and data, such as, for example, personal information, financial information, tax-related information, computer network-related data, and/or computer-related activity data, among others. Further, the databases and data sources may include various relationships that link and/or associate data entities with one another. Various data entities and relationships may be stored across different systems controlled by different entities and/or institutions. According to various embodiments, the data analysis system may bring together data from multiple data sources in order to build clusters.

In various embodiments, the data analysis system may enable a user to efficiently perform analysis and investigations of various data entities and clusters of data entities. For example, the system may enable a user (also referred to herein as an "analyst") to perform various financial and security investigations related to a seed (for example, an initial data entity or data object). In such an investigation, the system may enable an analyst to search and/or investigate several layers of related data entities. For example, a credit card account may be a seed that is linked by the system to various data entities including, for example, customer identifiers and/or phone numbers associated with the credit card account. Further, the system may link, for example, various other credit card accounts related to the customer identifiers, to the seed credit card account. Accordingly, in various embodiments, the system may automatically determine and provide to a user or analyst various layers of data entities related to the seed credit card account. Such an investigation may, in an embodiment, enable the analyst to determine fraudulent activity. For example, if the seed credit card account was suspected to be fraudulent, then the analyst may determine that the additional credit card accounts may also be fraudulent. Further, if the seed credit card account was linked to other known fraudulent credit card accounts, the analyst may determine that the seed credit card account was likely to be fraudulent. As mentioned above, in such an investigation the analyst may discover relationships between the additional credit card accounts and the seed credit card account through several layers of related data entities. Such techniques, enabled by various embodiments of the data analysis system, may be particularly valuable for investigations in which relationships between data entities may include several layers, and in which such relationships may be otherwise very difficult or impossible to manually identify.

In various embodiments, the data analysis system may automatically generate, or determine, seeds based on a seed generation strategy (also referred to as "seed generation rules"). For example, for a particular set of data entities, the data analysis system may automatically generate, based on a seed generation strategy, seeds by designating particular data entities (or groups of data entities) as seeds. Examples of various seed generation strategies are described below.

Further, in various embodiments, the data analysis system may automatically discover data entities related to a seed, and store the resulting relationships and related data entities together in a "cluster." A cluster generation strategy (also referred to as "cluster generation rules") may specify particular searches to perform at each step of an investigation, or cluster generation, process. Such searches may produce layers of related data entities to add to the cluster. Further, according to an embodiment, multiple cluster may be merged and/or collapsed into a single cluster when the multiple cluster share one or more common data entities and/or properties. Thus, according to an embodiment, an analyst may start an investigation with the resulting cluster, rather than the seed alone. Starting with the cluster, the analyst may form opinions regarding the related data entities, conduct further analysis of the related data entities, and/or may query for additional related data entities.

According to various embodiments, the data analysis system may further generate various "cluster scores." Cluster scores may include scores based on various characteristics and/or attributes associated with the cluster and/or the various data entities of the cluster. In various embodiments, the data analysis system may also generate "cluster metascores" which may include, for example, an overall cluster score. Cluster metascores may, for example, be based on a combination of cluster scores of a cluster associated with a seed.

Further, in various embodiments, for a particular set of data entities, multiple clusters may be generated by the data analysis system. For example, the data analysis system may generate multiple seeds according to a seed generation strategy, and then multiple clusters based on those seeds (and based on a cluster generation strategy). In such embodiments, the data analysis system may prioritize the multiple generated clusters based upon cluster scores and/or cluster metascores. In an embodiment, the data analysis system may provide a user interface including a display of summaries of the clusters, including cluster scores, cluster metascores, and/or various other cluster information. Such summaries may be displayed according to a prioritization of clusters. In various embodiments, cluster prioritization may assist an analyst in selecting particular clusters to investigate.

In various embodiments, the data analysis system may be used in various data analysis applications. Such applications may include, for example, financial fraud detection, tax fraud detection, beaconing malware detection, malware user-agent detection, activity trend detection, health insurance fraud detection, financial account fraud detection, detection of activity by networks of individuals, and/or criminal activity detection, among various others. A number of examples of such applications are described in detail below in reference to, for example, FIGS. 3A-3C (financial fraud detection), 10A-10E (tax fraud detection), 11A-11E (beaconing malware detection), 12A-12E (malware user-agent detection), and 13A-13E (activity trend detection).

In the following description, numerous specific details are set forth to provide a more thorough understanding of various embodiments of the present disclosure. However, it will be apparent to one of skill in the art that the systems and methods of the present disclosure may be practiced without one or more of these specific details.

III. Examples of Data Entities, Properties, and Links

In various embodiments, different types of data entities may have different property types. For example, a "Person" data entity may have an "Eye Color" property type and an "Event" data entity may have a "Date" property type. Each property as represented by data in a database may have a property type defined by an ontology used by the database. Further, data entities may be instantiated in a database in accordance with a corresponding object definition for the particular data entity in the ontology. For example, a specific monetary payment (for example, an entity of type "event") of US$30.00 (for example, a property of type "currency" having a property value of "US$30.00") taking place on 3/27/2009 (for example, a property of type "date" having a property value of "3/27/2009") may be stored in the database as an event object with associated currency and date properties as defined within the ontology.

Data objects defined in an ontology may support property multiplicity. In particular, a data entity may be allowed to have more than one property of the same property type. For example, a "Person" data object might have multiple "Address" properties or multiple "Name" properties.

A link represents a connection between two data entities and may be through any of a relationship, an event, and/or matching properties. A link may be asymmetrical or symmetrical. For example, "Person" data entity A may be connected to "Person" data entity B by a "Child Of" relationship (where "Person" data entity B has an asymmetric "Parent Of" relationship to "Person" data entity A), a "Kin Of" symmetric relationship to "Person" data entity C, and an asymmetric "Member Of" relationship to "Organization" data entity X. The type of relationship between two data entities may vary depending on the types of the data entities. For example, "Person" data entity A may have an "Appears In" relationship with "Document" data entity Y or have a "Participate In" relationship with "Event" data entity E. As an example of an event connection, two "Person" data entities may be connected by an "Airline Flight" data entity representing a particular airline flight if they traveled together on that flight, or by a "Meeting" data entity representing a particular meeting if they both attended that meeting. In one embodiment, when two data entities are connected by an event, they are also connected by relationships, in which each data entity has a specific relationship to the event, such as, for example, an "Appears In" relationship.

As an example of a matching properties connection, two "Person" data entities representing a brother and a sister may both have an "Address" property that indicates where they live. If the brother and the sister live in the same home, then their "Address" properties likely contain similar, if not identical property values. In one embodiment, a link between two data entity may be established based on similar or matching properties (for example, property types and/or property values) of the data entity. These are just some examples of the types of connections that may be represented by a link and other types of connections may be represented; embodiments are not limited to any particular types of connections between data entities. For example, a document may contain references to two different entities. For example, a document may contain a reference to a payment (one data entity), and a person (a second data entity). A link between these two data entities may represent a connection between these two entities through their co-occurrence within the same document.

Each data entity may have multiple links with another data entity to form a link set. For example, two "Person" data entities representing a husband and a wife may be linked through a "Spouse Of" relationship, a matching "Address" property, and/or one or more matching "Event" properties (for example, a wedding). Each link, as represented by data in a database, may have a link type defined by the database ontology used by the database.

In various embodiments, the data analysis system may access various data entities and associated properties from various databases and data sources. Such databases and data sources may include a variety of information and data, such as, for example, personal information (for example, names, addresses, phone numbers, personal identifiers, and the like), financial information (for example, financial account information, transaction information, balance information, and the like), tax-related information (for example, tax return data, and the like), computer network-related data (for example, network traffic information, IP (Internet Protocol) addresses, user account information, domain information, network connection information, and the like), and/or computer-related activity data (for example, computer events, user actions, and the like), among others.

IV. Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Figure 1:
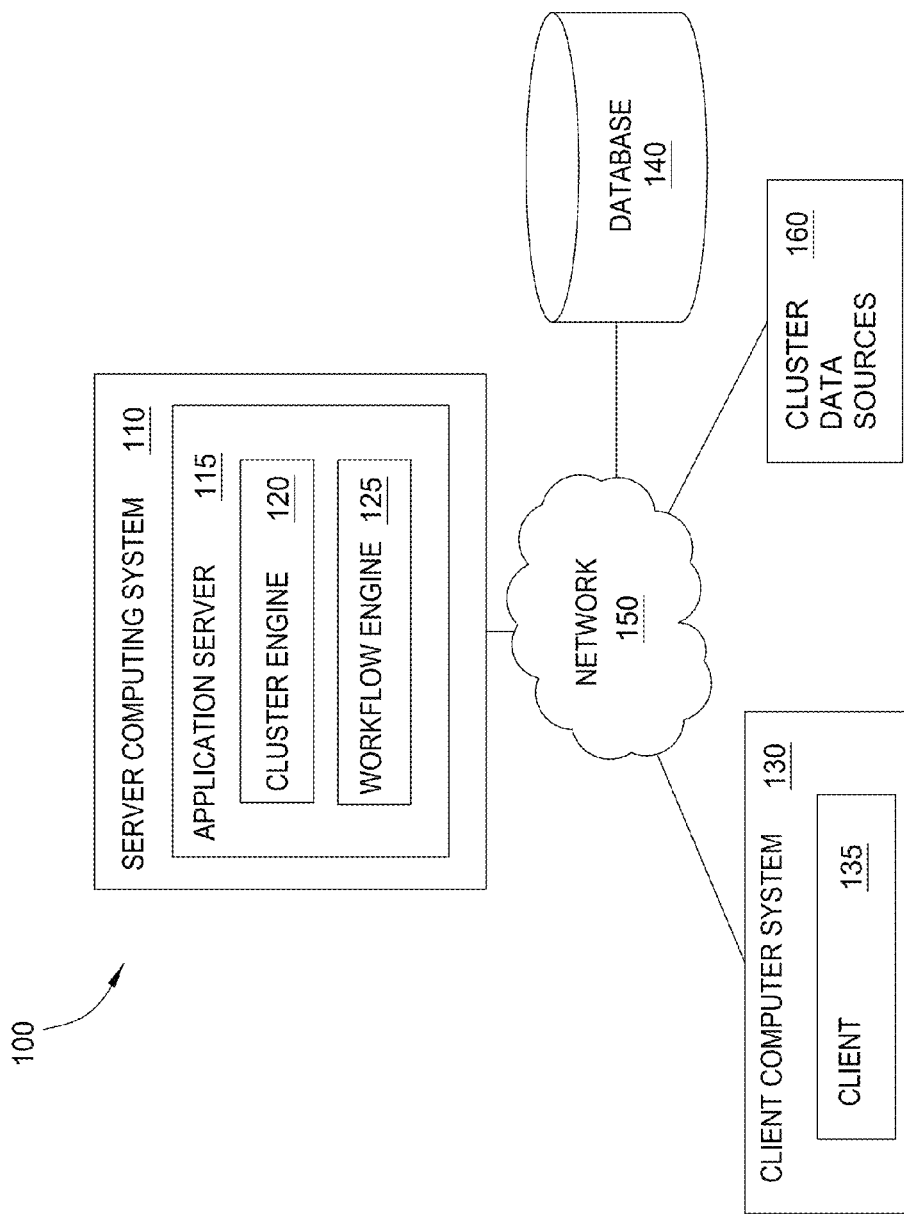
FIG. 1 is a block diagram illustrating an example data analysis system, according to an embodiment of the present disclosure.

FIG. 1 is a block diagram illustrating an example data analysis system 100, according to one embodiment. As shown in the embodiment of FIG. 1, the data analysis system 100 includes an application server 115 running on a server computing system 110, a client 135 running on a client computer system 130, and at least one database 140. Further, the client 135, application server 115, and database 140 may communicate over a network 150, for example, to access cluster data sources 160.

The application server 115 may include a cluster engine 120 and a workflow engine 125. The cluster engine 120 and a workflow engine 125 may be software modules as described below in reference to FIG. 8. According to an embodiment, the cluster engine 120 is configured to build one or more clusters of related data entities, according to a defined cluster generation strategy. The cluster engine 120 may read data from a variety of cluster data sources 160 to generate clusters from seeds (also referred to as "seed data entities"). Once created, the resulting clusters may be stored on the server computing system 110 and/or on the database 140. The operations of the cluster engine 120 are discussed in detail below in conjunction with FIGS. 2 and 3.

In an embodiment, the cluster engine 120 is configured to score the clusters, according to a defined scoring strategy. The score may indicate the importance of analyzing the cluster. For instance, the cluster engine 120 may execute a scoring strategy that aggregates the account balances of credit card accounts within the cluster. Because, for example, a large aggregated total balance may indicate a large liability for a financial institution, a cluster with such a large total balance may be considered to have a higher score relative to other clusters with lower aggregated total balances (and, therefore, lower scores). Thus, a cluster with a higher score relative to a cluster with a lower score may be considered more important to analyze.

In one embodiment, the cluster engine 120 organizes and presents the clusters according to the assigned scores. The cluster engine 120 may present summaries of the clusters and/or interactive representations of the clusters within the cluster analysis UI. For example, the representations may provide visual indications (e.g., graphs or other visualizations) of the related data entities within the clusters. The cluster engine 120 may generate a cluster analysis user interface (UI), such as a web application and/or a dynamic web page displayed within the client 135. The cluster engine 120 may also allow an analyst to create tasks associated with the clusters. Example operations of the cluster engine 120 are discussed in detail below in conjunction with FIGS. 4 and 5. In one embodiment, the cluster engine 120 generates clusters automatically, for example, for subsequent review by analysts.

Analysts may also assign tasks to themselves or one another via a workflow UI generated by the workflow engine, for example. The workflow engine 125 may consume scores generated by the cluster engine 120. For example, the workflow engine 125 may present an analyst with clusters generated, scored, and ordered by the cluster engine 120.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser accessing a web service.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given cluster In one embodiment, the cluster data sources 160 provide data available to the cluster engine to create or generate seeds and/or to create or generate clusters from a seed or a set of seeds. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, and the like. Of course, cluster data sources 160 is included to be representative of a variety of data available to the server computer system 110 over network 150, as well as locally available data sources.

The database 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

Figure 2:
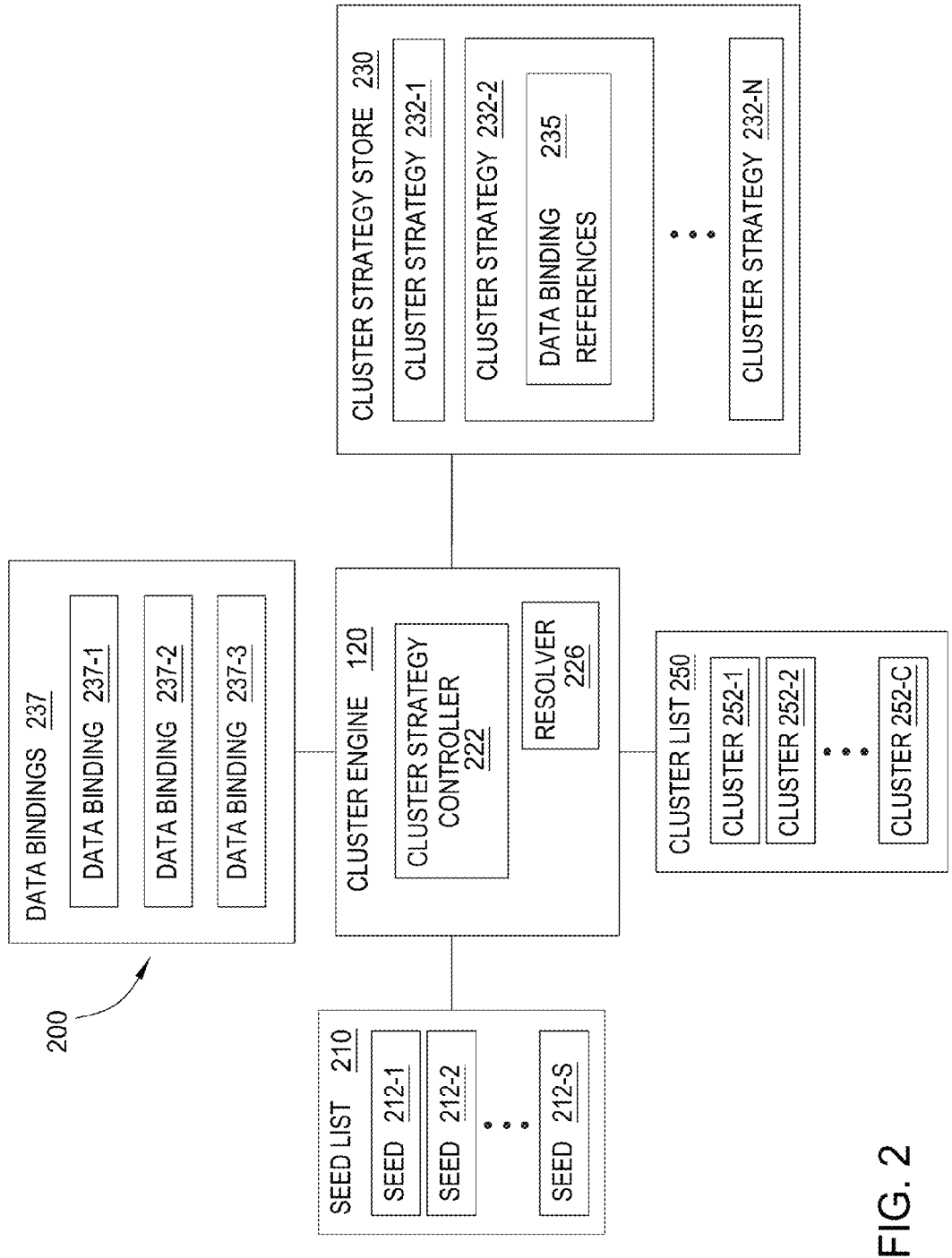
FIG. 2 is a block diagram illustrating an example generation of clusters by the data analysis system, according to an embodiment of the present disclosure.

FIG. 2 is a block diagram illustrating an example generation of clusters by data analysis system 200, according to an embodiment. As shown, in an embodiment the cluster engine 120 (FIG. 1) interacts with a seed list 210, a cluster list 250, a cluster strategy store 230, and data bindings 237. The seed list 210 may include seeds 212-1, 212-2 . . . 212-S, and the cluster list 250 may include clusters 252-1, 252-2 . . . 252-C. The cluster engine 120 may be configured as a software application, module, or thread that generates the clusters 252-1, 252-2 . . . 252-C from the seeds 212-1, 212-2 . . . 212-S.

Seeds 212 (including one, some, or all of seeds 212-1 through 212-S) may be generated by the cluster engine 120 according to various seed generation strategies/rules. Examples of seed generation are described below in reference to various example applications of the data analysis system. According to an embodiment, once generated, seeds 212 may be the starting point for generating a cluster 252. To generate a cluster, the cluster engine 120 may retrieve a given seed 212 from the seed list 210. The seed 212 may be a data entity or group of data entities within the database 140, such as a customer name, a customer social security number, an account number, and/or a customer telephone number.

The cluster engine 120 may generate the cluster 252 from the seed 212. In one embodiment, the cluster engine 120 generates the cluster 252 as a collection of data entities and the relationships between the various data entities. As noted above, the cluster strategy may execute data bindings in order to add each additional layer of data entities to the cluster. For example, the cluster engine 120 may generate the cluster 252-1 from a seed credit card account. The cluster engine 120 may first add the credit card account to the cluster 252-1. The cluster engine 120 may then add customers related to the credit card account to the cluster 252-1. The cluster engine 120 may complete the cluster 252-1 by adding additional credit card accounts related to those customers. As the cluster engine 120 generates the cluster 252-1, the cluster engine 120 may store the cluster 252-1 within the cluster list 250. The cluster 252-1 may be stored as a graph data structure or other appropriate data structure.

The cluster list 250 may be a collection of tables in the database 140. In such a case, there may be a table for the data entities of each cluster 252, such as those of example cluster 252-1 discussed above, a table for the relationships between the various data entities, a table for the attributes of the data entities, and a table for scores of the clusters. The cluster list 250 may include clusters 252 from multiple investigations. Note that the cluster engine 120 may store portions of clusters 252 in the cluster list 250 as the cluster engine 120 generates the clusters 252. Persons skilled in the art will recognize that many technically feasible techniques exist for creating and storing data structures that may be used to implement the systems and methods of the data analysis system.

The cluster strategy store 230 may include cluster strategies 232-1, 232-2 . . . 232-N. Each cluster strategy may include data binding references 235 to one or more data bindings 237. As noted, each data binding may be used to identify data that may grow a cluster (as determined by the given search strategy 232). For example, the cluster engine 120 may execute a cluster strategy 232-1 to generate the cluster 252-1. Specifically, the cluster engine 120 may execute the cluster strategy 232-1 in response to selection of that cluster strategy by an analyst. The analyst may submit a selection of one or more cluster strategies to perform on a seed or group of seeds to the cluster engine 120 through the client 135. Alternatively, the cluster engine 120 may automatically select one or more cluster strategies, such as based on user preferences or rules.

According to an embodiment, each cluster strategy 232 is configured so as to perform an investigation processes for generating a cluster 252. Again, for example, the cluster strategy 232-2 may include data binding references 235 to a collection of data bindings executed to add layer after layer of data to a cluster. The investigation process may include searches to retrieve data entities related to a seed 212 that is selected for clustering using cluster strategy 232-2. For example, the cluster strategy 232-2 may start with a possibly fraudulent credit card account as the seed 212-2. The cluster strategy 232-2 may search for customers related to the credit card account, and then additional credit card accounts related to those customers. A different cluster strategy 232-3 may search for customers related to the credit card account, phone numbers related to the customers, additional customers related to the phone numbers, and additional credit card accounts related to the additional customers, for example.

In an embodiment, cluster strategies 232 include references to at least one data binding 237 (such as data bindings 237-1 through 237-3). The cluster engine 120 may execute a search protocol specified by the data binding 237 to retrieve data, and the data returned by a given data binding may form a layer within the cluster 252. For instance, the data binding 237 (and/or the search protocol of the data binding 237) may retrieve sets of customers related to an account by an account owner attribute. The data binding 237 (and/or the search protocol of the data binding 237) may retrieve the set of related data entities from a data source. For instance, the data binding 237-1 may specify a database query to perform against a database. Likewise, the data binding 237-2 may define a connection and/or query to a remote relational database system and the data binding 237-3 may define a connection and/or query against a third-party web service. Once retrieved, the cluster strategy 232 may evaluate whether the returned data should be added to a cluster being grown from a given seed 212.

Multiple cluster strategies 232 may reference a given data binding 237. The analyst may update the data binding 237, but typically updates the data binding 237 only if the associated data source changes. A cluster strategy 232 may also include a given data binding 237 multiple times. For example, executing a data binding 237 using one seed 212 may generate additional seeds for that data binding 237 (or generate seeds for another data binding 237). More generally, different cluster strategies 232-1, 232-2 . . . 232-N may include different arrangements of various data bindings 237 to generate different types of clusters 252.

The cluster strategies 232 may specify that the cluster engine 120 use an attribute from the related data entities retrieved with one data binding 237, as input to a subsequent data binding 237. The cluster engine 120 may use the subsequent data binding 237 to retrieve a subsequent layer of related date entities for the cluster 252. For instance, a particular cluster strategy 232 may specify that the cluster engine 120 retrieve a set of credit card account data entities with a first data binding 237-1. That cluster strategy 232 may also specify that the cluster engine 120 then use the account number attribute from credit card account data entities as input to a subsequent data binding 237-2. The cluster strategy 232 may also specify filters for the cluster engine 120 to apply to the attributes before performing the subsequent data binding 237. For instance, if the first data binding 237-1 were to retrieve a set of credit card account data entities that included both personal and business credit card accounts, then the cluster engine 120 could filter out the business credit card accounts before performing the subsequent data binding 237-2.

In operation, according to an embodiment, the cluster engine 120 generates a cluster 252-1 from a seed 212-1 by first retrieving a cluster strategy 232. Assuming the analyst selected a cluster strategy 232-2, the cluster engine 120 would retrieve the cluster strategy 232-2 from the cluster strategy store 230. The cluster engine 120 may then retrieve the seed 212-1 as input to the cluster strategy 232-2. The cluster engine 120 may execute the cluster strategy 232-2 by retrieving sets of data by executing data bindings 237 referenced by the cluster strategy 232-2. For example, the cluster strategy 232-2 may execute data bindings 237-1, 237-2, and 237-3. Accordingly, the cluster engine 120 may evaluate data returned by each data binding 237 to determine whether to use that data to grow the cluster 252-1. The cluster engine 120 may then use elements of the returned data as input to the next data binding 237. Of course, a variety of execution paths are possible for the data bindings 237. For example, assume one data binding 237 returned a set of phone numbers. In such a case, another data binding 237 may evaluate each phone number individually. As another example, one data binding 237 may use input parameters obtained by executing multiple, other data bindings 237. More generally, the cluster engine 120 may retrieve data for each data binding referenced by the cluster strategy 232-2. The cluster engine 120 may then store the complete cluster 252-1 in the cluster list 250.

As the cluster engine 120 generates the clusters 252-1, 252-2 ... 252-C from seeds 212-1, 212-2 ... 212-S, the cluster list 250 may include overlapping clusters 252. For example, two clusters 252-1 and 252-C may overlap if both clusters 252-1 and 252-C include a common data entity. In an example, a larger cluster 252 formed by merging two smaller clusters 252-1 and 252-C may be a better investigation starting point than the smaller clusters 252-1 and 252-C individually. The larger cluster 252 may provide additional insight or relationships, which may not be available if the two clusters 252-1 and 252-C remain separate.

In an embodiment, the cluster engine 120 includes a resolver 226 that is configured to detect and merge two or more overlapping clusters 252 together. For example, the resolver 226 may compare the data entities within a cluster 252-1 to the data entities within each one of the other clusters 252-2 through 252-C. If the resolver 226 finds the same data entity within the cluster 252-1 and a second cluster 252-C, then the resolver 226 may merge the two clusters 252-1 and 252-C into a single larger cluster 252. For example, the cluster 252-1 and cluster 252-C may both include the same customer. The resolver 226 may compare the data entities of cluster 252-1 to the data entities of cluster 252-C and detect the same customer in both clusters 252. Upon detecting the same customer in both clusters 252, the resolver 226 may merge the cluster 252-1 with cluster 252-C. The resolver 226 may test each pair of clusters 252 to identify overlapping clusters 252. Although the larger clusters 252 may be better investigation starting points, an analyst may want to understand how the resolver 226 formed the larger clusters 252. Accordingly, the resolver 226, may store a history of each merge.

In an embodiment, cluster merging (for example, by resolver 226) may be optionally disabled for particular types of data entities, and/or particular data entities. For example, when a particular data entity, or type of data entity, is so common that it may be included in many different clusters (for example, an institutional entity such as a bank), merging of cluster based on that common entity (for example, the particular bank) or common type of entity (for example, banks in general) may be disabled. In another embodiment, cluster may be merged only when they share two or more common data entities and/or other properties. In an embodiment, when two clusters are determined to share a data entity that this very common (such that they cluster may not be merged based on that entity) the system may automatically determine whether the two clusters share one or more other data entities and/or properties such that they may be merged. In various embodiments, cluster merging may be disabled based on other criteria. For example, cluster merging between two related clusters may be disabled when one or both of the two clusters reach a particular size (for example, include a particular number of data entities).

After the cluster engine generates a group of clusters from a given collection of seeds (and after merging or resolving the cluster), the cluster engine 120 may score, rank, and/or otherwise order the clusters relative to a scoring strategy 442. In some embodiments, clusters are scored and provided to the analysis without resolving.

In one embodiment, the analysis system 100, and more specifically, the cluster engine 120, receives a request for cluster generation. In response to the request, a list of seeds may be generated, clusters may be generated based on those seeds, and the clusters may be ranked, ordered, and presented to analysts. In an embodiment, the cluster engine 120 may consume seeds generated by other systems. Alternatively, in other embodiments, cluster engine 120 may generate the seeds 212-1, 212-2 ... 212-S. For instance, the cluster engine 120 may include a seed generation strategy (also referred to as a "lead generation strategy") that identifies data entities, or groups of data entities, as potential seeds 212. The seed generation (or lead generation) strategy may apply to a particular business type, such as credit cards, stock trading, or insurance claims, and may be run against a cluster data source 160 or an external source of information.

In an embodiment, the analysis system 100 may not include data bindings as described above. Rather, according to an embodiment, the analysis system 100 may include one or more interfaces and/or connections to various internal and/or or external data stores of data entities and/or other information. According to an embodiment, the system may include a generic interface and/or connection to various internal and/or external data stores of data entities and/or other information. For example, the analysis system 100 may include a generic data interface through which the system may search, access, and/or filter various data entity information during seed and/or cluster generation. The generic interface may include various aspects that enable searching, accessing, and/or filtering of data. For example, the generic interface may access various data sources that each have differing data formats. The generic interface may accordingly covert and/or filter the accessed data to a common format. Alternatively, the data sources may include functionality through which stored data may be searched and/or converted to a standard format automatically. In an embodiment, the generic interface may enable Federated search of multiple data stores of data entity-related information. Accordingly, in various embodiments, the analysis system 100 may access various data sources for data entity clustering and seed generation.

V. Example Cluster Generation

Figure 3B:
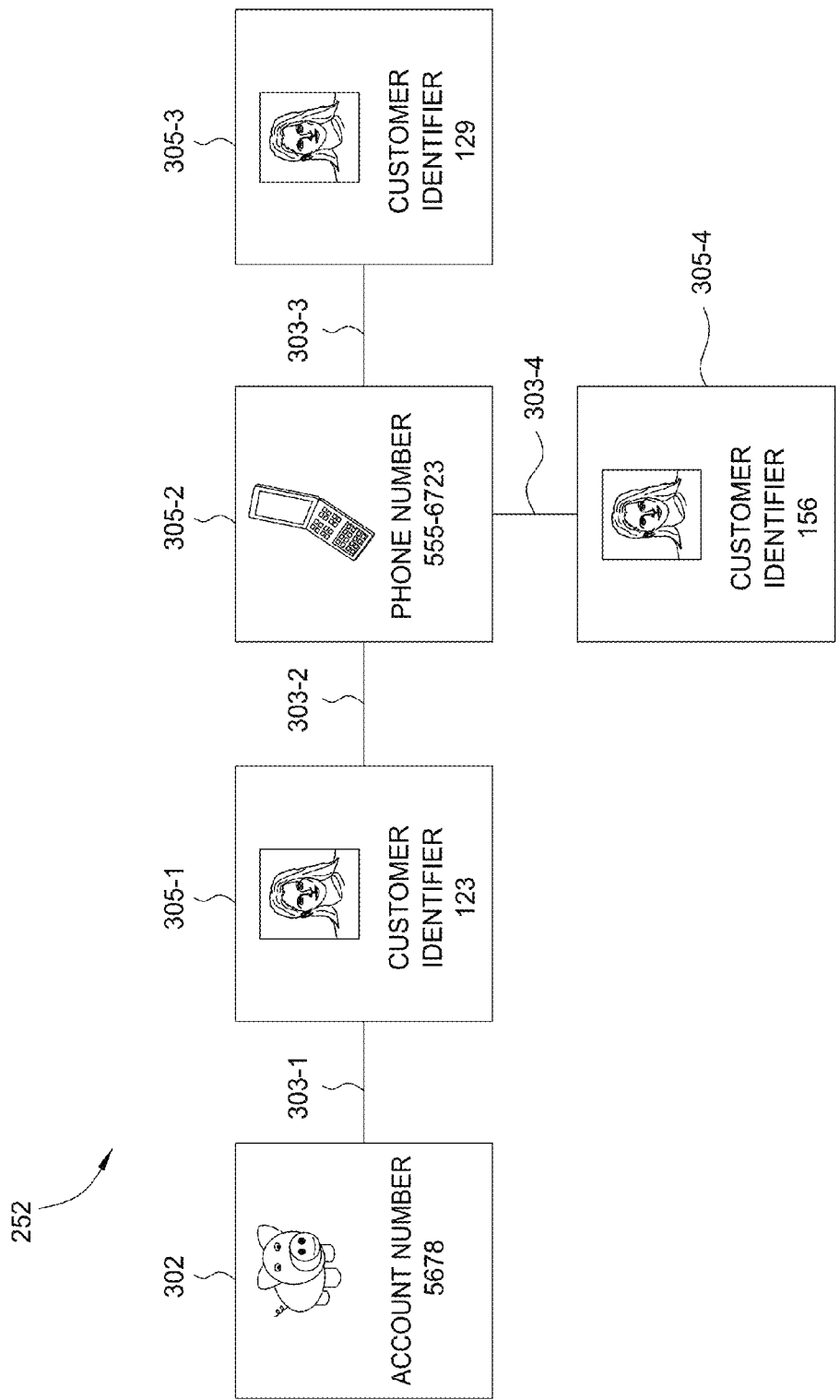

FIGS. 3A-3C illustrate an example growth of a cluster 252 of related data entities, according to an embodiment. As shown in FIG. 3A, an example cluster 252 may include a seed entity 302, links 303-1 and 303-2, and related data entities 305-1 and 305-2. The cluster 252 may be based upon a seed 212 (for example, data entity 302). The cluster engine 120 may build the cluster 252 by executing a cluster strategy 232 with the following searches:

Find seed owner
Find all phone numbers related to the seed owner
Find all customers related to the phone numbers
Find all accounts related to the customers
Find all new customers related to the new accounts In the example, assuming the seed 212 is fraudulent credit card account, the cluster engine 120 would add the credit card account to the cluster 252 as the seed entity 302. The cluster engine 120 may then use the account owner attribute of the credit card account as input to a data binding 237. The cluster engine 120 may execute the search protocol of the data binding 237 to retrieve the customer data identifying the owner of the fraudulent credit card account. The cluster engine 120 would then add the customer data to the cluster 252 as the related data entity 305-1. The cluster engine 120 would also add the account owner attribute as the link 303-1 that relates the account number to the customer data of the owner. The cluster engine 120 would execute the next search of the cluster strategy 232 by inputting the customer identifier attribute of the customer data into a data binding 237 to retrieve a phone data. The cluster engine 120 would then add the phone data as the related data entity 305-2 and the customer identifier attribute as the link 303-2 between the customer data and the phone data. At this point in the investigation process, the cluster 252 would include the seed entity 302, two links 303-1 and 303-2, and two related data entities 305-1 and 305-2. That is, the cluster 252 would include the fraudulent credit card account, the customer data of the owner of the credit card, and the phone number of the owner. By carrying the investigation process further, the cluster engine 120 may reveal further related information, for example, additional customers and/or potentially fraudulent credit card accounts.

Turning to FIG. 3B, and continuing the example, the cluster engine 120 may continue executing the cluster strategy 232 by searching for additional account data entities related to the phone number of the owner of the fraudulent credit card account. As discussed, the phone number may be stored as related data entity 305-2. The cluster engine 120 would input the phone owner attribute of the phone number to a data binding 237. The cluster engine 120 would execute the search protocol of data binding 237 to retrieve the data of two additional customers, which the cluster engine 120 would store as related data entities 305-3 and 305-4. The cluster engine 120 would add the phone owner attribute as the links 303-3 and 304-4 between the additional customers and the phone number.

Continuing the example, FIG. 3C shows the cluster 252 after the cluster engine 120 performs the last step of the example cluster strategy 232. For example, the cluster engine 120 would use the customer identifier attribute of the related data entity 305-3 and 305-4 to retrieve and add additional account data entities as the related data entities 305-5 and 305-6. The cluster engine 120 would couple the related data entities 305-5 and 305-6 to the related data entities 305-3 and 305-4 with the customer identifier attributes stored as links 303-5 and 303-6. Thus, the cluster 252 would include six related data entities 305 related by six links 303, in addition to the seed entity 302.

In an embodiment, the analyst may identify and determine whether the additional data account entities, stored as related data entities 305-5 and 305-6, represent fraudulent credit card accounts more efficiently than if the analyst started an investigation with only the seed 302. As the foregoing example illustrates, according to various embodiments, the data analysis system may enable an analyst to advantageously start an investigation with a cluster including many related data entities (such as the example cluster 252 with the seed entity 302 and related data entities 305) rather than a single data entity.

VI. Example Cluster Scoring/Ranking

Figure 4:
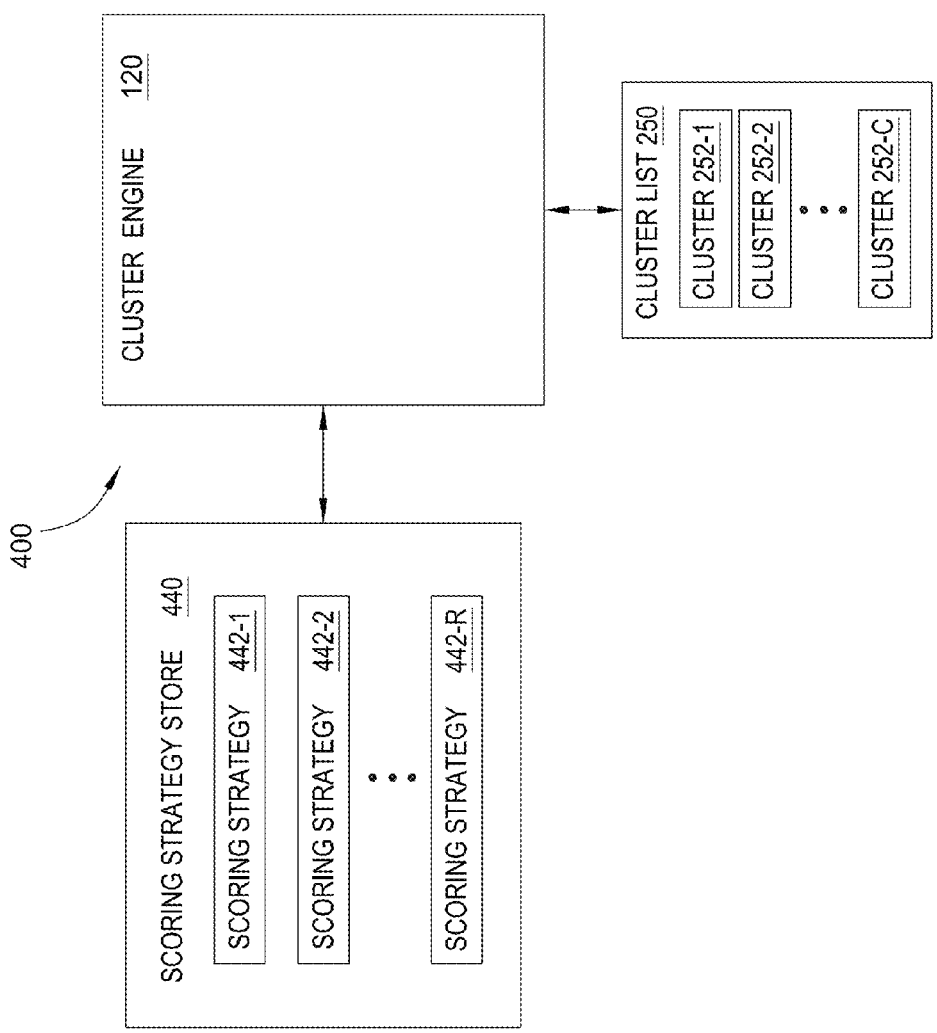
FIG. 4 illustrates an example ranking of clusters by the data analysis system, according to an embodiment of the present disclosure.

FIG. 4 illustrates an example ranking of clusters 252 by the data analysis system 100 shown in FIG. 1, according to an embodiment of the present disclosure. As shown, an example system 400 of FIG. 4 illustrates some of the same elements as shown in FIG. 1 and FIG. 2, including the cluster engine 120 in communication with the cluster list 250. In addition, FIG. 4 illustrates a scoring strategy store 440 in communication with the cluster engine 120. The scoring strategy store 440 includes scoring strategies 442-1, 442-2 . . . 442-R.

In an embodiment, the cluster engine 120 executes a scoring strategy 442 to score a cluster 252. For example, the cluster engine 120 may generate a cluster (for example, via a cluster strategy/data bindings) and attempt to resolve it with existing clusters. Thereafter, the cluster engine 120 may score the resulting cluster with any scoring strategies associated with a given cluster generation strategy. In an embodiment, the multiple scores may be generated for a given cluster. The multiple scores may be based on various aspects, metrics, or data associated with the cluster. In one embodiment, a cluster metascore may be generated based on a combination or aggregation of scores associated with a given cluster. Ordering for a group of clusters, (according to a given scoring strategy) may be performed on demand when requested by a client. Alternatively, the analyst may select a scoring strategy 442 through the client 135 and/or the analyst may include the selection within a script or configuration file. In another alternative, the data analysis system may automatically select a scoring strategy. In other embodiments, the cluster engine 120 may execute several scoring strategies 442 to determine a combined score for the cluster 252.

In an embodiment, a scoring strategy (such as scoring strategy 442) specifies an approach for scoring a cluster (such as cluster 252). A score may indicate a relative importance or significance of a given cluster. For example, the cluster engine 120 may execute a scoring strategy 442-1 to determine a score by counting the number of a particular data entity type that are included within the cluster 252. Assume, for example, a data entity corresponds with a credit account. In such a case, a cluster with a large number of accounts opened by a single individual (possibly within a short time) might correlate with a higher fraud risk. Of course, a cluster score may be related to a high risk of fraud based on the other data in the cluster, as appropriate for a given case. More generally, each scoring strategy 442 may be tailored based on the data in clusters created by a given cluster strategy 230 and a particular type of risk or fraud (or amounts at risk) of interest to an analyst.

According to an embodiment, the cluster engine 120 scores a cluster 252-1 by first retrieving a scoring strategy 442. For example, assume an analyst selects scoring strategy 442-1. In response, the cluster engine 120 may retrieve the scoring strategy 442-1. The cluster engine 120 may also retrieve the cluster 252-1 from the cluster list 250. After determining the score of the cluster 252-1, the cluster engine 120 may store the score with the cluster 252-1 in the cluster list 250.

The cluster engine 120 may score multiple clusters 252-1, 252-2 . . . 252-C in the cluster list 250. The cluster engine 120 may also rank the clusters 252-1, 252-2 . . . 252-C based upon the scores. For instance, the cluster engine 120 may rank the cluster 252-1, 252-2 . . . 252-C from highest score to lowest score. In various embodiment, cluster may be ranked according into multiple scores, combinations of scores, and/or metascores.

VII. Example User Interface

Figure 5:
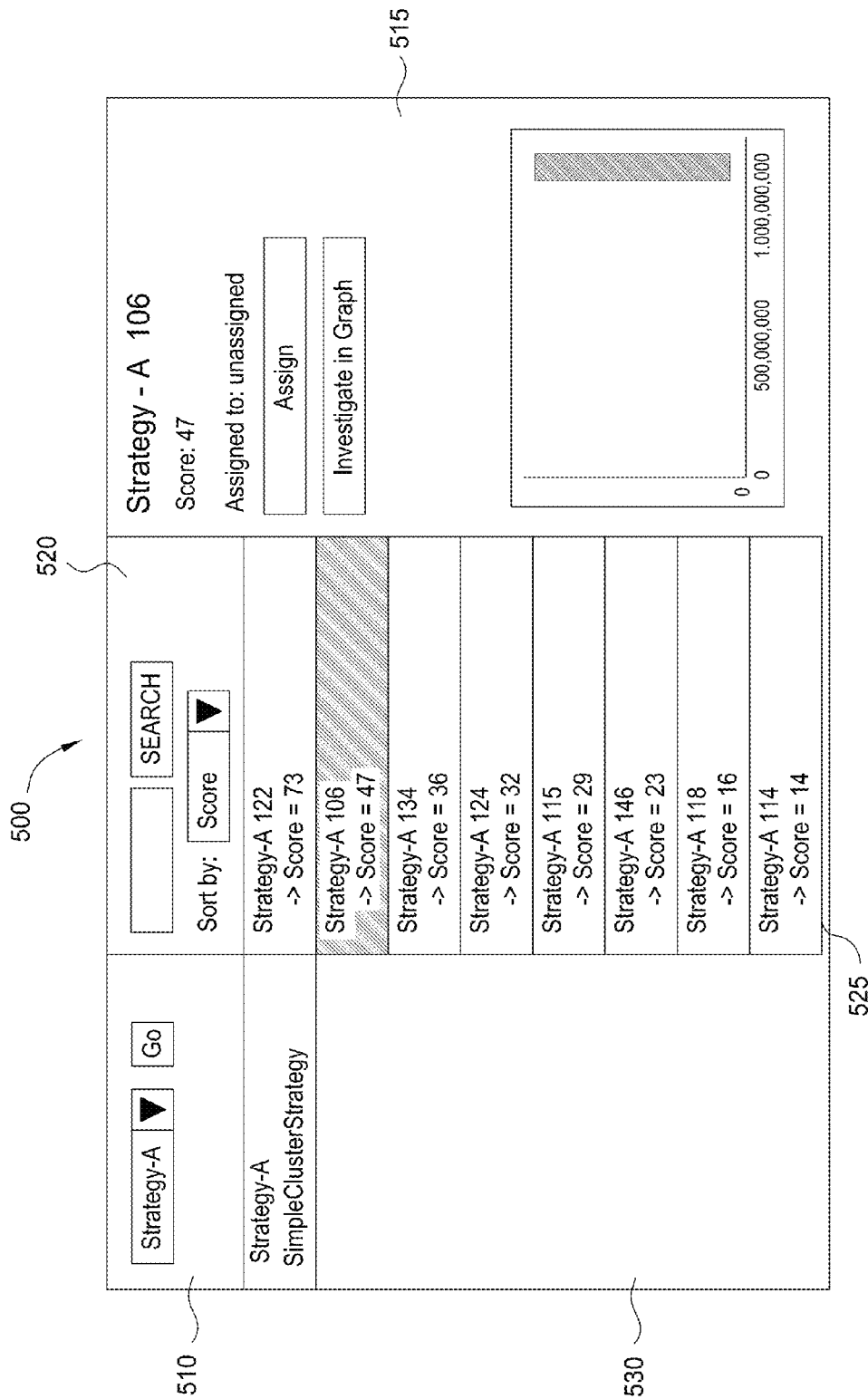
FIG. 5 illustrates an example cluster analysis user interface, according to an embodiment of the present disclosure.

FIG. 5 illustrates an example cluster analysis user interface (UI) 500, according to one embodiment. As described above, the workflow engine 125 may be configured to present the cluster analysis UI 500. As shown, the example cluster analysis UI 500 includes a selection box 510, a cluster strategy box 530, a cluster summary list 525, a cluster search box 520, and a cluster review window 515. The workflow engine 125 may generate the cluster analysis UI 500 as a web application or a dynamic web page displayed within the client 135.

In the example UI 500 of FIG. 5, the selection box 510 may allow the analyst to select, for example, a seed generation strategy and/or a previously generated seed or seed list (for example, seed list 210). The analyst may select the items (for example, a seed generation strategy) by, for example, entering a name of a particular item into a dropdown box (or other interface element) in the selection box 510 (for example, the dropdown box showing a selected strategy "Strategy-A") and selecting a "Go" button (or other interface element). Alternatively, the analyst may select a particular item by, for example, expanding the dropdown box and selecting an item from the expanded dropdown box, which may list various seed generation strategies and/or seed lists, for example. In various examples, seed lists and/or seed generation strategies may be selected by the analyst that correspond to likely fraudulent financial accounts, credit card account originating at a particular bank branch, savings accounts with balances above a particular amount, and/or any of the other seed generation strategies described below in reference to the various applications of the system.

For example, when the analyst selects a particular seed generation strategy, the system may generate a seed list (for example, seed list 210) and then may generate clusters based on seeds of the seed list. The seed list and/or clusters may, in an embodiment, be generated in response to a selection of a particular seed generation strategy. The seed generation strategy may generate a seed list (for example, seed list 210) and/or clusters (for example, clusters 252-1, 252-2, ... 252-C of the cluster list 250) from the database 140 and/or an external source of information (for example, a cluster data source 160). Alternatively, when the analyst selects a previously generated seed or seed list (for example, seed list 210), the system may retrieve data related to the selected seed list (for example, the seed entities, clusters, and/or related clustered data entities) from, for example, database 140 and/or an external source of information (for example, a cluster data source 160). In an embodiment, clusters may be generated in response to a selection of a previously generated seed list (or seed). Alternatively, cluster may be been previously generated, and may be retrieved in response to selection of a previously generated seed list (or seed). In an embodiment, the analyst may select a particular cluster of interest via the selection box 510.

Further, in the example UI 500 the cluster strategy box 530 displays the cluster strategies 232 that the cluster engine 120 ran against the seed list 210. The cluster engine 120 may execute multiple cluster strategies 232 against the seed list 210, so there may be multiple cluster strategies 232 listed in the cluster strategy box 530. The analyst may click on the name of a given cluster strategy 232 in the cluster strategy box 530 to review the clusters 252 that the cluster strategy 232 generated.

In an embodiment, the workflow engine 125 generates for display in the UI 500 summaries of the clusters 252 in the cluster summary list 525. For example, the summaries may include characteristics of the clusters 252, such as identifiers, scores, and/or analysts assigned to analyze the clusters 252. The workflow engine 125 may select the clusters 252 for display in the cluster summary list 525 according to those or other characteristics. For instance, the workflow engine 125 may display the summaries in the order of the scores of the clusters 252, where a summary of the highest scoring cluster 252 is displayed first.

The workflow engine 125 may control the order and selection of the summaries within the cluster summary list 525 based upon an input from the analyst. The cluster search box 520 may include a search text box coupled to a search button and a pull-down control. The analyst may enter a characteristic of a cluster 252 in the search text box and then instruct the workflow engine 125 to search for and display clusters 252 that include the characteristic by pressing the search button. For example, the analyst may search for clusters with a particular score. The pull-down control may include a list of different characteristics of the clusters 252, such as score, size, assigned analyst, and/or date created. The analyst may select one of the characteristics to instruct the workflow engine 125 to present the summaries of the clusters 252 arranged by that characteristic.

In an embodiment, the workflow engine 125 is also configured to present details of a given cluster 252 within the cluster review window 515. The workflow engine 125 displays the details of the cluster 252, for example, the score, and/or average account balances within a cluster, when the analyst clicks a mouse pointer on the associated summary within the cluster summary list 525. The workflow engine 125 may present details of the cluster 252, such as the name of an analyst assigned to analyze the cluster 252, a score of the cluster 252, and/or statistics or graphs generated from the cluster 252. These details may allow the analyst to determine whether to investigate the cluster 252 further. The cluster review window 515 may also include a button which may be clicked to investigate a cluster 252 within a graph, and an assign button for assigning a cluster to an analyst.

An analyst may click a mouse pointer on an "Investigate in Graph" button representing a cluster to investigate the cluster within an interactive graph. The interactive representation may be a visual graph of the cluster 252, where icons represent the entities of the cluster 252 and lines between the icons represent the links between entities of the cluster 252. For example, the workflow engine 125 may display the interactive graph of the cluster 252 similar to the representation of the cluster 252 in FIG. 3C. The interactive representation may allow the analyst to review the attributes of the related data entities and/or perform queries for additional related data entities.

In an embodiment, an administrative user may click a mouse pointer on an assign button to assign the associated cluster 252 to an analyst. The workflow engine 125 may also allow the administrative user to create tasks associated with the clusters 252, while the administrative user assigns the cluster 252. For example, the administrative user may create a task for searching within the three highest scoring clusters 252 for fraudulent credit card accounts. The workflow engine 125 may display the summaries in the cluster summary list 525 according to the names of the analysts assigned to the clusters 252. Likewise, the workflow engine 125 may only display summaries for the subset of the clusters 252 assigned to an analyst.

The interface shown in FIG. 5 is included to illustrate one exemplary interface useful for navigating and reviewing clusters generated using the cluster engine 120 and the workflow engine 125. In other embodiments, other user interface constructs may be used to allow the analyst to select cluster strategies 232, scoring strategies 242, and/or seed generation strategies, initiate an investigation, and/or review and analyze the clusters 252. For example, the workflow engine 125 may display additional controls within the cluster analysis UI 500 for controlling the cluster generation process and selecting seed generation strategies, cluster strategies 232, and/or scoring strategies 242. Also, the UI 500 may be displayed without the selection box 510 or the options to select a seed generation strategy. In addition, although the workflow engine 125 generates the cluster analysis UI 500, in various embodiments the cluster analysis UI 500 may be generated by a software application distinct from the workflow engine 125. Further, in various embodiments, the cluster review window 515 may be configured to display a preview of the cluster 252 and/or additional statistics generated from the cluster 252. As such, an interactive representation of the cluster 252 may be presented in an additional UI and/or the cluster 252 may be exported to another software application for review by the analyst.

In an alternative embodiment, and as described below in reference to FIGS. 10E, 11E, 12E, and 13E, the cluster analysis user interface may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores.

VIII. Example Operations

Figure 6:
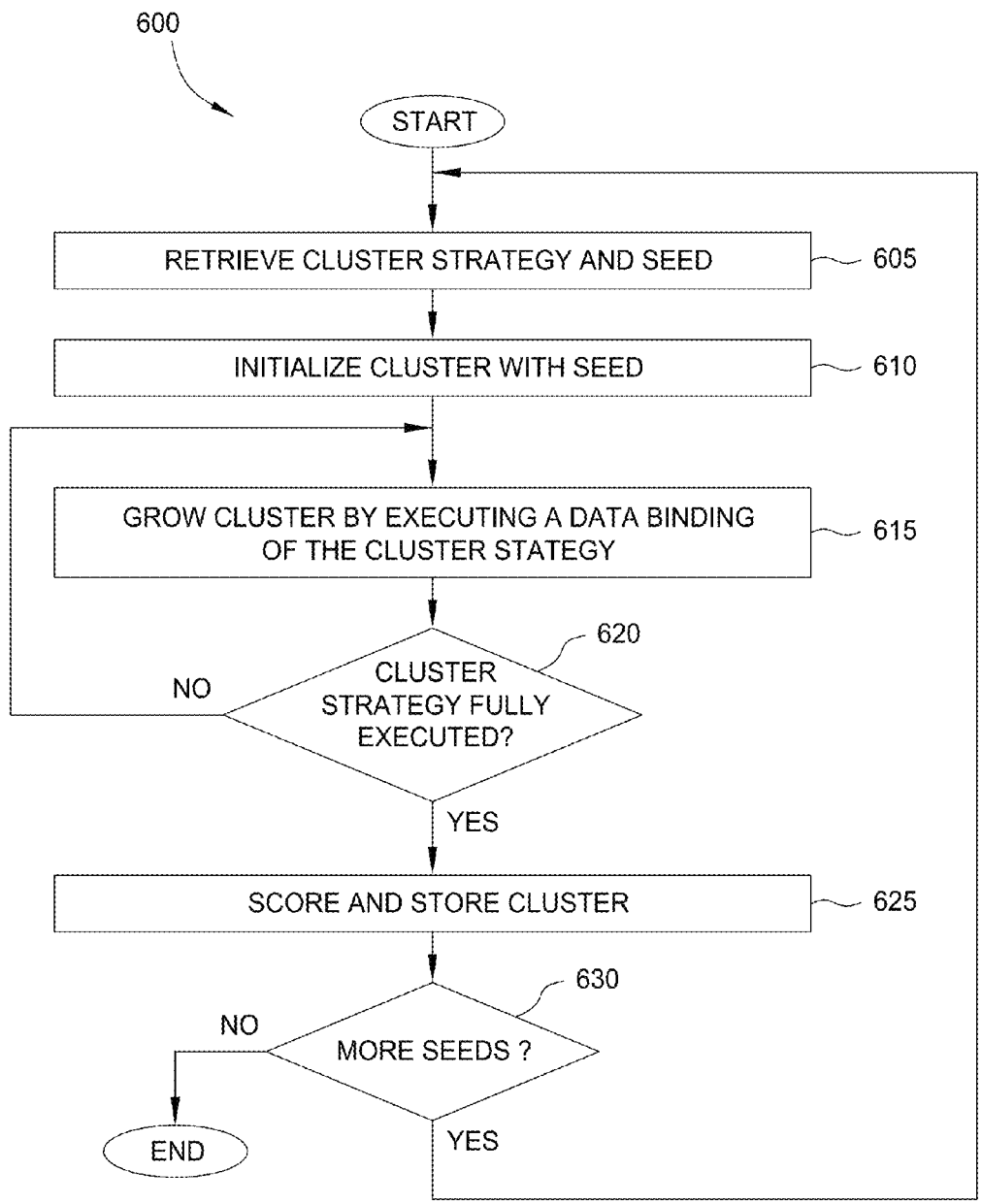
FIG. 6 is a flowchart of an example method of generating clusters, according to an embodiment of the present disclosure.

FIG. 6 is a flowchart of an example method of generating clusters, according to an embodiment. Although the method is described in conjunction with the systems of FIGS. 1 and 2, persons skilled in the art will understand that any system configured to perform the method, in any order, is within the scope of this disclosure. Further, the method 600 may be performed in conjunction with method 700 for scoring a cluster, described below.

As shown, example cluster generation method 600 begins at block 605, where the cluster engine 120 retrieves a cluster strategy (e.g., cluster strategy 232-2) and a seed 212. Once a cluster strategy is selected, the cluster engine 120 may identify a list of seeds from which to build clusters using the selected cluster strategy. At block 610, the cluster engine 120 initializes a cluster 252 with one of the seeds in the list. The cluster 252 may be stored as a graph data structure. The cluster engine 120 may initialize the graph data structure and then add the seed 212-1 to the graph data structure as the first data entity.

At block 615, the cluster engine 120 may grow the cluster 252 by executing the search protocol of a data binding 237 from the cluster strategy 232-2. The cluster strategy 232-2 may include a series of data bindings 237 that the cluster engine 120 executes to retrieve related data entities. A given data binding 237 may include queries to execute against a cluster data source 160 using the seed as an input parameter. For example, if the seed 212-1 is an account number, then the data binding 237 may retrieve the data identifying the owner of the account with the account number. After retrieving this information, the cluster engine 120 may add the customer data entity to the cluster as a related data entity and the account owner attribute as the link between the seed 212-1 and the related data entity. After retrieving the related data entities, the cluster engine 120 may add them to the cluster 252.

At block 620, the cluster engine 120 determines if the cluster strategy 232-2 is fully executed. If not the method 600 returns to block 615 to execute additional data bindings for a given seed. Alternatively, as described above, the cluster engine 120 may grow the cluster by searching for, accessing, and/or filtering various data entities through, for example, a generic interface to various internal and/or external data sources. Further, in an embodiment, the cluster engine 120 may determine whether the cluster being generated is to be merged with another cluster, as described above. Once the cluster strategy is executed for that seed, the cluster engine 120 may determine and assign a score (or multiple scores) to that cluster (relative to a specified scoring strategy). After generating clusters for a group of seeds, such clusters may be ordered or ranked based on the relative scores. Doing so may allow an analyst to rapidly identify and evaluate clusters determined to represent, for example, a high risk of fraud.

At block 625, the cluster engine 120 may store the cluster 252 in cluster list 250. As mentioned above, the cluster list 250 may be a collection of tables within a relational database, where a table may include the seed and related data entities of the cluster 252 and another table may include links between the related data entities of the cluster 252.

At block 630, the cluster engine 120 determines if there are more seeds 212 to analyze in the seed list 210. If so, the method 600 returns to block 605 to generate another cluster from the next seed. Otherwise, the method 600 ends. Note, while method 600 describes a single cluster being generated, one of skill in the art will recognize that multiple instances of the cluster generation process illustrated by method 600 may be performed in parallel.

Figure 7:
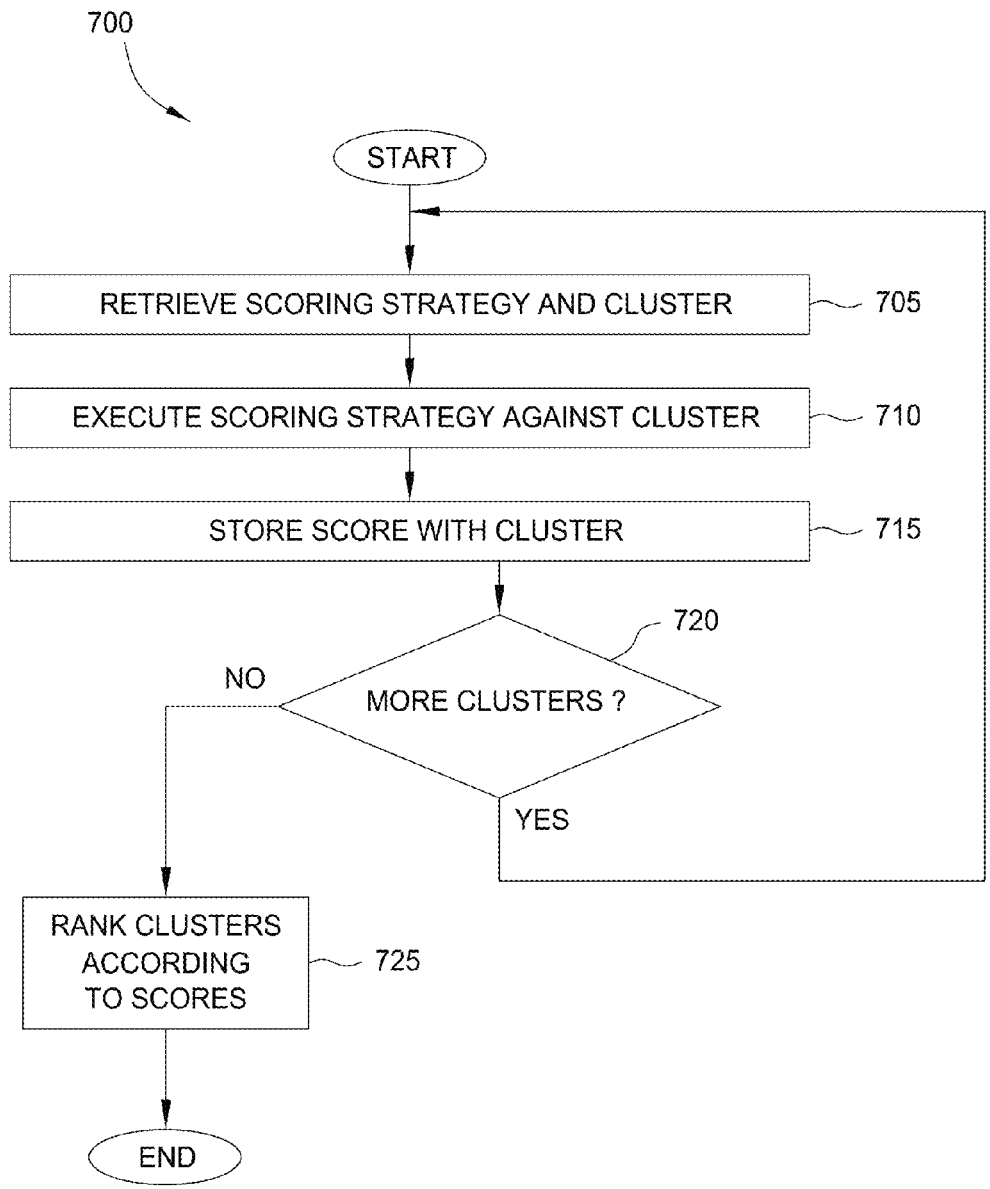
FIG. 7 is a flowchart of an example method of scoring clusters, according to an embodiment of the present disclosure.

FIG. 7 is a flowchart of an example method of scoring clusters, according to an embodiment. Although the method is described in conjunction with the systems of FIGS. 1 and 4, persons skilled in the art will understand that any system configured to perform the method steps, in any order, is within the scope of the present invention.

As shown, the example cluster scoring method 700 begins at block 705, where the cluster engine 120 retrieves a scoring strategy 442 and a cluster 252 (for example, a cluster just created using the method 600 of FIG. 6). In other cases, the cluster engine 120 may retrieve the scoring strategy 442 associated with a stored cluster. Other alternatives include an analyst selecting a scoring strategy 442 through the client 135, the cluster engine 120 via the cluster analysis UI 500, a script, or a configuration file. The cluster engine 120 may retrieve the selected scoring strategy 442 from the scoring strategy store 440, and the cluster 252 from the cluster list 250.

At block 710, the cluster engine 120 executes the scoring strategy 442 against the cluster 252. The scoring strategy 442 may specify characteristics of the related data entities within the cluster 252 to aggregate. The cluster engine 120 may execute the scoring strategy 442 by aggregating the specified characteristics together to determine a score. For instance, the cluster engine 120 may aggregate account balances of related data entities that are account data entities. In such a case, a total amount of dollars (or average dollars or any other aggregated, averaged, or normal attribute of the cluster) included within the balances of the account data entities of the cluster 252 may be the score of the cluster 252.

At block 715, the cluster engine 120 may store the score with the cluster 252 in the cluster list 250. At step 720, the cluster engine 120 determines if there are more clusters 252 to score. For example, in one embodiment, a set of clusters may be re-scored using an updated scoring strategy. In other cases, the cluster engine may score each cluster when it is created from a seed (based on a given cluster generation and corresponding scoring strategy). If more clusters remain to be scored (or re-scored), the method 700 returns to block 705.

At block 725, the cluster engine 120 may rank the clusters 252 according to the scores of the clusters 252. For example, after re-scoring a set of clusters (or after scoring a group of clusters generated from a set of seeds), the cluster engine 125 may rank the clusters 252 from highest score to lowest score. The ranking may be used to order a display of summaries of the clusters 252 presented to the analyst. The analyst may rely upon the ranking and scores to determine which clusters 252 to analyze first. The ranking and sorting may generally be performed on-demand when an analyst is looking for a cluster to investigate. Thus, the ranking need not happen at the same time as scoring. Further, the clusters may be scored (and later ranked) using different raking strategies.

In various embodiments, multiple scores for each cluster may be determined according to methods similar to the example method 700. Accordingly, clusters may be ranked according to any of multiple scores. Additionally, in various embodiments, multiple scores may be combined and/or aggregated into a metascore that may be used to rank the clusters. Various example score and metascore determinations are described below in reference to FIGS. 10C, 11C, 12C, and 13C.

IX. Example Implementation Mechanisms/Systems

Figure 8:
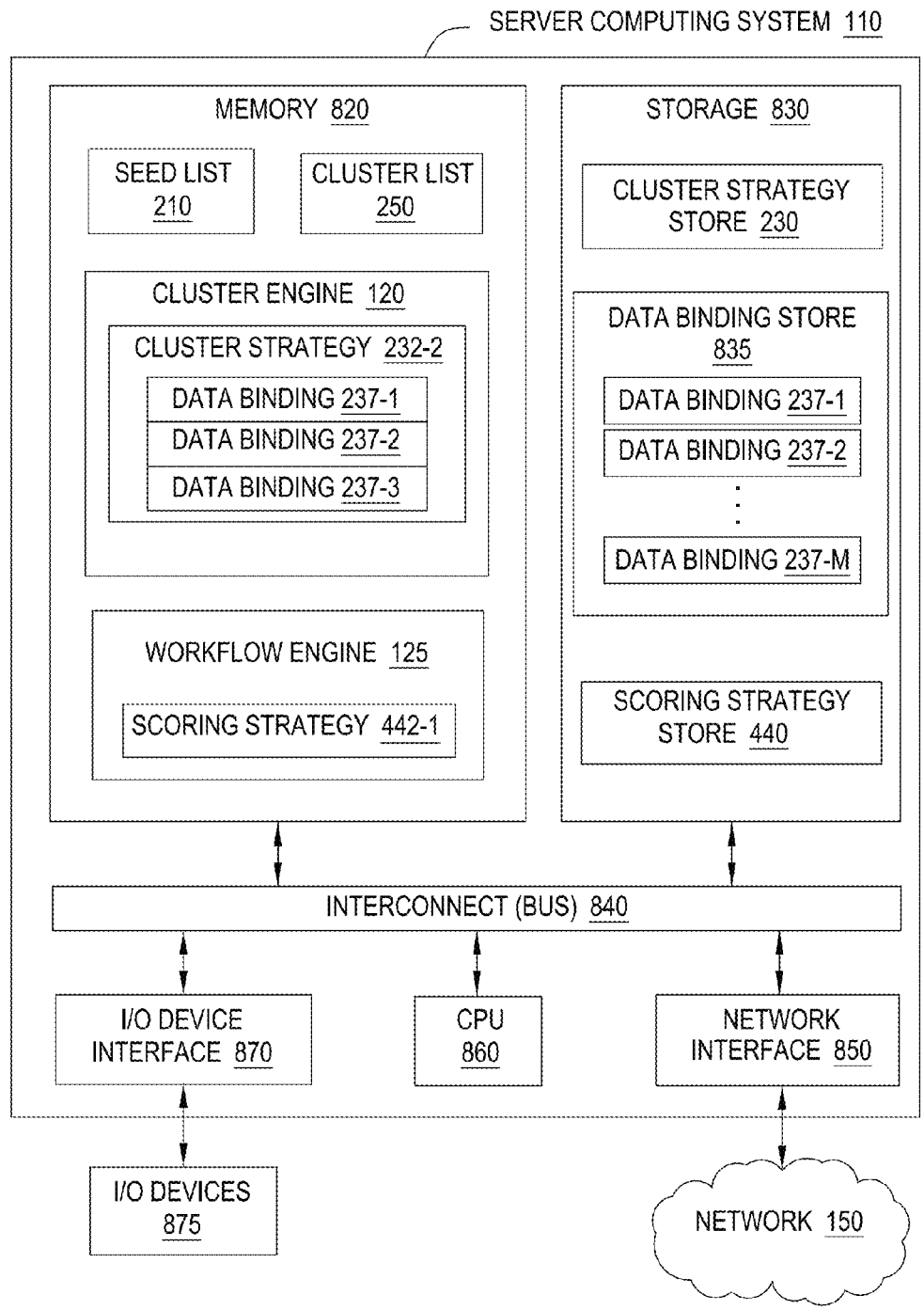
FIG. 8 illustrates components of an illustrative server computing system, according to an embodiment of the present disclosure.

FIG. 8 illustrates components of an illustrative server computing system 110, according to an embodiment. The server computing system 110 may comprise one or more computing devices that may perform a variety of tasks to implement the various operations of the data analysis system. As shown, the server computing system 110 may include, one or more central processing unit (CPU) 860, a network interface 850, a memory 820, and a storage 830, each connected to an interconnect (bus) 840. The server computing system 110 may also include an I/O device interface 870 connecting I/O devices 875 (for example, keyboard, display, mouse, and/or other input/output devices) to the computing system 110. Further, in context of this disclosure, the computing elements shown in server computing system 110 may correspond to a physical computing system (for example, a system in a data center, a computer server, a desktop computer, a laptop computer, and/or the like) and/or may be a virtual computing instance executing within a hosted computing environment.

The CPU 860 may retrieve and execute programming instructions stored in memory 820, as well as store and retrieve application data residing in memory 820. The bus 840 may be used to transmit programming instructions and application data between the CPU 860, I/O device interface 870, storage 830, network interface 850, and memory 820. Note that the CPU 860 is included to be representative of, for example, a single CPU, multiple CPUs, a single CPU having multiple processing cores, a CPU with an associate memory management unit, and the like.

The memory 820 is included to be representative of, for example, a random access memory (RAM), cache and/or other dynamic storage devices for storing information and instructions to be executed by CPU 860. Memory 820 also may be used for storing temporary variables or other intermediate information during execution of instructions to be executed by CPU 860. Such instructions, when stored in storage media accessible to CPU 860, render server computing system 110 into a special-purpose machine that is customized to perform the operations specified in the instructions.

The storage 830 may be a disk drive storage device, a read only memory (ROM), or other static, non-transitory, and/or computer-readable storage device or medium coupled to bus 840 for storing static information and instructions for CPU 860. Although shown as a single unit, the storage 830 may be a combination of fixed and/or removable storage devices, such as fixed disc drives, removable memory cards, and/or optical storage, network attached storage (NAS), and/or a storage area-network (SAN).

Programming instructions, such as the cluster engine 120 and/or the workflow engine 125, may be stored in the memory 820 and/or storage 830 in various software modules, The modules may be stored in a mass storage device (such as storage 830) as executable software codes that are executed by the server computing system 110. These and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Illustratively, according to an embodiment, the memory 820 stores a seed list 210, a cluster engine 120, a cluster list 250, and a workflow engine 125 (as described with reference to the various figures above). The cluster engine 120 may include a cluster strategy 232-2. The particular cluster strategy 232-2 may include data bindings 237-1, 237-2, and 237-3, with which the cluster engine 120 may access the cluster data source 160. The workflow engine 125 may include a scoring strategy 442-1.

Illustratively, according to an embodiment, the storage 830 includes a cluster strategy store 230, data bindings store 835, and a scoring strategy store 440. As described above, the cluster strategy store 230 may include a collection of different cluster strategies 232, such as cluster strategy 232-2. For example, the cluster strategy store 230 may be a directory that includes the cluster strategies 232-1, 232-2 . . . 232-N as distinct modules. The scoring strategy store 440 may include a collection of different scoring strategies 442, such as scoring strategy 442-2, and may also be a directory of distinct modules. The data binding store 835 may include data bindings 237-1, 237-2 . . . 237-M, which may also be stored as distinct modules within a directory.

Although shown in memory 820, the seed list 210, cluster engine 120, cluster list 250, and workflow engine 125, may be stored in memory 820, storage 830, and/or split between memory 820 and storage 830. Likewise, copies of the cluster strategy 232-2, data binding 237-1, 237-2, and 237-3, and scoring strategy 442-2 may be stored in memory 820, storage 830, and/or split between memory 820 and storage 830.

The network 150 may be any wired network, wireless network, or combination thereof. In addition, the network 150 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As described above, in various embodiments the system may be accessible by an analyst (or other operator or user) through a web-based viewer, such as a web browser. In this embodiment, the user interface may be generated by the server computing system 110 and transmitted to the web browser of the analyst. Alternatively, data necessary for generating the user interface may be provided by the server computing system 110 to the browser, where the user interface may be generated. The analyst/user may then interact with the user interface through the web-browser. In an embodiment, the user interface of the data analysis system may be accessible through a dedicated software application. In an embodiment, the client computing device 130 may be a mobile computing device, and the user interface of the data analysis system may be accessible through such a mobile computing device (for example, a smartphone and/or tablet). In this embodiment, the server computing system 110 may generate and transmit a user interface to the mobile computing device. Alternatively, the mobile computing device may include modules for generating the user interface, and the server computing system 110 may provide user interaction data to the mobile computing device. In an embodiment, the server computing system 110 comprises a mobile computing device. Additionally, in various embodiments any of the components and/or functionality described above with reference to the server computing system 110 (including, for example, memory, storage, CPU, network interface, I/O device interface, and the like), and/or similar or corresponding components and/or functionality, may be included in the client computing device 130.

According to various embodiments, the data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing devices of the data analysis system may generally be controlled and/or coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. The modules or computing device functionality described herein are preferably implemented as software modules, but may be represented in hardware. Generally, the modules described herein refer to software modules that may be combined with other modules or divided into sub-modules despite their physical organization or storage.

Server computing system 110 may implement various of the techniques and methods described herein using customized hard-wired logic, one or more ASICs or FPGAs, firmware and/or program logic which, in combination with various software modules, causes the server computing system 110 to be a special-purpose machine. According to one embodiment, the techniques herein are performed by server computing system 110 in response to CPU 860 executing one or more sequences of one or more modules and/or instructions contained in memory 820. Such instructions may be read into memory 820 from another storage medium, such as storage 830. Execution of the sequences of instructions contained in memory 820 may cause CPU 840 to perform the processes and methods described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage 830. Volatile media includes dynamic memory, such as memory 820. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 840. Transmission media may also take the form of acoustic or light waves, such as those generated during radio-wave and infra-red data communications.

Various forms of media may be involved in carrying one or more sequences of one or more instructions to CPU 860 for execution. For example, the instructions may initially be carried on a magnetic disk or solid state drive of a remote computer. The remote computer may load the instructions and/or modules into its dynamic memory and send the instructions over a telephone or cable line using a modem. A modem local to server computing system 820 may receive the data on the telephone/cable line and use a converter device including the appropriate circuitry to place the data on bus 840. Bus 840 carries the data to memory 820, from which CPU 860 retrieves and executes the instructions. The instructions received by memory 820 may optionally be stored on storage 830 either before or after execution by CPU 860.

X. Additional Example Applications

While financial fraud using credit card accounts is used as a primary reference example in the discussion above, the techniques described herein may be adapted for use with a variety of data sets and in various applications. For example, information from data logs of online systems may be evaluated as seeds to improve cyber security. In such a case, a seed may be a suspicious IP address, a compromised user account, and the like. From the seeds, log data, DHCP logs, IP blacklists, packet captures, webapp logs, and other server and database logs may be used to create clusters of activity related to the suspicions seeds. Other examples include data quality analysis used to cluster transactions processed through a computer system (whether financial or otherwise). A number of examples of such applications are described in detail below in reference to, for example, FIG. 9, FIGS. 10A-10E (tax fraud detection), FIGS. 11A-11E (beaconing malware detection), 12A-12E (malware user-agent detection), and FIGS. 13A-13E (activity trend detection).

XI. Example Generalized Application of the Data Analysis System

Figure 9:
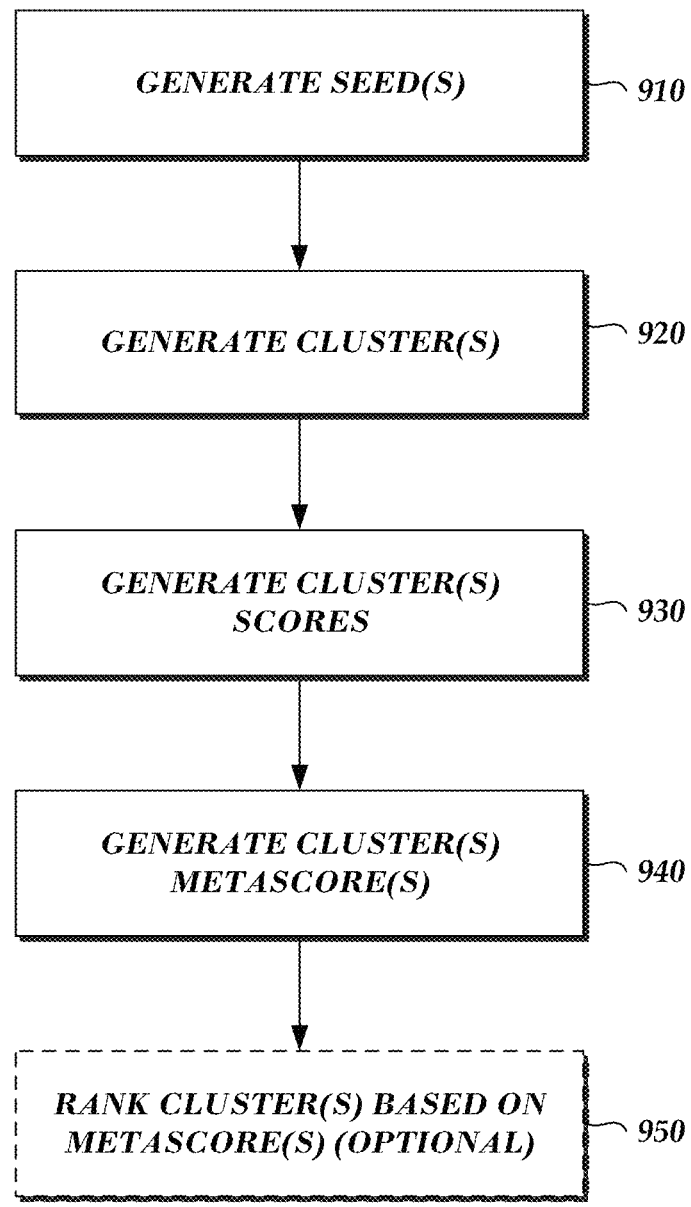
FIG. 9 is a flowchart of an example generalized method of the data analysis system, according to various embodiments of the present disclosure.

FIG. 9 is a flowchart of an example generalized method of the data analysis system, according to various embodiments of the present disclosure. In various embodiments, fewer blocks or additional blocks may be included in the process, or various blocks may be performed in an order different from that shown in the figure. In an embodiment, one or more blocks in the figure may be performed by various components of the data analysis system, for example, server computing system 110 (described above in reference to FIG. 8).

As described above, and as shown in FIG. 9, the data analysis system may generate a seed or multiple seeds (block 910), may generate clusters based on those seed(s) (block 920), may generate a score or multiple scores for each generated cluster (block 930), may generate a metascore for each generated cluster (block 940), and may optionally rank the generated clusters based on the generated metascores (block 950). In various embodiments, the data analysis system may or may not generate multiple scores for each cluster, may or may not generate metascores for each cluster, and/or may or may not rank the clusters. In an embodiment, the system may rank clusters based on one or more scores that are not metascores.

Further, as described above, the seeds may include one or multiple data entities, and may be generated based on seed generation strategies and/or rules. Similarly, the clusters may include one or multiple data entities related to a seed, including the seed, and may be generated based on cluster generation strategies and/or rules (including data bindings and/or searching and filtering are performed through, for example, a generic interface to various data sources). Scores and metascores may be determined based on attributes, characteristics, and/or properties associated with data entities that make up a given cluster.

Four example applications of the data analysis system are described below (FIGS. 10A-10E (tax fraud detection), FIGS. 11A-11E (beaconing malware detection), 12A-12E (malware user-agent detection), and FIGS. 13A-13E (activity trend detection)) in which various example methods of seed generation, cluster generation, cluster scoring and metascoring, and cluster ranking are described. The four example applications are not intended to be limiting of the scope of the described methods, systems, and processes of the present disclosure. With respect to each of the flowcharts described below (for example, the flowcharts of FIGS. 10A-10C, 11A-11C, 12A-12C, and 13A-13C), it is to be understood that, in various embodiments, fewer blocks or additional blocks may be included in the example processes depicted, or various blocks may be performed in an order different from that shown in the figures. Further, in various embodiments, one or more blocks in the figures may be performed by various components of the data analysis system, for example, server computing system 110 (described above in reference to FIG. 8) and/or another suitable computing system.

XII. Example Application of the Data Analysis System to Tax Fraud Detection

FIGS. 10A-10E depict various aspects of the data analysis system as applied to detecting tax fraud. For example, the data analysis system may be used in conjunction with tax-related data entities to detect fraudulent tax-related activity. Fraudulent tax-related activity may include, for example, a fraudster stealing another's identity and filing on their behalf to fraudulently extract tax return money from a government. The tax return money may be automatically deposited in a bank account and then retrieved by the fraudster. The data analysis system may be used to detect and prevent such fraudulent activity.

According to various embodiments, and as described below, tax-related data entity seeds may be generated by the system as described below in reference to FIG. 10A. Each of these tax-related entity seeds may include one or more tax-related entities, and the seeds may be generated based on a likelihood that the seeds represent fraudulent activities and/or data. Each of the seeds may be used as a basis for clustering various other tax-related entities, as described in reference to FIGS. 10B and 10D. Accordingly, the generated clusters may represent various data entities that are all related to potentially fraudulent activity. Each of the generated clusters may then be scored according to various criteria (or rules), as described below in reference to FIG. 10C. The various scores and metascores generated by the system may provide indications to an analyst regarding the likelihood that the cluster includes entities representing fraudulent activities and/or data. The information, including the clusters and scores generated by the data analysis system, may be presented to an analyst via a user interface as described below in reference to FIG. 10E. Advantageously, according to an embodiment, the analyst may sort the clusters according to their determined scores (and/or metascores) so as to prioritize investigations into potential fraud. Further, the data analysis system may advantageously automatically cluster or group many related data entities to enable rapid investigation and evaluation by an analyst to detect likely tax fraud.

a. Tax Fraud Detection: Seed Generation

FIG. 10A is a flowchart of an example of a seed generation method 910a of the data analysis system as applied to tax fraud detection, according to various embodiments of the present disclosure. The seed generation method 910a may generally be understood to correspond to block 910 (seed generation) of the generalized process of FIG. 9.

Referring to FIG. 10A, at block 1012, tax-related data and/or data entities may be received and/or accessed by the data analysis system. For example, tax-related data entities may include tax returns (1012a), pay statements (1012b), and/or other third-party data (1012c), just to name a few. Such tax-related data may be accessed and/or received from, for example, various cluster data sources 160 (as shown in FIG. 1).

At block 1014, various tax fraud indicators may be received and/or accessed by the data analysis system. Tax fraud indicators may include, for example, various data, rules, and/or criteria that may be compared with the tax-related data entities to determine that a tax-related entity is likely associated with fraudulent activity. Examples of tax fraud indicators may include Internet Protocol (IP) addresses that are frequently used, for example, to file multiple tax returns in a short period of time (1014a); financial institution accounts that receive multiple tax refunds (1014b); and/or locations (such as physical addresses) associated with and/or receiving multiple tax refunds (1014c); just to name a few. Other tax fraud indicators may include, for example, various of the cluster scoring criteria described below in reference to FIG. 10C. Such tax fraud indicators may be derived from automatic or manual analysis of tax-related data. For example, the data analysis system may automatically process large amounts of tax-returns across multiple years to determine frequently used IP addresses, bank accounts that receive multiple tax refunds, and/or physical addresses that are frequently used to receive tax refunds. Tax fraud indicators may also be derived from known lists, and/or may be provided by an analyst or other user of the data analysis system. In various embodiments, tax fraud indicators may be referred to as business rules. Further, in various embodiments, the tax fraud indicators define suspicious characteristics that may be associated with tax-related data entities that may indicate possible fraudulent activity.

At block 1016, the tax-related data may be analyzed in view of, or compared to, the tax fraud indicators, and particular tax-related data entities that may be associated with tax fraud are determined. For example, a tax return data entity may include a return address that is a known tax fraud indicator. In this example, the tax return data entity may be determined by the system possibly to be related to tax fraud. In another example, a tax return may be filed from a particular IP address known to be a tax fraud indicator, and/or may include a bank account number that is a known tax fraud indicator. In this example, the tax return may again be determined by the system to be possibly related to tax fraud.

At block 1018, the tax-related entities that are determined to be possibly related to tax fraud may be used as seeds by the data analysis system. Accordingly, the method 910a may identify data entity seeds that may be used by the data analysis system in a tax-fraud detection application.

b. Tax Fraud Detection: Cluster Generation

Turning now to FIG. 10B, a flowchart of an example of a clustering method 920a of the data analysis system as applied to tax fraud detection is shown, according to various embodiments of the present disclosure. The clustering method 920a may generally be understood to correspond to block 920 (cluster generation) of the generalized process of FIG. 9. Additionally, the clustering method 920a may correspond to a clustering strategy, as described above. In the flowchart of FIG. 10B, block 1022 indicates that each of the following blocks (1024, 1026) may be performed for each of the seeds generated by the seed generation method 910a of FIG. 10A.

At block 1024, any tax-return data entities that are related to the seed may be clustered. Clustering of data entities may be accomplished as generally described above, in which data bindings are executed and/or searching and filtering are performed (through, for example, a generic interface to various data sources) as part of a clustering strategy. Additionally, as described above, clustered data entities may be related by, for example, sharing the same or similar properties, characteristics, and/or metadata. For example, assume a seed is a bank account. In block 1024, any tax returns that include mention of the bank account may be clustered with the bank account. This example may be seen visually in FIG. 10D, which illustrates an example growth of a cluster of related data entities in a tax fraud detection application, according to an embodiment of the present disclosure. In FIG. 10D, boxes indicate data entities, while lines between boxes indicate links that connect data entities. In the example of FIG. 10D, a seed bank account 1050 has been generated (such as by the process of FIG. 10A). Then, in a clustering step corresponding to block 1024 (of FIG. 10B) and represented by the internal cluster dashed line, a related tax return 1051 that references the seed bank account is added to the cluster.

Returning to FIG. 10B, at block 1026, any other data entities related to the clustered tax return(s) or the seed may be added to the cluster. Other related data entities may include for example, persons (1026a), physical addresses (1026b), and/or IP addresses (1026c), just to name a few. An example is illustrated visually in FIG. 10D where multiple data entities have been added to the cluster, as indicated by the external cluster dashed line. For example, the data analysis system has clustered two persons 1054 and 1056 (who may be, for example, a husband and wife referenced by the tax return), a W-2 1052 (which may be a document including employment related data), an IP address 1058 (from which the tax return 1051 may have been electronically filed), another bank account 1060, and a physical address 1062. Additionally, the data analysis system has determined that both the person 1054 and the W-2 1052 are related (for example, the name of person 1054 may be referenced by the W-2 1052), the two persons 1054 and 1056 are related (for example, the tax return 1051 may indicate that they are husband and wife), and the person 1056 is related to the bank account 1050.

Returning again to FIG. 10B, dashed line 1028 indicates that the cluster generation method may optionally repeat multiple times until, for example, the clustering strategy is completed and/or no additional related data entities are found by the system. For example, in reference to FIG. 10D, additional data entities may be clustered including another tax return 1064 related to bank account 1060 and/or a business 1066 related to the W-2 1052 and/or the person 1054. As indicated by ellipses 1071, 1072, and 1073, additional data entities may be clustered in subsequent clustering steps. Further, referring to FIG. 10B, and as described above, at 1028 various clusters of data entities may optionally be merged and/or collapsed when common data entities and/or properties are determined between the various clusters. For example, the system may determine that two different generated clusters both include person 1056. Accordingly, the system may merge the two clusters each including the common data entity (person 1056) into a single cluster.

Returning to FIG. 10B, in an embodiment the clustering method 920a may proceed without block 1024 (cluster related tax returns), such that any data entities (including tax returns) related to the seed are iteratively clustered. Accordingly, in an embodiment the clustering method 920a may iteratively cluster related data entities.

Additionally, in an embodiment a cluster graph similar to the cluster illustration of FIG. 10D may be made available to an analyst or other user of the data analysis system. For example, an analyst may select a button (for example, an "Investigate in Graph" button) in a user interface of the system to view a cluster graph of a selected cluster.

c. Tax Fraud Detection: Cluster Scoring

Turning now to FIG. 10C, a flowchart of example cluster scoring methods 930a, 940a of the data analysis system as applied to tax fraud detection is shown, according to various embodiments of the present disclosure. The clustering scoring methods 930a, 940a may generally be understood to correspond to blocks 930 and 940 (cluster score and metascore generation) of the generalized process of FIG. 9. Additionally, the clustering scoring methods 930a, 940a may correspond with scoring strategies, as described above. In the flowchart of FIG. 10C, block 1032 indicates that each of the following blocks (1034, 1036, and 1042) may be performed for each of the clusters generated by the cluster generation method 920a of FIG. 10B.

At block 1034, the data analysis system may access and/or receive tax fraud scoring criteria. The tax fraud scoring criteria may include any number of rules or scoring strategies such that multiple scores may be generated for each cluster. Several non-limiting examples of tax fraud scoring criteria may include: a number of tax returns in the cluster known to be fraudulent; a presence of particular types of physical addresses (for example, post office boxes and/or private delivery service mail boxes); a total number of tax returns in the cluster; a similarity between requested tax return amounts among the tax returns in the cluster; a number of tax returns in the cluster associated with persons having a recent change in address and/or bank account; an inclusion in the cluster of persons under a particular age and/or persons known to be dead; tax returns including requests for particular types of credits in the cluster; a number of persons in the cluster that have never before filed a tax return; and/or a number of known fraud accounts in the cluster.

At block 1036, the tax fraud scoring criteria may be applied to the clusters and cluster scores may be generated. In an embodiment, each cluster score may include an absolute value and/or a weighted value. For example, a given cluster may include two known fraudulent tax returns. When a scoring criteria is applied that indicates a known number of fraudulent tax returns, the absolute value of the score generated would be two (2), as the cluster includes two such tax returns. However, the scoring criteria may also include a relative weighting that indicates the importance of the particular score ("a number of known fraudulent tax returns") to an overall evaluation of the cluster in the context of tax fraud. Such a relative weighting, in one embodiment, may be a number between 0 and 1, where a number closer to one indicates a greater importance. For example, if the "number of known fraudulent tax returns" score is considered relatively important to an evaluation of the cluster, it may be given a relative weight of, for example, "0.7". On the other hand, a relatively less important score/consideration (for example, a number of first time filers) may be given a relative weight of, for example, "0.15". Then, when a score is calculated by the data analysis system, the relative weight may be multiplied by the absolute value to arrive at a corresponding relative value. For example, in the "number of fraudulent returns" example, where an absolute value of 2 was determined, a relative value may be determined by multiplying 2 by 0.7, to arrive at a relative value of 1.4. In other embodiments, various other methods may be employed by the data analysis system to determine relative values of cluster scores. For example, as may be recognized by one of skill in the art, the system may normalize the absolute values of each of the scores before applying a relative weighting to arrive at a weighted value. Examples of cluster scores presented to an analyst or other user of the data analysis system are shown and described below in reference to FIG. 10E. In an embodiment, the importance of particular scores may be determined and/or based on empirical determinations and/or past cluster evaluations. For example, over time the system and/or an analyst may determine, based on evaluations of clusters by analysts, that particular scores are better indicators of fraud than others. Such better indicators may be determined to be more important, and may therefore be weighted more heavily by the system.

At block 1042, a metascore may be generated for the clusters. The cluster metascore may be based on a combination or aggregation of the individual scores generated in block 1036. Alternatively, the metascores may be separately determined scores. In an embodiment, a metascore may be calculated by summing, multiplying, and/or otherwise aggregating or averaging the various individual scores together. The metascore may, in an embodiment, capture the relative importance of each of the individual scores by weighting each of the individual scores in a manner similar to that described above with reference to block 1036.

In various embodiments, metascores and/or scores may advantageously enable an analyst to directly compare and/or prioritize various clusters, and/or may advantageously be used by the data analysis system to prioritize a list of clusters and/or scores related to a cluster.

d. Tax Fraud Detection: Example User Interface

FIG. 10E illustrates an example cluster analysis user interface of the data analysis system as applied to tax fraud detection, according to an embodiment of the present disclosure. The example user interface of FIG. 10E includes a list of clusters 1082, a list of scores 1084, and a detailed view of a score 1086. In various embodiments, more or fewer elements may be included in the user interface, and/or the elements may be arranged differently. Additionally, while certain aspects of the user interface of FIG. 10E may be similar to those of the user interface of FIG. 5 described above, the user interface of the FIG. 10E includes a number of differences. For example, differing from the user interface of FIG. 5, the user interface of the FIG. 10E may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores, as described above.

In the example user interface of FIG. 10E, an analyst or user has selected "Tax Fraud Cluster 1." Accordingly, various scores associated with that cluster may be displayed in the list of scores 1084. For example, scores are listed for "Known fraudulent returns" and "Returns w/ similar values," among others. Additionally, in the example user interface, the analyst has selected the "Returns w/similar values" score. Accordingly, details related to that score may be displayed in the detailed view 1086.

According to an embodiment, various items of information may be included in the user interface that may be useful to an analyst in evaluating and/or investigating the generated clusters. For example, metascores associated with each of the generated clusters may be shown in the list of clusters 1082, and/or the clusters may be prioritized according to the metascores. In another example, absolute values (1090) and/or weighted values (1088) may be displayed in the list of scores 1084 for each score. In the example shown, a metascore of "0.5" may be calculated for "Tax Fraud Cluster 1" by, for example, averaging the various cluster scores (for example, (1.0+0.8+0.6+0.6+0+0)/6=0.5). In another example, the detailed view 1086 may include a graph that shows additional information related to the selected score. For example, in FIG. 10E, the graph shown in the detailed view 1086 shows a distribution of the values of tax return requests associated with each of the tax returns in the cluster. In the example, both of the tax returns in the cluster included a request for a tax return of $2,000. In other embodiments, various other detailed information may be included in the user interface of FIG. 10E.

In an embodiment, the data analysis system may automatically evaluate the generated clusters to determine a likelihood of tax fraud. For example, the system may determine that a cluster having a metascore below a particular threshold is likely not fraud, while a cluster having a metascore above another particular threshold likely is fraud. In an embodiment, the system may determine that a cluster having a metascore within a particular range of thresholds requires additional analysis by an analyst as the likelihood of fraud is not conclusive. In an embodiment, an analyst may adjust the thresholds, the metadata calculations, and/or the weighting applied to the scores. Further, the analyst may mark various clusters as, for example, fraudulent, likely fraudulent, likely not fraudulent, and/or not fraudulent. Additionally, the analyst may dispatch other analysts to review particular clusters and/or mark particular clusters for further analysis.

XIII. Example Application of the Data Analysis System to Beaconing Malware Detection FIGS. 11A-11E depict various aspects of the data analysis system as applied to detecting beaconing malware. For example, the data analysis system may be used in conjunction with beaconing malware-related data entities to detect malware on a computer system or a network of computer systems. Beaconing malware activity may include, for example, a software program maliciously installed on a target computer system that periodically attempts to transmit data and/or communicate with a remote computer system. Typically, beaconing malware may attempt connections on a regular, well-defined and periodic basis, where the time between attempts is on the order of hours, days, weeks, or months. Such a malicious software program may be dormant (with the exception of beaconing activity) for a period of time before it is activated by the remote computer system. Once activated, the malicious software program may perform various malicious actions including, for example, accessing, modifying, and/or deleting files; extracting personal data and information; obtaining passwords and usernames; and the like. Accordingly, it may be important to detect such beaconing malware so that it may be removed before it is activated. The data analysis system may be used to detect such beaconing malware, as described below.

According to various embodiments, beaconing malware-related data entity seeds (referred to herein as "beaconing seeds") may be generated by the system as described below in reference to FIG. 11A. Each of these beaconing seeds may include pairs of beaconing entities (referred to a "beaconing pairs"), such as a beacon originator and a beacon recipient, and the seeds may be generated based on a likelihood that the seeds represent beaconing activities and/or data. Each of the seeds may be used as a basis for clustering various other beaconing malware-related entities, as described in reference to FIGS. 11B and 11D. Accordingly, the generated clusters may represent various data entities that are all related to potential beaconing malware-related activity. Each of the generated clusters may then be scored according to various criteria (or rules), as described below in reference to FIG. 11C. The various scores and metascores generated by the system may provide indications to an analyst regarding the likelihood that the cluster includes entities representing beaconing activities and/or data. The information, including the clusters and scores generated by the data analysis system, may be presented to an analyst via a user interface as described below in reference to FIG. 11E. Advantageously, according to an embodiment, the analyst may sort the clusters according to their determined scores (and/or metascores) so as to prioritize investigations into potential beaconing malware. Further, the data analysis system may advantageously automatically cluster or group many related data entities to enable rapid investigation and evaluation by an analyst to detect likely beaconing malware.

In an embodiment, and as described below, the data analysis system may be used in a network environment in which an internal network is in communication with an external network. The system may be used to determine whether any computer systems of the internal network have been infected by beaconing malware that is communicating with computer systems of the external network. Various computerized devices may be included in the internal network that may be capable to capturing and/or logging data traffic between the internal network and the external network including, for example, network routers and/or switches.

a. Beaconing Malware Detection: Seed Generation

FIG. 11A is a flowchart of an example of a seed generation method 910b of the data analysis system as applied to beaconing malware detection, according to various embodiments of the present disclosure. The seed generation method 910b may generally be understood to correspond to block 910 (seed generation) of the generalized process of FIG. 9.

Referring to FIG. 11A, at block 1112, network communications and/or data traffic information between the internal and external networks may be captured by the data analysis system. Various items of information may be captured including, for example, external IP addresses contacted (1112a), external domains contacted (1112b), internal IP addresses contacting the external IP addresses and domains (1112c), and the like. These items of information may be captured by, for example, a network traffic router that connects the internal and external networks to one another. The network traffic router may, for example, log such items of information such that they may be read and analyzed by the data analysis system. Alternatively, the network traffic may be captured by, for example, other types of computerized sensors. Each of the above described items of information may be a data entity in the context of the data analysis system.

At block 1113, the system may generate internal-external connection pairs. Each of the internal-external connection pairs may include a particular internal IP address and a particular external IP address and/or domain that was contacted by the internal IP address. At block 1114, time series of the generated internal-external connection pairs may be generated. For example, the system may determine sets of connection pairs that have common internal IP addresses and external IP addresses or domains. Then, for each set, a time series may be generated that represents each point in time that the same or a similar connection is made between a particular internal IP address and external IP address or domains. Each of the time series may span a particular time period. For example, each time series may span a number of days, weeks, months, or years. Thus, a connection pair time-series (or simply "connection pair series" or "connection series"), may indicate multiple connections made between a particular internal and external IP address (or domain or other device identifier) and/or a periodicity or other pattern indicating when the connections were made. The internal-external connection pairs may be plotted along each time series for the particular time period.

At block 1116, the data analysis system may filter out any noise in each time series. For example, the connection pairs in each connection series may be analyzed in order to identify any connection pairs of the particular connection series that should be indicated as noise. Noise in a connection series may include, for example, any internal-external connection pairs that have a low likelihood of being related to beaconing activity and/or to malicious activity. Various filter criteria may be applied to filter out noise. Examples of noise filtering criteria may include, but are not limited to: filter 1116a, which detects frequently established connections, such as the same or similar connection pairs (for example, multiple connection pairs from the same internal IP to the same external IP and/or domain) that occur with short intervals (or deltas) of time between them (for example, intervals on the order of seconds, or intervals that are shorter than are typically employed by beaconing malware); filter 1116b, which detects connection pairs that have only been occurring for a short period of time (for example, for a week or less); filter 1116c, which detects connection pairs with popular or well-known legitimate external domains (for example, a third-party produced list of popular domains may be used by the system); and/or filter 1116d, which detects connection pairs made by legitimate software for, for example, software updates (in an embodiment, this filter criteria may be applied on a per-computer system basis, such that a determination may be made regarding the legitimacy of particular pieces of software on each individual computer system).

Once connection pairs that include noise, or which are not likely related to beaconing malware, are filtered from each connection series, at block 1117 a beaconing score may be computed for each connection pair series. A beaconing score may be computed in any of various ways. One example of computing a beaconing score is shown in block 1117a. In the example of block 1117a, the system may calculate a variance of the particular connection pair series. The variance may, for example, provide an indication of the regularity, or periodicity, of the connection pairs over time. Higher variances may indicate that the connection pair is less likely to be related to malware, as malware beaconing activity may generally occur at very regular intervals. Thus, lower variances may indicate that the connection pair is more likely to be related to malware beaconing activity. Another example of computing a beaconing score is shown in block 1117b. In the example of block 1117b, the system may calculate a mean of the particular connection pair series. The mean may, for example, provide an indication of the average time between each connection pair over time. Particular mean values, for example, a particular number of days, weeks, and/or months, may indicate higher or lower likelihood that the connection series is related to malware beaconing activity. In another example, some combination of a variance and a mean of a connection pair series may be used by the system as a beaconing score (for example, a variance divided or normalized by a mean or a mean squared). In an embodiment, the variance is calculated based on an average of squared differences from the mean time between connections in a time series.

At block 1118, the system may determine which connection pairs have beaconing scores that satisfy a particular threshold. For example, the system may determine that any beaconing pairs having beaconing scores below a particular variance are likely to represent malware beaconing activity. Accordingly, the data analysis system may designate and use those connection pairs as seeds. Thus, the method 910b may be used to generate seeds including a connection pair (e.g., an internal IP address and an external IP address or domain) that may be used by the data analysis system in a beaconing malware detection application.

b. Beaconing Malware Detection: Cluster Generation

Turning now to FIG. 11B, a flowchart of an example of a clustering method 920b of the data analysis system as applied to beaconing malware detection is shown, according to various embodiments of the present disclosure. The clustering method 920b may generally be understood to correspond to block 920 (cluster generation) of the generalized process of FIG. 9. Additionally, the clustering method 920b may correspond to a clustering strategy, as described above. In the flowchart of FIG. 11B, block 1122 indicates that the following block (1124) may be performed for each of the seeds generated by the seed generation method 910b of FIG. 11A.

At block 1124, any data entities that are related to the seed may be clustered. Clustering of data entities may be accomplished as generally described above, in which data bindings are executed and/or searching and filtering are performed (through, for example, a generic interface to various data sources) as part of a clustering strategy. Additionally, as described above, clustered data entities may be related by, for example, sharing the same or similar properties, characteristics, and/or metadata. Examples of data entities that may be clustered include, but are not limited to: users (for example, persons having accounts on particular computer systems), internal IP addresses, internal IP addresses that connect to external domains, internal computer systems, internal computer systems that connect to external domains, external IP addresses, external domains, external IP addresses associated with external domains, other data feed data entities (for example, data entities drawn from public and/or private whitelists or blacklists, such as data entities representing known bad domains, known good domains, known bad IP addresses, and the like), host-based events (such as, for example, virus scan alerts and/or logged events, intrusion prevention system alerts and/or logged events, and the like), and the like.

FIG. 11D illustrates an example growth of a cluster of related data entities in a beaconing malware detection application, according to an embodiment of the present disclosure. In FIG. 11D, boxes indicate data entities, while lines between boxes indicate links that connect data entities. As described above, seeds in the described beaconing-malware detection application of the data analysis system may be connection pairs. As shown in the example of FIG. 11D, a seed connection pair has been generated (such as by the process of FIG. 11A) that includes an internal IP address 1152 and an external domain 1154, as indicated visually by the internal seed dashed line 1150. Then, in a clustering step corresponding to block 1124 (of FIG. 11B) and represented by the external cluster dashed line 1166, various other data entities related to the seed data entities may be added to the cluster. For example, the data analysis system has clustered an internal computer system 1156 (that may be associated with the internal IP address 1152), a user 1158 (who may be a user of the computer system 1156 at the internal IP address 1152), and two other computer systems 1160 and 1162 that have each also connected to the external domain 1154.

Returning again to FIG. 11B, dashed line 1126 indicates that the cluster generation method may optionally repeat multiple times until, for example, the clustering strategy is completed and/or no additional related data entities are found by the system. For example, in reference to FIG. 11D, additional data entities may be clustered including host-based events 1167 and 1168 associated with the computer system 1156, and users 1172 and 1174 of the computer system 1160. As indicated by ellipses 1164, 1170 and 1176, additional data entities may be clustered in subsequent clustering steps. Further, referring to FIG. 11B, and as described above, at 1126 various clusters of data entities may optionally be merged and/or collapsed when common data entities and/or properties are determined between the various clusters. For example, the system may determine that two different generated clusters both include user 1158. Accordingly, the system may merge the two clusters each including the common data entity (user 1158) into a single cluster. Accordingly, in an embodiment the clustering method 920b may iteratively cluster related data entities.

In an embodiment, the various clustered data entities may include various properties and characteristics, including information regarding data communications and requests between internal and external computer systems. For example, a given connection pair (or seed) may represent multiple connections over a period of time (as described above in reference to FIG. 11A). Accordingly, various information related to the connections, including request sizes, may be included in the data cluster.

Additionally, in an embodiment a cluster graph similar to the cluster illustration of FIG. 11D may be made available to an analyst or other user of the data analysis system. For example, an analyst may select a button (for example, an "Investigate in Graph" button) in a user interface of the system to view a cluster graph of a selected cluster.

c. Beaconing Malware Detection: Cluster Scoring

Turning now to FIG. 11C, a flowchart of example cluster scoring methods 930b, 940b of the data analysis system as applied to beaconing malware detection is shown, according to various embodiments of the present disclosure. The clustering scoring methods 930b, 940b may generally be understood to correspond to blocks 930 and 940 (cluster score and metascore generation) of the generalized process of FIG. 9. Additionally, the clustering scoring methods 930b, 940b may correspond with scoring strategies, as described above. In the flowchart of FIG. 11C, block 1132 indicates that each of the following blocks (1134, 1136, 1142, and 1144) may be performed for each of the clusters generated by the cluster generation method 920b of FIG. 11B.

At block 1134, the data analysis system may access and/or receive beaconing scoring criteria. The beaconing scoring criteria may include any number of rules or scoring strategies such that multiple scores may be generated for each cluster. Several non-limiting examples of beaconing scoring criteria may include: a number of external domains in the cluster known to be malicious; a number of blacklists on which an external domain in the cluster appears; a trustworthiness (and/or number) of blacklists on which external domains in the cluster appear; a number and/or severity of host-based events in the cluster (such as, for example, virus scan alerts and/or logged events, intrusion prevention system alerts and/or logged events, and the like); a number of requests and/or connections between internal and external network devices associated with the cluster that were blocked by a proxy, router, or other appliance linking the internal network to the external network; and/or an average request size (for example, an amount of data transmitted) between the internal and external devices associated with the cluster (for example, smaller request sizes may indicate a higher likelihood that the activity is related to beaconing activity).

At block 1136, the beaconing scoring criteria may be applied to the clusters and cluster scores may be generated. In an embodiment, each cluster score may include an absolute value and/or a weighted value as described above in reference to FIG. 10C. Additionally, as described above, the system may normalize the absolute values of each of the scores before applying a relative weighting to arrive at a weighted value. Examples of cluster scores presented to an analyst or other user of the data analysis system are shown and described below in reference to FIG. 11E.

At block 1142, a metascore may be generated for the clusters. The cluster metascore may be based on a combination or aggregation of the individual scores generated in block 1136. Alternatively, the metascores may be separately determined scores. In an embodiment, a metascore may be calculated by summing, multiplying, and/or otherwise aggregating or averaging the various individual scores together. The metascore may, in an embodiment, capture the relative importance of each of the individual scores by weighting each of the individual scores in a manner similar to that described above with reference to FIG. 10O. For example, as shown "known bad domains" may be weighted more heavily than other cluster scores as a known bad domain included in a cluster is a strong indicator of malicious beaconing activity. In another example, "requests blocked by proxy" may be weighted less heavily than other cluster scores as a blocked proxy request may be an indicator of potentially malicious beaconing activity, but it may not be as strong an indicator as others.

In various embodiments, metascores and/or scores may advantageously enable an analyst to directly compare and/or prioritize various clusters, and/or may advantageously be used by the data analysis system to prioritize a list of clusters and/or scores related to a cluster.

At optional block 1144, analyst (or other user) feedback may optionally be used in future scoring by the data analysis system. For example, if the analyst determines that a particular domain, identified by the system as potentially malicious, is not malicious, this information may be used by the system in future scoring of clusters. For example, the domain determined by the analyst to not be malicious may be whitelisted, or less weight may be applied to scores related to that domain.

d. Beaconing Malware Detection: Example User Interface

FIG. 11E illustrates an example cluster analysis user interface of the data analysis system as applied to beaconing malware detection, according to an embodiment of the present disclosure. Similar to the example user interface of FIG. 10E described above, the example user interface of FIG. 11E includes a list of clusters 1182 (e.g., each cluster may include multiple data entities associated with a particular seed connection pair), a list of scores 1184, and a detailed view of a score 1186. In various embodiments, more or fewer elements may be included in the user interface, and/or the elements may be arranged differently. Additionally, while certain aspects of the user interface of FIG. 11E may be similar to those of the user interface of FIG. 5 described above, the user interface of the FIG. 11E includes a number of differences. For example, differing from the user interface of FIG. 5, the user interface of the FIG. 11E may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores, as described above.

In the example user interface of FIG. 11E, an analyst or user has selected "Beaconing Cluster 1." Accordingly, various scores associated with that cluster may be displayed in the list of scores 1184. For example, scores are listed for "Known bad domain" and "Average request size," among others. Additionally, in the example user interface, the analyst has selected the "Average request size" score. Accordingly, details related to that score may be displayed in the detailed view 1186.

According to an embodiment, various items of information may be included in the user interface that may be useful to an analyst in evaluating and/or investigating the generated clusters. For example, metascores associated with each of the generated clusters may be shown in the list of clusters 1182, and/or the clusters may be prioritized according to the metascores. In another example, as described above with reference to FIG. 10E, absolute values and/or weighted values may be displayed in the list of scores 1184 for each score. In another example, the detailed view 1186 may include a graph that shows additional information related to the selected score. For example, in FIG. 11E, the graph shown in the detailed view 1186 shows a distribution of the request sizes associated with each connection to an external domain or IP address in the cluster. In the example, around 20 requests had a size around 1 megabyte, around 100 requests had a size around 100 kilobytes, and around 1 request had a size around 1 kilobyte. In other embodiments, various other detailed information may be included in the user interface of FIG. 11E.

According to various embodiments, the data analysis system as applied to beaconing malware detection may advantageously enable an analyst to detect and proactively remove an item of malware from various computer systems. Further, according to various embodiments the data analysis system as applied to beaconing malware detection may advantageously enable an analyst to block particular domains determined to be related to beaconing malware, and/or take other step to protect and internal network from attack.

In an embodiment, the data analysis system may automatically evaluate the generated clusters to determine a likelihood that a given cluster represents beaconing malware activity. For example, the system may determine that a cluster having a metascore below a particular threshold is likely not related to beaconing malware activity, while a cluster having a metascore above another particular threshold likely is beaconing malware activity. In an embodiment, the system may determine that a cluster having a metascore within a particular range of thresholds requires additional analysis by an analyst as the likelihood of beaconing malware activity is not conclusive. In an embodiment, an analyst may adjust the thresholds, the metadata calculations, and/or the weighting applied to the scores. Further, the analyst may marks various clusters as, for example, beaconing malware, likely beaconing malware, likely not beaconing malware, and/or not beaconing malware. Additionally, the analyst may dispatch other analysts to review particular clusters and/or mark particular clusters for further analysis.

XIV. Example Application of the Data Analysis System to Malware User-Agent Detection FIGS. 12A-12E depict various aspects of the data analysis system as applied to malware user-agent detection. For example, the data analysis system may be used in conjunction with user-agent-related data entities to detect malware on a computer system or a network of computer systems. Malware activity may include, for example, a software program maliciously installed on a target computer system that periodically attempts to transmit data and/or communicate with a remote computer system. Typically, software programs, including malware software programs, may include a user-agent string as part of a communication with another computer system. A user-agent string may include, for example, various items of information regarding the source of the communication including, for example, an application type, an operating system identifier, a software version, and/or the like. For example, a browser application may include a user-agent string in a header associated with a network request, such as a Hypertext Transfer Protocol (HTTP) request. Such a browser user-agent string may include, for example, a name and version of the browser, and a layout engine and layout engine version of the browser. Examples of user-agent strings associated with particular browser applications may include "Mozilla/4.0 (Windows; MSIE 6.0; Windows NT 6.0)", "Mozilla/5.0 (Windows; U; MSIE 9.0; Windows NT 9.0; en-US))", and the like. Other software applications may also include user-agent strings along with network communications. As user-agent strings include information related to the requesting software application, they may be useful in detecting malicious software, or malware. For example, unusual user-agent strings may be detected by the data analysis system and may be flagged as potentially malicious. In another example, a whitelist of common user-agent strings may be used to filter out particular known-good networks requests, and determine other network requests that may be associated with malware.

According to various embodiments, user-agent-related data entity seeds may be generated by the system as described below in reference to FIG. 12A. Each of these user-agent-related entity seeds may include a detected user-agent string entity, and the seeds may be generated based on a likelihood that the seeds represent malware-related activities and/or data. Each of the seeds may be used as a basis for clustering various other user-agent-related entities, as described in reference to FIGS. 12B and 12D. Accordingly, the generated clusters may represent various data entities that are all related to potential malware-related activity. Each of the generated clusters may then be scored according to various criteria (or rules), as described below in reference to FIG. 12C. The various scores and metascores generated by the system may provide indications to an analyst regarding the likelihood that the cluster includes entities representing malware-related activities and/or data. The information, including the clusters and scores generated by the data analysis system, may be presented to an analyst via a user interface as described below in reference to FIG. 12E. Advantageously, according to an embodiment, the analyst may sort the clusters according to their determined scores (and/or metascores) so as to prioritize investigations into potential malware. Further, the data analysis system may advantageously automatically cluster or group many related data entities to enable rapid investigation and evaluation by an analyst to detect likely malware.

In an embodiment, and as described below, the data analysis system may be used in a network environment in which an internal network is in communication with an external network. The system may be used to determine, for example, whether any computer systems of the internal network have been infected by malware that is communicating with computer systems of the external network. Various computerized devices may be included in the internal network that may be capable to capturing and/or logging data traffic between the internal network and the external network including, for example, network routers and/or switches.

a. Malware User-Agent Detection: Seed Generation

FIG. 12A is a flowchart of an example of a seed generation method 910c of the data analysis system as applied to malware user-agent detection, according to various embodiments of the present disclosure. The seed generation method 910c may generally be understood to correspond to block 910 (seed generation) of the generalized process of FIG. 9.

Referring to FIG. 12A, at block 1212, network communications and/or data traffic information, including user-agent strings, between the internal and external networks may be captured by the data analysis system. Various items of information may be captured including, for example, external IP addresses contacted, external domains contacted, internal computer systems from which data is transmitted to external devices, and the like. These items of information may be captured by, for example, a network traffic router that connects the internal and external networks to one another. The network traffic router may, for example, log such items of information such that they may be read and analyzed by the data analysis system. Alternatively, the network traffic may be captured by, for example, other types of computerized sensors. Each of the above described items of information may be a data entity in the context of the data analysis system.

At block 1213, the system may filter out particular user-agent strings, and associated data entities, based on various criteria so as to remove any communications that are not likely to be malicious. For example, the system may make use of a list of whitelisted domains (1213a) by removing any communications items that involve communications with known non-malicious domains. Similarly, the system may make use of a list of whitelisted user-agent strings by removing any communications items that involve communications with known non-malicious user-agent strings. In another example, the system may determine that particular connections between certain internal computer systems and external computer systems are common or frequent (1213*b*), and thus not likely malicious. In an embodiment, common connections between many internal computer systems and particular external computer systems may indicate that the connections are not performed by malicious software. Such common connection may be associated with, for example, software updates by legitimate software installed on many computer systems of the internal network. In yet another example, the data analysis system may optionally filter out any communications related to random user-agent strings (1213*c*).

Once a set of communications associated with the filtered list of user-agent strings is determined, at block 1214 the data analysis system compares the detected, filtered, user-agent strings from a test period to the detected, filtered, user-agent strings from a reference period. In an embodiment, a test period may include a current day, while a reference period may include a three, four, or five week period before the current day. Any other test and/or reference period may be used by the data analysis system. According to an embodiment, comparing user-agent strings between a test period and a reference period enables the data analysis system to detect any new (for example, not previously used during the reference period) user-agent strings. At block 1215, any user-agent strings determined to be new (for example, used during the test period but not during the reference period) may be used (along with related communication data entities) as seeds.

At block 1216, the data analysis system may use an additional or alternative method for determining seeds. This may be accomplished by determining a frequency distribution of detected, filtered, user-agent strings used by hosts (or various computer systems) of the internal network. Such a frequency distribution may be determined for a particular test period of time. Additionally, such a frequency distribution may indicate, for example, the number of hosts that used any particular user-agent string during the test period of time. As indicated by block 1218, any user-agent strings that are determined to have been used rarely (for example, used by less than a particular threshold number or percentage of hosts) may be used (along with related communication data entities) as seeds by the data analysis system. For example, a particular threshold number of hosts may be five. In this example, the system may determine that a particular user-agent was used by two hosts during the test period of time. Accordingly, the system may designate the particular user-agent as a seed. Alternatively, the system may determine that a second particular user-agent was used by 100 hosts during the test period of time. Accordingly, the system may not designate the second particular user-agent as a seed.

b. Malware User-Agent Detection: Cluster Generation

Turning now to FIG. 12B, a flowchart of an example of a clustering method 920*c* of the data analysis system as applied to malware user-agent detection is shown, according to various embodiments of the present disclosure. The clustering method 920*c* may generally be understood to correspond to block 920 (cluster generation) of the generalized process of FIG. 9. Additionally, the clustering method 920*c* may correspond to a clustering strategy, as described above. In the flowchart of FIG. 12B, block 1222 indicates that the following block (1224) may be performed for each of the seeds generated by the seed generation method 910*c* of FIG. 12A.

At block 1224, any user-agent-related data entities that are related to the seed may be clustered. Clustering of data entities may be accomplished as generally described above, in which data bindings are executed and/or searching and filtering are performed (through, for example, a generic interface to various data sources) as part of a clustering strategy. Additionally, as described above, clustered data entities may be related by, for example, sharing the same or similar properties, characteristics, and/or metadata. Examples of data entities that may be clustered include, but are not limited to: hosts or source computing systems (for example, computing systems of the internal network); host owners, such as users of hosts or computing systems (for example, persons having accounts on particular computer systems); host-based events (such as, for example, virus scan alerts and/or logged events, intrusion prevention system alerts and/or logged events, and the like); internal IP addresses; internal IP addresses that connect to external domains; internal computer systems; internal computer systems that connect to external domains; external IP addresses; external domains; external IP addresses associated with external domains; and the like.

FIG. 12D illustrates an example growth of a cluster of related data entities in a malware user-agent detection application, according to an embodiment of the present disclosure. In FIG. 12D, boxes indicate data entities, while lines between boxes indicate links that connect data entities. As described above, seeds in the described malware user-agent detection application of the data analysis system may be user agents. As shown in the example of FIG. 12D, a seed user agent 1252 has been generated (such as by the process of FIG. 12A) as indicated visually by the internal seed dashed line. Then, in a clustering step corresponding to block 1224 (of FIG. 12B) and represented by the external cluster dashed line 1254, various other data entities related to the seed entity may be added to the cluster. For example, the data analysis system has clustered two hosts, 1256 and 1258, that transmitted data including the user agent 1252.

Returning again to FIG. 12B, dashed line 1226 indicates that the cluster generation method may optionally repeat multiple times until, for example, the clustering strategy is completed and/or no additional related data entities are found by the system. For example, in reference to FIG. 12D, additional data entities may be clustered including user 1262 and host-based event 1264 (each related to the host 1256), and user 1266 and external domain 1268 (each related to the host 1258). As indicated by ellipses 1260, 1272, and 1274, additional data entities may be clustered in each or subsequent clustering steps. Further, referring to FIG. 12B, and as described above, at 1226 various clusters of data entities may optionally be merged and/or collapsed when common data entities and/or properties are determined between the various clusters. For example, the system may determine that two different generated clusters both include host 1258. Accordingly, the system may merge the two clusters each including the common data entity (host 1258) into a single cluster. Accordingly, in an embodiment the clustering method 920*c* may iteratively cluster related data entities.

In an embodiment, the various clustered data entities may include various properties and characteristics, including information regarding data communications and requests between internal and external computer systems and the associated user-agent strings. For example, a given connection between a host and an external domain may represent multiple connections over a period of time. In an embodiment, the data analysis system may cluster various data entities with the seed so as to enable an analyst to quickly determine, for example, any computer systems associated with the user agent, any users of those computer systems, any actions (including communications) taken by those computer systems, any events happening on those computer systems (for example, host-based events, including file changes, software installs, and the like), and the like.

Additionally, in an embodiment a cluster graph similar to the cluster illustration of FIG. 12D may be made available to an analyst or other user of the data analysis system. For example, an analyst may select a button (for example, an "Investigate in Graph" button) in a user interface of the system to view a cluster graph of a selected cluster.

c. Malware User-Agent Detection: Cluster Scoring

Turning now to FIG. 12C, a flowchart of example cluster scoring methods 930c, 940c of the data analysis system as applied to malware user-agent detection is shown, according to various embodiments of the present disclosure. The clustering scoring methods 930c, 940c may generally be understood to correspond to blocks 930 and 940 (cluster score and metascore generation) of the generalized process of FIG. 9. Additionally, the clustering scoring methods 930c, 940c may correspond with scoring strategies, as described above. In the flowchart of FIG. 12C, block 1232 indicates that each of the following blocks (1234, 1236, 1242, and 1244) may be performed for each of the clusters generated by the cluster generation method 920c of FIG. 12B.

At block 1234, the data analysis system may access and/or receive user-agent scoring criteria. The user-agent scoring criteria may include any number of rules or scoring strategies such that multiple scores may be generated for each cluster. Several non-limiting examples of user-agent scoring criteria may include: a number of external domains in the cluster known to be malicious; a number of user agents known to be malicious (including, for example, being included on a blacklist or a number of blacklists); a number of blacklists on which an external domain or user agent in the cluster appears; a trustworthiness (or number) of blacklists on which external domains or user agents in the cluster appear; a number and/or severity of host-based events in the cluster (such as, for example, virus scan alerts and/or logged events, intrusion prevention system alerts and/or logged events, and the like); a number of requests and/or connections between internal and external network devices associated with the cluster that were blocked by a proxy, router, or other appliance linking the internal network to the external network; and/or an average request size (for example, an amount of data transmitted) between internal and external devices associated with the cluster (for example, smaller request sizes may indicate a higher likelihood that the activity is related to malware activity).

At block 1236, the user-agent scoring criteria may be applied to the clusters and cluster scores may be generated. In an embodiment, each cluster score may include an absolute value and/or a weighted value as described above in reference to FIG. 10C. Additionally, as described above, the system may normalize the absolute values of each of the scores before applying a relative weighting to arrive at a weighted value. Examples of cluster scores presented to an analyst or other user of the data analysis system are shown and described below in reference to FIG. 12E.

At optional block 1242, a metascore may optionally be generated for the clusters. The cluster metascore may be based on a combination or aggregation of the individual scores generated in block 1236. Alternatively, the metascores may be separately determined scores. In an embodiment, a metascore may be calculated by summing, multiplying, and/or otherwise aggregating or averaging the various individual scores together. The metascore may, in an embodiment, capture the relative importance of each of the individual scores by weighting each of the individual scores in a manner similar to that described above with reference to FIG. 10O.

In various embodiments, metascores and/or scores may advantageously enable an analyst to directly compare and/or prioritize various clusters, and/or may advantageously be used by the data analysis system to prioritize a list of clusters and/or scores related to a cluster.

At optional block 1244, an analyst (or other user) may optionally investigate particular hosts included in a cluster and/or associated with a particular user agent. The analyst may further optionally place a user agent determined to be associated with malicious software on a blacklist that may be used in subsequent applications of the data analysis system.

d. Malware User-Agent Detection: Example User Interface

FIG. 12E illustrates an example cluster analysis user interface of the data analysis system as applied to malware user-agent detection, according to an embodiment of the present disclosure. Similar to the example user interface of FIG. 11E described above, the example user interface of FIG. 12E includes a list of clusters 1282, a list of scores 1284, and a detailed view of a score 1286. In various embodiments, more or fewer elements may be included in the user interface, and/or the elements may be arranged differently. Additionally, while certain aspects of the user interface of FIG. 12E may be similar to those of the user interface of FIG. 5 described above, the user interface of the FIG. 12E includes a number of differences. For example, differing from the user interface of FIG. 5, the user interface of the FIG. 12E may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores, as described above.

In the example user interface of FIG. 12E, an analyst or user has selected "User-agent Cluster 1." Accordingly, various scores associated with that cluster may be displayed in the list of scores 1284. For example, scores are listed for "Blacklisted user agents" and "Average request size," among others. Additionally, in the example user interface, the analyst has selected the "Average request size" score. Accordingly, details related to that score may be displayed in the detailed view 1286.

According to an embodiment, various items of information may be included in the user interface that may be useful to an analyst in evaluating and/or investigating the generated clusters. For example, metascores associated with each of the generated clusters may be shown in the list of clusters 1282, and/or the clusters may be prioritized according to the metascores. In another example, as described above with reference to FIG. 12E, absolute values and/or weighted values may be displayed in the list of scores 1284 for each score. In another example, the detailed view 1286 may include a graph that shows additional information related to the selected score. For example, in FIG. 12E, the graph shown in the detailed view 1286 shows a distribution of the request sizes associated with each connection to an external domain or IP address in the cluster, as described above in reference to FIG. 11E.

According to various embodiments, the data analysis system as applied to malware user-agent detection may advantageously enable an analyst to detect and proactively remove an item of malware from various computer systems. Further, according to various embodiments the data analysis system as applied to malware user-agent detection may advantageously enable an analyst to block particular domains determined to be related to malicious software, and/or take other step to protect and internal network from attack.

In an embodiment, the data analysis system may automatically evaluate the generated clusters to determine a likelihood that a given cluster represents malicious activity. For example, the system may determine that a cluster having a metascore below a particular threshold is likely not related to malware activity, while a cluster having a metascore above another particular threshold likely is malware activity. In an embodiment, the system may determine that a cluster having a metascore within a particular range of thresholds requires additional analysis by an analyst as the likelihood of malware activity is not conclusive. In an embodiment, an analyst may adjust the thresholds, the metadata calculations, and/or the weighting applied to the scores. Further, the analyst may mark various clusters as, for example, malware, likely malware, likely not malware, and/or not malware. Additionally, the analyst may dispatch other analysts to review particular clusters and/or mark particular clusters for further analysis.

XV. Example Application of the Data Analysis System to Activity Trend Detection

FIGS. 13A-13E depict various aspects of the data analysis system as applied to activity trend detection. For example, the data analysis system may be used in conjunction with activity-related data entities to detect activity trends and/or behavior trends on a computer system (also referred to as a computerized device) or a network of computer systems (or computerized devices). Examples of activities and/or behaviors that may be detected by the data analysis system include host-based events (for example, events occurring on a computer system and/or computerized device) such as warning and/or alerts provided by an anti-virus software program and/or an intrusion detection software program; file changes on a computer system (for example, file modifications, file deletions, file permissions changes, and the like); file accesses on a computer system (for example, accesses by a user of a computer system); and/or changes in processes and/or software applications running on a computer system (for example, spawning and/or killing of processes); among others. According to various embodiments, the data analysis system may be used to profile activity and/or behaviors associated with a computer system so as to detect trends. For example, the data analysis system may detect an unusual increase in a particular type of activity that an analyst may then investigate. In a specific example, the system may help an analyst detect a user accessing a large number of files and modifying the file contents, possibly maliciously. In another example, a previously undetected malicious software program may modify other software programs running on a computer system in ways that are unusual, and the data analysis system may detect such modifications.

According to various embodiments, activity-related data entity seeds may be generated by the system as described below in reference to FIG. 13A. Each of these activity-related entity seeds may include a detected activity-related entity, such as a host-based event, and the seeds may be generated based on a likelihood that the seeds represent trends in activities and/or behavior. Each of the seeds may be used as a basis for clustering various other activity-related entities, as described in reference to FIGS. 13B and 13D. Accordingly, the generated clusters may represent various data entities that are all related to potentially interesting activity trends. Each of the generated clusters may then be scored according to various criteria (or rules), as described below in reference to FIG. 13C. The various scores generated by the system may provide indications to an analyst regarding the likelihood that the cluster includes entities representing particular activity trends. The information, including the clusters and scores generated by the data analysis system, may be presented to an analyst via a user interface as described below in reference to FIG. 13E. Advantageously, according to an embodiment, the analyst may sort the clusters according to their determined scores so as to prioritize investigations into potentially interested activity trends. Further, the data analysis system may advantageously automatically cluster or group many related data entities to enable rapid investigation and evaluation by an analyst to detect activity trends.

In an embodiment, and as described below, the data analysis system may be used in a network environment in which an internal network is in communication with an external network. The internal network may include multiple computer systems (also referred to as hosts) that may be in communication with one another. Various activities and events occurring on each of the hosts, as well as network communications, may be tracked and/or logged by aspects of the data analysis system such that they may be analyzed as described below. Various computerized devices may be included in the network that may be capable to capturing and/or logging data traffic and communications, for example, network routers and/or switches. Further, various software programs or other aspects may be included in the network and/or on computer systems in the network that may be capable to capturing and/or logging various host-based events.

a. Activity Trend Detection: Seed Generation

FIG. 13A is a flowchart of an example of a seed generation method 910*d* of the data analysis system as applied to activity trend detection, according to various embodiments of the present disclosure. The seed generation method 910*d* may generally be understood to correspond to block 910 (seed generation) of the generalized process of FIG. 9.

Referring to FIG. 13A, at block 1312, various host-based events may be captured and/or received by the data analysis system. These events may be stored in logs (1312*a*) on individual computer systems and then retrieved by the data analysis system, or may be provided to the data analysis system as they are captured. Additionally, the events may each be a data entity. Various types of host-based events may be captured including, for example (and as mentioned above), warning and/or alerts provided by an anti-virus software program, other monitoring software (1312*b*) and/or an intrusion detection software program (1312*c*); file changes on a computer system (for example, file modifications, file deletions, file permissions changes, and the like); file accesses on a computer system (for example, accesses by a user of a computer system); and/or changes in processes and/or software applications running on a computer system (for example, spawning and/or killing of processes); among others. These host-based events and other items of information may be captured by, for example, specialized network devices and/or software applications running on various computer systems in the network. In an embodiment, the data analysis system may further capture network traffic information, as described above in references to FIGS. 11A and 12A.

As various types of events may be captured by the data analysis system, in the flowchart of FIG. 13A, block 1313 indicates that each of the following blocks (1314, 1315, and 1316) may be performed for each type of event that is captured in block 1312. In an embodiment, the captured events may be grouped according to type, such that each type-group may be processed according to blocks 1314, 1315, and 1316.

At block 1314, for a particular type of captured event on a particular host, any events of the particular type captured on the particular host may be analyzed by the data analysis system and a current Z-score may be calculated with respect to a previous time period. For example, in an embodiment the data analysis system may determine any of a particular type of event that is captured on a particular host. The data analysis system may also determine a current time period and a previous time period into which the events of a particular type may be divided. In one example, a current time period may be a most recent day, week, or month. In an example, a previous time period may be a day, week, or month immediately preceding the current time period. Then, the data analysis system may calculate a probability distribution of events of the particular type on the host during the previous time period. Next, the data analysis system may determine a Z-score of events of the particular type on the host during the current time period along the previous time period distribution. A Z-score may indicate, for example, a number of standard deviations the events during the current time period are above or below the mean of the distribution of the previous time period. In an embodiment, the calculated Z-score may provide an indication of an unusual change in activity of a particular type of event on a particular host.

At block 1315, the data analysis system may compare the calculated Z-score, for each event type on each host, to a threshold. The threshold may be, for example, +/−1, +/−1.5, +/−2, +/−2.5, among other possibilities. At block 1316, any events having Z-scores that satisfy the threshold may be used as seeds. Accordingly, the method 910$d$ may generate seeds that may be used by the data analysis system in an activity trend detection application.

b. Activity Trend Detection: Cluster Generation

Turning now to FIG. 13B, a flowchart of an example of a clustering method 920$d$ of the data analysis system as applied to activity trend detection is shown, according to various embodiments of the present disclosure. The clustering method 920$d$ may generally be understood to correspond to block 920 (cluster generation) of the generalized process of FIG. 9. Additionally, the clustering method 920$d$ may correspond to a clustering strategy, as described above. In the flowchart of FIG. 13B, block 1322 indicates that the following block (1324) may be performed for each of the seeds generated by the seed generation method 910$d$ of FIG. 13A.

At block 1324, any activity-related data entities that are related to the seed may be clustered. Clustering of data entities may be accomplished as generally described above, in which data bindings are executed and/or searching and filtering are performed (through, for example, a generic interface to various data sources) as part of a clustering strategy. Additionally, as described above, clustered data entities may be related by, for example, sharing the same or similar properties, characteristics, and/or metadata. Examples of data entities that may be clustered include, but are not limited to: hosts or source computing systems (for example, computing systems of the network); host owners, such as users of hosts or computing systems (for example, persons having accounts on particular computer systems); host-based events related to the seed event (such as, for example, virus scan alerts and/or logged events, intrusion prevention system alerts and/or logged events, and the like); internal IP addresses; internal IP addresses that connect to external domains; internal computer systems; internal computer systems that connect to external domains; external IP addresses; external domains; external IP addresses associated with external domains; and the like.

FIG. 13D illustrates an example growth of a cluster of related data entities in a malware activity trend detection application, according to an embodiment of the present disclosure. In FIG. 13D, boxes indicate data entities, while lines between boxes indicate links that connect data entities. As described above, seeds in the described activity trend detection application of the data analysis system may be host-based events. As shown in the example of FIG. 13D, a seed host-based event 1352 (for example, a spawned process on a particular host, where the number "85674" may indicate, for example, a process identifier) has been generated (such as by the process of FIG. 13A) as indicated visually by the internal seed dashed line. Then, in a clustering step corresponding to block 1324 (of FIG. 13B) and represented by the external cluster dashed line 1354, various other data entities related to the seed entity may be added to the cluster. For example, the data analysis system has clustered a host 1356 (on which the event 1352 occurred), and another related host-based event 1358 (that may, for example, have characteristics similar to those of event 1352).

Returning again to FIG. 13B, dashed line 1326 indicates that the cluster generation method may optionally repeat multiple times until, for example, the clustering strategy is completed and/or no additional related data entities are found by the system. For example, in reference to FIG. 13D, additional data entities may be clustered including user 1360, host-based event 1362, and external domain 1364 (each related to the host 1356), and host 1368 and user 1370 (each related to the event 1358). As indicated by ellipses 1366, additional data entities may be clustered in each or subsequent clustering steps. Further, referring to FIG. 13B, and as described above, at 1326 various clusters of data entities may optionally be merged and/or collapsed when common data entities and/or properties are determined between the various clusters. For example, the system may determine that two different generated clusters both include event 1358. Accordingly, the system may merge the two clusters each including the common data entity (event 1358) into a single cluster. Accordingly, in an embodiment the clustering method 920$d$ may iteratively cluster related data entities.

In an embodiment, the various clustered data entities may include various properties and characteristics, including information regarding data communications and requests between computer systems in the network. For example, a given connection between as host and an external domain may represent multiple connections over a period of time. In an embodiment, the data analysis system may cluster various data entities with the seed so as to enable an analyst to quickly determine, for example, any computer systems and/or other events associated with a particular detected unusual event, any users of related computer systems, any actions (including communications) taken by related computer systems, any events happening on related computer systems (for example, host-based events, including file changes, software installs, and the like), and the like.

Additionally, in an embodiment a cluster graph similar to the cluster illustration of FIG. 13D may be made available to an analyst or other user of the data analysis system. For example, an analyst may select a button (for example, an "Investigate in Graph" button) in a user interface of the system to view a cluster graph of a selected cluster.

c. Activity Trend Detection: Cluster Scoring

Turning now to FIG. 13C, a flowchart of an example cluster scoring method 930$d$ of the data analysis system as applied to malware activity trend detection is shown, according to various embodiments of the present disclosure. The clustering scoring method 930$d$ may generally be understood to correspond to block 930 (cluster score generation) of the generalized process of FIG. 9. Additionally, the clustering scoring method 930$d$ may correspond with scoring strategies, as described above. In the flowchart of FIG. 13C, block 1332 indicates that each of the following blocks (1333, 1334, 1335, and 1336) may be performed for each of the clusters generated by the cluster generation method 920d of FIG. 13B.

At block 1334, the data analysis system may access and/or received the previously determined Z-score of the seed. This Z-score may be considered by the data analysis system as a Z-score of the cluster, as it indicates how the detected event (the seed) deviates from the normal activity on the host. At block 1335, the cluster Z-score may be compared to a calculated "universe," or entire-network, Z-score. In an embodiment, the universe Z-score may be calculated in a manner similar to the calculation of the seed Z-score, but with reference to the entire network of computers from which the data analysis system has captured events. For example, the universe Z-score may be calculated as follows: The data analysis system may use the same current and previous time periods as were used in calculation of the seed Z-score, however a probability distribution of events (of the same or similar type to the seed event) across the network may be calculated for the previous time period. Then, the data analysis system may determine a universe Z-score of events of the particular type on the network during the current time period along the previous time period distribution. In an embodiment, the calculated universe Z-score may provide an indication of an unusual change in activity of a particular type of event on the network.

In various embodiments, the comparison between the cluster Z-score and the universe Z-score may provide an indication, for example, of whether or not the activity trend detected on the host is unusual in the context of the network. For example, when the activity trend detected on the host is also present on the network as a whole (for example, the cluster Z-score is similar to the universe Z-score), the activity trend may not be particularly interesting to an analyst. Alternatively, when the activity trend detected on the host is different from related activity that is present on the network as a whole (for example, the cluster Z-score is different from the universe Z-score), the activity trend may be interesting to an analyst. Accordingly, at block 1336, a cluster score is generated that indicates how significantly the cluster Z-score and the universe Z-score differ from one another. Additionally, in an embodiment, the cluster score may capture the absolute value of the cluster Z-score such that larger cluster Z-scores (indicating significant activity trends) may result in larger cluster scores as compared to smaller cluster scores, even in view of the difference between the cluster Z-score and the universe Z-score.

d. Activity Trend Detection: Example User Interface

FIG. 13E illustrates an example cluster analysis user interface of the data analysis system as applied to activity trend detection, according to an embodiment of the present disclosure. Similar to the example user interface of FIG. 11E described above, the example user interface of FIG. 13E includes a list of clusters 1382, a list of scores 1384, and a detailed view of score information associated with the cluster 1386. In various embodiments, more or fewer elements may be included in the user interface, and/or the elements may be arranged differently. Additionally, while certain aspects of the user interface of FIG. 13E may be similar to those of the user interface of FIG. 5 described above, the user interface of the FIG. 13E includes a number of differences. For example, differing from the user interface of FIG. 5, the user interface of the FIG. 13E may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores, as described above.

In the example user interface of FIG. 13E, an analyst or user has selected "Activity Trend Cluster 1." Accordingly, various scores associated with that cluster may be displayed in the list of scores 1384. For example, a cluster Z-score, a universe Z-score, and a cluster score 1390 may be listed. As described above the cluster score may be calculated based on the cluster Z-score and the universe Z-score. Additionally, in the example user interface, the analyst has selected the "Cluster Score." Accordingly, details related to the cluster score may be displayed in the detailed view 1386.

According to an embodiment, various items of information may be included in the user interface that may be useful to an analyst in evaluating and/or investigating the generated clusters. For example, the clusters may be prioritized according to the cluster scores. In another example, the detailed view 1386 may include a graph that shows additional information related to the selected score. For example, in FIG. 13E, the graph shown in the detailed view 1386 shows a graph with a probability distribution that may be associated a universe of activity, activity on a particular computer, activity during a particular time period, and/or the like. In an embodiment, the detailed view 1386 may include a graph that may show Z-score values associated with the cluster.

In various embodiments, any other mathematical and/or statistical measures and/or methods may be used in determining and/or detecting unusual and/or interesting activity trends. For example, any other mathematical methods may be used to determine activities that are statistical outliers. Additionally, in various embodiments, the other methods may be used in any of the seed generation, cluster generation, and/or scoring of clusters.

According to various embodiments, the data analysis system as applied to activity trend detection may advantageously enable an analyst to detect and proactively take action when unusual activity is detected. In an embodiment, the data analysis system may automatically evaluate the generated clusters to determine a likelihood that a given cluster represents an activity trend or unusual activity. For example, the system may determine that a cluster having a cluster score below a particular threshold is likely not an activity trend, while a cluster having a cluster score above another particular threshold likely is an activity trend. In an embodiment, the system may determine that a cluster having a cluster score within a particular range of thresholds requires additional analysis by an analyst as the likelihood of an activity trend is not conclusive. In an embodiment, an analyst may adjust the thresholds, the cluster score calculations, and/or the weighting applied to the Z-scores. Further, the analyst may mark various clusters as, for example, activity trend, likely activity trend, likely not activity trend, and/or not activity trend. Additionally, the analyst may dispatch other analysts to review particular clusters and/or mark particular clusters for further analysis.

XVI. Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system to assist a human analyst in analyzing large amounts of trend data of computing devices, the computer system comprising:
   one or more computer readable storage devices configured to store:
      one or more software modules including computer executable instructions, the one or more software modules including a cluster engine module and a workflow engine module; and
      a clustering strategy;
   one or more cluster data sources configure to store:
      a plurality of host-based events associated with one or more computing devices;
      a plurality of activity trend-related data items and properties associated with respective activity trend-related data items, each of the properties including associated property values, the activity trend-related data items including at least one of: data items associated with captured host-based events, Internet Protocol addresses, external domains, users, or computerizing devices, wherein hosts comprise computerizing devices in a network; and
   one or more hardware computer processors in communication with the one or more computer readable storage devices and the one or more cluster data sources, and configured to execute the one or more software modules in order to cause the one or more hardware computer processors to:
   designate, by the cluster engine module, one or more seeds by:
      accessing, from the one or more cluster data sources, the plurality of host-based events;
      determining a first group of the plurality of host-based events each indicating a same particular activity type and associated with a particular host and a reference time period;
      determining, based at least on the first group of host-based events, a first statistical deviation in the same particular activity type of host-based events on the particular host for the reference time period;
      determining a second group of the plurality of host-based events each indicating the same particular activity type and associated with the particular host and a test time period;

determining, based at least on the second group of host-based events, a second statistical deviation in the same particular activity type of host-based events on the particular host for the test time period; and in response to determining that the first statistical deviation compared to the second statistical deviation satisfies a particular threshold, designating a host-based event from the second group as a seed;

for each designated host-based event seed:

identify, by the cluster engine module, one or more activity trend-related data items determined to be associated with the designated host-based event seed based at least on the clustering strategy, wherein the clustering strategy queries the one or more cluster data sources to determine at least one of: the particular host associated with the designated host-based event seed, one or more host-based events associated with the particular host, one or more host-based events associated with the designated host-based event seed, users of the particular host, data items associated with the particular host, other hosts associated with the same particular activity type of host-based events, Internet Protocol addresses associated with the particular host, external domains associated with the designated host-based event seed, computing devices associated with the particular host;

generate, by the cluster engine module, a data item cluster based at least on the designated host-based event seed, wherein generating the data item cluster comprises:

adding the designated host-based event seed to the data item cluster;

adding the identified one or more activity trend-related data items to the data item cluster;

identifying an additional one or more activity trend-related data items associated with any data item of the data item cluster;

adding the additional one or more activity trend-related data items to the item data cluster; and storing the generated data item cluster in the one or more computer readable storage devices; and determine, by the cluster engine module, a score for the generated data item cluster; and cause presentation, by the workflow engine module, of at least one generated data item cluster and the determined score for the at least one generated data item cluster in a user interface of a client computing device.

2. The computer system of claim 1, wherein the first statistical deviation comprises a Z-score.

3. The computer system of claim 1, wherein generating, by the cluster engine module, the data item cluster further comprises:

iteratively adding to the data item cluster, based at least on the clustering strategy, one or more secondary activity trend-related data items associated with one or more previously added activity trend-related data items.

4. The computer system of claim 1, wherein identifying, by the cluster engine module, one or more activity trend-related data items determined to be associated with the designated host-based event seed further comprises determining a particular activity trend-related data item and the designated host-based event seed are both associated with a common property value.

5. The computer system of claim 1, wherein identifying the additional one or more activity trend-related data items further comprises:

for each particular data item of the data item cluster:

determining a property value associated with the particular data item;

based at least on the determined property value, determining the additional one or more activity trend-related data items having a similar property value.

6. The computer system of claim 5, wherein generating, by the cluster engine module, the data item cluster further comprises:

determining a second property value associated with a particular additional data item of the additional one or more activity trend-related data items;

based at least on the second property value, determining secondary additional activity trend-related data items having a similar property value; and adding the secondary additional activity trend-related data items to the cluster.

7. The computer system of claim 5, wherein the determined property value includes at least one of a username, a domain, an Internet Protocol address, a computing device identifier, or an event identifier.

8. The computer system of claim 1, wherein generating, by the cluster engine module, of a particular data item cluster further comprises:

selecting a particular data item from the particular data item cluster;

determining that a second data item cluster includes the particular data item; and merging the second data item cluster into the particular data item cluster.

9. A computer-implemented method to assist a human analyst in analyzing large amounts of trend data of computing devices, the computer-implemented method comprising:

storing on one or more computer readable storage devices:

a clustering strategy;

a plurality of host-based events associated with one or more computing devices; and a plurality of activity trend-related data items and properties associated with respective activity trend-related data items, each of the properties including associated property values, the activity trend-related data items including at least one of: data items associated with captured host-based events, Internet Protocol addresses, external domains, users, or computing devices, wherein hosts comprise computing devices in a network;

designating one or more seeds by:

accessing, by one or more hardware computing devices configured with specific computer executable instructions, and from the one or more computer readable storage devices, the plurality host-based events;

determining, by the one or more hardware computing devices, a first group of the plurality of host-based events each indicating a same particular activity type and associated with a particular host and a reference time period;

determining, by the one or more hardware computing devices and based at least on the first group of host-based events, a first statistical deviation in the same particular activity type of host-based events on the particular host for the reference time period;

determining, by the one or more hardware computing devices, a second group of the plurality of host-based events each indicating the same particular activity type and associated with the particular host and a test time period;

determining, by the one or more hardware computing devices and based at least on the second group of host-based events, a second statistical deviation in the same particular activity type of host-based events on the particular host for the test time period; and in response to determining that the first statistical deviation compared to the second statistical deviation satisfies a particular threshold, designating, by the one or more hardware computing devices, a host-based event from the second group as a seed; and for each designated host-based event seed:
identifying, by the one or more hardware computing devices, one or more activity trend-related data items determined to be associated with the designated host-based event seed based at least on the clustering strategy, wherein the clustering strategy queries the one or more cluster data sources to determine at least one of: the particular host associated with the designated host-based event seed, one or more host-based events associated with the particular host, one or more host-based events associated with the designated host-based event seed, users of the particular host, data items associated with the particular host, other hosts associated with the same particular activity type of host-based events, Internet Protocol addresses associated with the particular host, external domains associated with the designated host-based event seed, computing devices associated with the particular host;

generating, by the one or more hardware computing devices, a data item cluster based at least on the designated host-based event seed, wherein generating the data item cluster comprises:
adding the designated host-based event seed to the data item cluster;
adding the identified one or more activity trend-related data items to the data item cluster;
identifying an additional one or more activity trend-related data items associated with any data item of the data item cluster;
adding the additional one or more activity trend-related data items to the item data cluster; and
storing the generated data item cluster in the one or more computer readable storage devices; and determining, by the one or more hardware computing devices, a score for the generated data item cluster; and causing presentation, by the one or more hardware computing devices, of at least one generated data item cluster and the determined score for the at least one generated data item cluster in a user interface of a client computing device.

10. The computer-implemented method of claim 9, wherein determining, by the one or more hardware computing devices, the score for the generated data item cluster further comprises:
determining an activity type of the designated host-based event seed;
determining a reference group of host-based events from the plurality of host-based events on the network that have a respective activity type that is the same as the activity type of the designated host-based event seed;
determining a universe statistical deviation from reference group of host-based events; and
generating a deviation score based at least on a comparison between the second statistical deviation and the universe statistical deviation.

11. The computer-implemented method of claim 10, wherein the second statistical deviation and the universe statistical deviation comprise Z-scores.

12. The computer-implemented method of claim 10, wherein determining, by the one or more hardware computing devices, the score for the generated data item cluster further comprises:
generating a plurality of cluster scores by assessing the generated data item cluster based at least on a plurality of scoring criteria.

13. The computer-implemented method of claim 12, wherein determining, by the one or more hardware computing devices, a score for the generated data item cluster further comprises:
generating a cluster metascore based at least on the plurality of cluster scores by weighting each of the plurality of cluster scores and combining the weighted plurality of cluster scores, wherein the weighting of the plurality of cluster scores is related to an importance of respective cluster scores.

14. The computer-implemented method of claim 13, wherein the importance of respective cluster scores is based at least on an empirical determination and/or a determination by an analyst.

15. The computer-implemented method of claim 9 further comprising:
in response to generating and scoring a plurality of clusters, prioritizing, by the one or more hardware computing devices, the plurality of clusters according to respective cluster scores.

16. A non-transitory computer-readable storage medium storing computer-executable instructions that, when executed by a computer system, configure the computer system to perform operations comprising:
storing on one or more computer readable storage devices:
a clustering strategy;
a plurality of host-based events associated with one or more computing devices; and
a plurality of activity trend-related data items and properties associated with respective activity trend-related data items, each of the properties including associated property values, the activity trend-related data items including at least one of: data items associated with captured host-based events, Internet Protocol addresses, external domains, users, or computing devices, wherein hosts comprise computing devices in a network;
designating one or more seeds by:
accessing, from the one or more computer readable storage devices, the plurality of host-based events;
determining a first group of host-based events each indicating a same particular activity type and associated with a particular host and a reference time period;
determining, based at least on the first group of host-based events, a first statistical deviation in the same particular type of activity type of host-based events on the particular host for the reference time period;
determining a second group of the plurality of host-based events each indicating the same particular activity type and associated with the particular host and a test time period;
determining, based at least on the second group of host-based events, a second statistical deviation in the same particular activity type of host-based events on the particular host for the test time period; and in response to determining that the first statistical deviation compared to the second statistical deviation satisfies a particular threshold, designating a host-based event from the second group as a seed; and for each designated host-based event seed:
identifying one or more activity trend-related data items determined to be associated with the designated host-based event seed based at least on the clustering strategy, wherein the clustering strategy queries the one or more cluster data sources to determine at least one of: the particular host associated with the designated host-based event seed, one or more host-based events associated with the particular host, one or more host-based events associated with the designated host-based event seed, users of the particular host, data items associated with the particular host, other hosts associated with the same particular activity type of host-based events, Internet Protocol addresses associated with the particular host, external domains associated with the designated host-based event seed, computing devices associated with the particular host;

generating a data item cluster based at least on the designated host-based event seed, wherein generating the data item cluster comprises:
adding the designated host-based event seed to the data item cluster;
adding the identified one or more activity trend-related data items to the data item cluster;
identifying an additional one or more activity trend-related data items associated with any data item of the data item cluster;
adding the additional one or more activity trend-related data items to the item data cluster; and
storing the generated data item cluster in the one or more computer readable storage devices; and determining a score for the generated data item cluster; and causing presentation of at least one generated data item cluster and the determined score for the at least one generated data item cluster in a user interface of a client computing device.

17. The non-transitory computer-readable storage medium of claim 16, wherein the computer-executable instructions further configure the computer system to perform operations comprising:
providing a second user interface including:
a list of generated data item clusters, each data item cluster of the generated data item clusters in the list selectable by a user; and
a list of cluster scores associated with a selected one or more of the generated data item clusters.

18. The non-transitory computer-readable storage medium of claim 17, wherein each of the cluster scores in the list is selectable by a user, and wherein the second user interface further includes:
a graph including detailed information related to a selected one or more of the cluster scores in the list.

* * * * *